(12) United States Patent
Gorshe et al.

(10) Patent No.: US 11,838,111 B2
(45) Date of Patent: *Dec. 5, 2023

(54) SYSTEM AND METHOD FOR PERFORMING RATE ADAPTATION OF CONSTANT BIT RATE (CBR) CLIENT DATA WITH A VARIABLE NUMBER OF IDLE BLOCKS FOR TRANSMISSION OVER A METRO TRANSPORT NETWORK (MTN)

(71) Applicant: Microchip Technology Inc., Chandler, AZ (US)

(72) Inventors: Steven Scott Gorshe, Beaverton, OR (US); Winston Mok, Vancouver (CA)

(73) Assignee: Microchip Technology Inc., Chandler, AZ (US)

(*) Notice: Subject to any disclaimer, the term of this patent is extended or adjusted under 35 U.S.C. 154(b) by 80 days.

This patent is subject to a terminal disclaimer.

(21) Appl. No.: 17/745,143

(22) Filed: May 16, 2022

(65) Prior Publication Data

US 2023/0006753 A1 Jan. 5, 2023

Related U.S. Application Data

(60) Provisional application No. 63/326,989, filed on Apr. 4, 2022, provisional application No. 63/216,938, filed on Jun. 30, 2021.

(51) Int. Cl.
*H04J 3/16* (2006.01)
*H04J 14/00* (2006.01)
*H04J 3/07* (2006.01)

(52) U.S. Cl.
CPC ............ *H04J 3/1658* (2013.01); *H04J 3/07* (2013.01); *H04J 3/167* (2013.01); *H04J 2203/0085* (2013.01)

(58) Field of Classification Search
None
See application file for complete search history.

(56) References Cited

U.S. PATENT DOCUMENTS 5,343,482 A 8/1994 Penner et al.
5,361,277 A 11/1994 Grover
(Continued)

FOREIGN PATENT DOCUMENTS

DE 60216803 T2 11/2007
DE 102017222442 A1 6/2019
(Continued)

OTHER PUBLICATIONS

PCT/US2022/029600, International Search Report and Written Opinion, European Patent Office, dated Sep. 13, 2022.
(Continued)

*Primary Examiner* — Sai Aung
(74) *Attorney, Agent, or Firm* — GLASS AND ASSOCIATES; Molly Sauter; Kenneth Glass

(57) ABSTRACT

A system and method for performing rate adaptation of constant bit rate (CBR) client data for transmission over a Metro Transport Network (MTN) by defining a plurality of pseudo-Ethernet packets at a source node, assembling a plurality of Generic Mapping Procedure (GMP) frames by mapping a plurality of blocks from a stream of encoded blocks of CBR client data, a plurality of pad blocks, and GMP overhead into consecutive pseudo-Ethernet packets of the plurality of pseudo-Ethernet packets, inserting a variable number of idle blocks between one or more of the consecutive pseudo-Ethernet packets and inserting an MTN path overhead (POH) frame that is aligned to the plurality of GMP frames to generate a plurality of rate adapted GMP frames for transmission over the MTN to an intermediate node or a sink node.

20 Claims, 27 Drawing Sheets

(56) References Cited

U.S. PATENT DOCUMENTS

| | | |
|---|---|---|
| 5,371,765 A | 12/1994 | Guilford |
| 5,600,824 A | 2/1997 | Williams et al. |
| 5,640,398 A | 6/1997 | Carr et al. |
| 5,838,512 A | 11/1998 | Okazaki |
| 5,850,422 A | 12/1998 | Chen |
| 5,905,766 A | 5/1999 | Nguyen |
| 6,044,122 A | 3/2000 | Ellersick et al. |
| 6,052,073 A | 4/2000 | Carr et al. |
| 6,138,061 A | 10/2000 | McEnnan et al. |
| 6,150,965 A | 11/2000 | Carr et al. |
| 6,188,699 B1 | 2/2001 | Lang et al. |
| 6,333,935 B1 | 12/2001 | Carr et al. |
| 6,345,052 B1 | 2/2002 | Tse et al. |
| 6,359,479 B1 | 3/2002 | Oprescu |
| 6,501,340 B1 | 12/2002 | Flood |
| 6,584,521 B1 | 6/2003 | Dillabough et al. |
| 6,603,776 B1 | 8/2003 | Fedders et al. |
| 6,668,297 B1 | 12/2003 | Karr et al. |
| 6,671,758 B1 | 12/2003 | Cam et al. |
| 6,744,787 B1 | 6/2004 | Schatz et al. |
| 6,820,159 B2 | 11/2004 | Mok et al. |
| 6,823,001 B1 | 11/2004 | Chea |
| 6,829,717 B1 | 12/2004 | Roust |
| 6,870,831 B2 | 3/2005 | Hughes et al. |
| 7,117,112 B2 | 10/2006 | Mok |
| 7,161,999 B2 | 1/2007 | Parikh |
| 7,165,003 B2 | 1/2007 | Mok |
| 7,187,741 B2 | 3/2007 | Pontius et al. |
| 7,203,616 B2 | 4/2007 | Mok |
| 7,239,650 B2 | 7/2007 | Rakib et al. |
| 7,239,669 B2 | 7/2007 | Cummings et al. |
| 7,295,945 B2 | 11/2007 | Mok |
| 7,388,160 B2 | 6/2008 | Mok et al. |
| 7,417,985 B1 | 8/2008 | McCrosky et al. |
| 7,468,974 B1 | 12/2008 | Carr et al. |
| 7,492,760 B1 | 2/2009 | Plante et al. |
| 7,593,411 B2 | 9/2009 | McCrosky et al. |
| 7,656,791 B1 | 2/2010 | Mok et al. |
| 7,668,210 B1 | 2/2010 | Mok et al. |
| 7,751,411 B2 | 7/2010 | Cam et al. |
| 7,772,898 B2 | 8/2010 | Cheung |
| 7,807,933 B2 | 10/2010 | Mok et al. |
| 7,817,673 B2 | 10/2010 | Scott et al. |
| 8,010,355 B2 | 8/2011 | Rahbar |
| 8,023,641 B2 | 9/2011 | Rahbar |
| 8,085,764 B1 | 12/2011 | McCrosky et al. |
| 8,139,704 B2 | 3/2012 | Heinrich |
| 8,243,759 B2 | 8/2012 | Rahbar |
| 8,335,319 B2 | 12/2012 | Rahbar |
| 8,413,006 B1 | 4/2013 | Mok et al. |
| 8,428,203 B1 | 4/2013 | Zortea et al. |
| 8,483,244 B2 | 7/2013 | Rahbar |
| 8,542,708 B1 | 9/2013 | Mok et al. |
| 8,599,986 B2 | 12/2013 | Rahbar |
| 8,774,227 B2 | 7/2014 | Rahbar |
| 8,854,963 B1 * | 10/2014 | Muma .................. H04B 10/27 370/231 |
| 8,913,688 B1 | 12/2014 | Jenkins |
| 8,957,711 B2 | 2/2015 | Jin et al. |
| 8,971,548 B2 | 3/2015 | Rahbar et al. |
| 8,976,816 B1 | 3/2015 | Mok et al. |
| 8,982,910 B1 * | 3/2015 | Zhang .................. H04L 49/00 370/503 |
| 8,989,222 B1 | 3/2015 | Mok et al. |
| 9,019,997 B1 | 4/2015 | Mok et al. |
| 9,025,594 B1 | 5/2015 | Mok et al. |
| 9,209,965 B2 | 12/2015 | Rahbar et al. |
| 9,276,874 B1 | 3/2016 | Mok et al. |
| 9,313,563 B1 | 4/2016 | Mok et al. |
| 9,337,960 B2 | 5/2016 | Zhong |
| 9,374,265 B1 | 6/2016 | Mok et al. |
| 9,444,474 B2 | 9/2016 | Rahbar et al. |
| 9,473,261 B1 | 10/2016 | Tse et al. |
| 9,503,254 B2 | 11/2016 | Rahbar et al. |
| 9,525,482 B1 | 12/2016 | Tse |
| 10,069,503 B2 | 9/2018 | Zhang et al. |
| 10,079,651 B2 | 9/2018 | Ramachandra |
| 10,104,047 B2 | 10/2018 | Muma et al. |
| 10,128,826 B2 | 11/2018 | Jin et al. |
| 10,218,823 B2 | 2/2019 | Gareau |
| 10,250,379 B2 | 4/2019 | Haddad et al. |
| 10,397,088 B2 | 8/2019 | Gareau |
| 10,432,553 B2 | 10/2019 | Tse |
| 10,594,329 B1 | 3/2020 | Elkholy |
| 10,594,423 B1 | 3/2020 | Anand et al. |
| 10,608,647 B1 | 3/2020 | Ranganathan et al. |
| 10,797,816 B1 | 10/2020 | Gorshe et al. |
| 10,917,097 B1 | 2/2021 | Meyer et al. |
| 11,108,895 B2 | 8/2021 | Mok et al. |
| 11,128,742 B2 | 9/2021 | Gorshe et al. |
| 2001/0056512 A1 | 12/2001 | Mok et al. |
| 2002/0158700 A1 | 10/2002 | Nemoto |
| 2004/0082982 A1 | 4/2004 | Gord et al. |
| 2005/0110524 A1 | 5/2005 | Glasser |
| 2006/0056560 A1 | 3/2006 | Aweya et al. |
| 2006/0064716 A1 | 3/2006 | Sull et al. |
| 2006/0076988 A1 | 4/2006 | Kessels et al. |
| 2007/0036173 A1 | 2/2007 | McCrosky et al. |
| 2007/0064834 A1 | 3/2007 | Yoshizawa |
| 2007/0132259 A1 | 6/2007 | Ivannikov et al. |
| 2008/0000176 A1 | 1/2008 | Mandelzys et al. |
| 2008/0202805 A1 | 8/2008 | Mok et al. |
| 2010/0052797 A1 | 3/2010 | Carley et al. |
| 2010/0150271 A1 | 6/2010 | Brown et al. |
| 2011/0095830 A1 | 4/2011 | Tsangaropoulos et al. |
| 2012/0158990 A1 | 6/2012 | Losio et al. |
| 2013/0101292 A1 * | 4/2013 | Lanzone ............... H04L 47/25 398/66 |
| 2014/0055179 A1 | 2/2014 | Gong et al. |
| 2014/0139275 A1 | 5/2014 | Dally et al. |
| 2014/0149821 A1 | 5/2014 | Zhou et al. |
| 2015/0078406 A1 * | 3/2015 | Caggioni ............. H04J 3/1664 370/537 |
| 2015/0117177 A1 | 4/2015 | Ganga et al. |
| 2015/0288538 A1 * | 10/2015 | Fritschi ............... H04J 3/1652 398/66 |
| 2016/0020872 A1 | 1/2016 | Zhong |
| 2016/0127072 A1 * | 5/2016 | Chen ................... H04B 10/27 398/58 |
| 2016/0277030 A1 | 9/2016 | Burbano et al. |
| 2016/0301669 A1 | 10/2016 | Muma et al. |
| 2016/0315634 A1 | 10/2016 | Mei et al. |
| 2016/0330014 A1 * | 11/2016 | Jain .................... H04B 10/548 |
| 2017/0005949 A1 | 1/2017 | Gareau |
| 2017/0171163 A1 | 6/2017 | Gareau et al. |
| 2017/0244648 A1 | 8/2017 | Tse |
| 2018/0131378 A1 | 5/2018 | Haroun et al. |
| 2018/0145928 A1 | 5/2018 | Zhong et al. |
| 2018/0159541 A1 | 6/2018 | Spijker |
| 2018/0159785 A1 * | 6/2018 | Wu ..................... H04J 3/1658 |
| 2018/0183708 A1 | 6/2018 | Farkas et al. |
| 2019/0097758 A1 | 3/2019 | Huang et al. |
| 2019/0394309 A1 | 12/2019 | Caldwell et al. |
| 2020/0018794 A1 | 1/2020 | Uehara |
| 2020/0067827 A1 | 2/2020 | Mei et al. |
| 2020/0166912 A1 | 5/2020 | Schneider et al. |
| 2020/0287998 A1 * | 9/2020 | Gorshe ................ H04J 3/1658 |
| 2020/0295874 A1 | 9/2020 | Cheng et al. |
| 2020/0296486 A1 | 9/2020 | Xiang et al. |
| 2020/0396097 A1 | 12/2020 | Deng et al. |
| 2021/0385310 A1 | 12/2021 | Gorshe et al. |
| 2023/0006752 A1 * | 1/2023 | Gorshe .................. H04J 3/07 |

FOREIGN PATENT DOCUMENTS

| | | |
|---|---|---|
| EP | 1145477 A1 | 10/2001 |
| EP | 3544210 A1 | 9/2019 |
| JP | 3565600 B2 | 9/2004 |
| WO | 2003039061 A3 | 10/2003 |
| WO | 2020185247 A1 | 9/2020 |

(56) References Cited

FOREIGN PATENT DOCUMENTS

| WO | 2021040762 A1 | 3/2021 |
|---|---|---|
| WO | 2021151187 A1 | 8/2021 |

OTHER PUBLICATIONS

"Interfaces for the metro transport network;g8312", ITU-T Draft; Study Period 2017-2020; Study Group 15; Series G8312, International Telecommunication Union, Geneva ; CH vol. 11/15, Nov. 25, 2020 (Nov. 25, 2020), pp. 1-21, XP044302831, Retrieved from the Internet: URL:https://www.itu.int/ifa/t/2017/sg15/exchange/wp3/qll/G.8312/g8312-IcCommentResol utions-v3.docx [retrieved on Nov. 25, 2020].

PCT/US22/29600, International Search Report and Written Opinion, European Patent Office, dated Sep. 13, 2022.

ITU-T Draft, "Interfaces for the metro transport network; g8312", Study period 2017-2020; Study Group 15; Series 8312, International Telecommunication Union, Geneva, Switzerland, Nov. 2020.

PCT/US2022/029587, International Search Report and Written Opinion, European Patent Office, dated Jul. 19, 2022.

U.S. Appl. No. 62/953,301, filed Dec. 24, 2019, Peter Meyer.

"IEEE 802.3 IEEE Standard for Ethernet Clause 82", IEEE, 2012.

"ITU-T Recommendation G.709 Interfaces for the Optical Transport Networks", ITU-T G.709/Y.1331, International Telecommunication Union, Jun. 2016.

"MEF 8 Implementation Agreement for the Emulation of PDH Circuits over Metro Ethernet Networks", Metro Ethernet Forum, Oct. 2004.

8A34003 Datasheet (Integrated Device Technology, Inc) Jun. 17, 2019 (Jun. 17, 2019).

Abdo Ahmad et al: "Low-Power Circuit for Measuring and Compensating Phase Interpolator Non-Linearity", 2019 IEEE 10th Annual Information Technology, Electronics and Mobile Communication Conference (IEMCON), IEEE, Oct. 17, 2019 (Oct. 17, 2019), pp. 310-313.

Eyal Oren Broadcom Limited USA, "MTN Section Layer frame and Path layer format considerations;C1522", ITU-T Draft; Study Period 2017-2020; Study Group 15; Series C1522, International Telecommunication Union, Geneva ; CH, Geneva ; CH, (Jun. 18, 2019), vol. 11/15, pp. 1-4, XP044270354.

ITU-T G.8013/Y.1731, "Operation, administration and maintenance (OAM) functions and mechanisms for Ethernet-based networks", International Telecommunication Union, Geneva, Switzerland, Aug. 2015.

Maarten Vissers, "FlexE aware mapping method 6B text proposal;CD11-106", ITU-T Draft; Study Period 2013-2016, International Telecommunication Union, Geneva; CH, vol. 11/15, Jan. 12, 2016 (Jan. 12, 2016), pp. 1-3, Last paragraph of p. 2, p. 3, Figures 17-22.

Malcolm Johnson et al., "Optical Transport Networks from TDM to packet", ITU-T Manual 2010; ITU-T Draft; Study Period 2009-2012, International Telecommunication Union, Geneva, Switzerland, Feb. 22, 2011, pp. 91-122.

Qiwen Zhong, Huawei Technologies Co., Ltd. China, "Discussion and proposal for G.mtn terminologies regarding Ethernet client signal;WD11-39", ITU-T Draft; Study Period 2017-2020; Study Group 15; Series WD11-39, International Telecommunication Union, Geneva ; CH, Geneva ; CH, (Apr. 1, 2019), vol. 11/15, pp. 1-10, XP044264678.

Qiwen Zhong, Huawei Technologies Co., Ltd. P. R. China, "Analysis for IPG based G.mtn path layer OAM insertion impact on IEEE 802.3 PCS state machine;C1195", ITU-T Draft; Study Period 2017-2020; Study Group 15; Series C1195, International Telecommunication Union, Geneva ; CH, Geneva ; CH, (Jun. 18, 2019), vol. 11/15, pp. 1-6, XP044270155.

Steve Gorshe, Microsemi Corp. U.S.A., "Analysis of the G.mtn A.1 Scope Relative to IEEE 802.3 Clause 82 State Diagrams;C1179", ITU-T Draft; Study Period 2017-2020; Study Group 15; Series C1179, International Telecommunication Union, Geneva ; CH, Geneva ; CH, (Jun. 18, 2019), vol. 11/15, pp. 1-11, XP044270147.

Trowbridge, Steve, "G.mtn Section and Path Overhead Options," ITU-T WD11-10, International Telecommunication Union, Geneva, Switzerland, Apr. 2019.

Ximing Dong CICT P.R. China, "Feasibility Analysis: the Use of Idle as a Resources to Carry Path layer OAM; WD11-16", ITU-T Draft; Study Period 2017-2020; Study Group 15; Series WD11-16, International Telecommunication Union, Geneva ; CH, Geneva ; CH, (Apr. 1, 2019), vol. 11/15, pp. 1-6, XP044264659.

Yang, Jian, Betts, Malkcolm, Gu, Yuan, "SCL OAM solution", ITU-T WD11-65 Submission, International Telecommunication Union, Geneva, Switzerland, Jun. 2018.

Zhang Sen et al, "Hybrid Multiplexing over FlexE Group," 2018 23rd Opto-Electronics and Communications Conference (OECC), IEEE, Jul. 2, 2018, pp. 1-2.

Steve Gorshe, "MTN Path Overhead Proposal—Overhead Frame Structure; WD11-13", ITU-T Draft; Study Period 2017-2020; Study Group 15; Series C1181, International Telecommunication Union, 3eneva; Switzerland, vol. 11/15 , Apr. 2, 2019.

Steve Gorshe, "MTN Path Overhead Proposal—Overhead Method and Frame Structure;CII81", ITU-T Draft; Study Period 2017-2020; Study Group 15; Series C1181, International Telecommunication Union, Geneva; Switzerland, vol. 11/15 , Jun. 18, 2019.

Steve Trowbridge Nokia USA: "Sample common sub-IG TDM multiplexing and switching mechanism for use over MTN and OTN networks;C2812", ITU-T Draft; Study Period 2021-2024; Study Group 15; Series C2812, International Telecommunication Union, Geneva ; CH vol. 11/15, Nov. 23, 2021 (Nov. 23, 2021), pp. 1-7, XP044322271, Retrieved from the Internet: URL:https://www-api.itu.int/ifa/t/2017/sgl 5/docs/c/ties/T17-SG15-C-2812! !MSW-E.docx [retrieved on Nov. 23, 2021].

\* cited by examiner

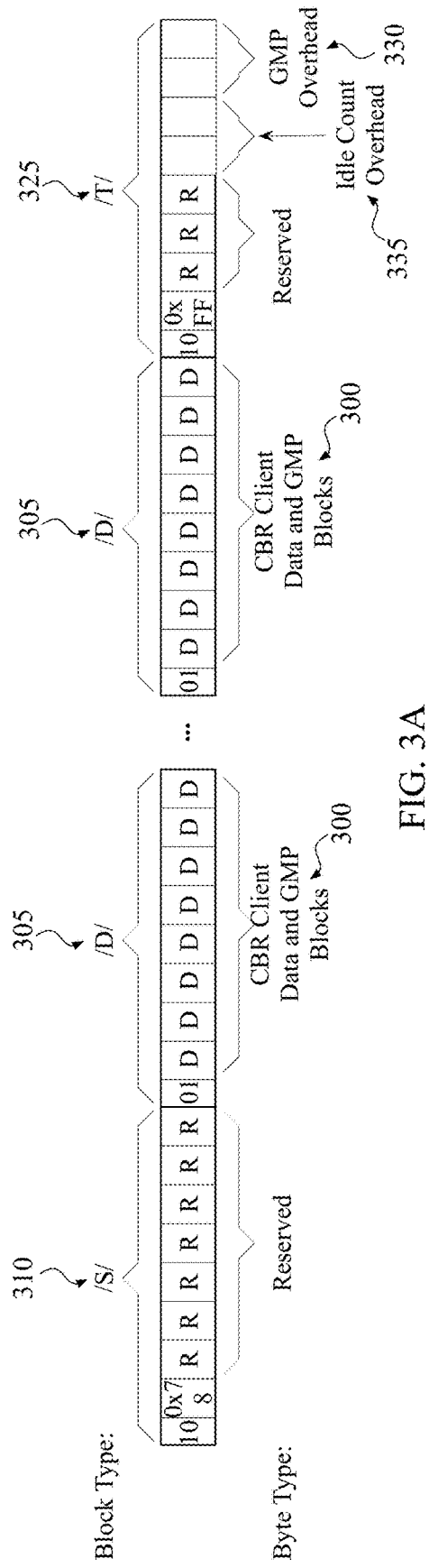
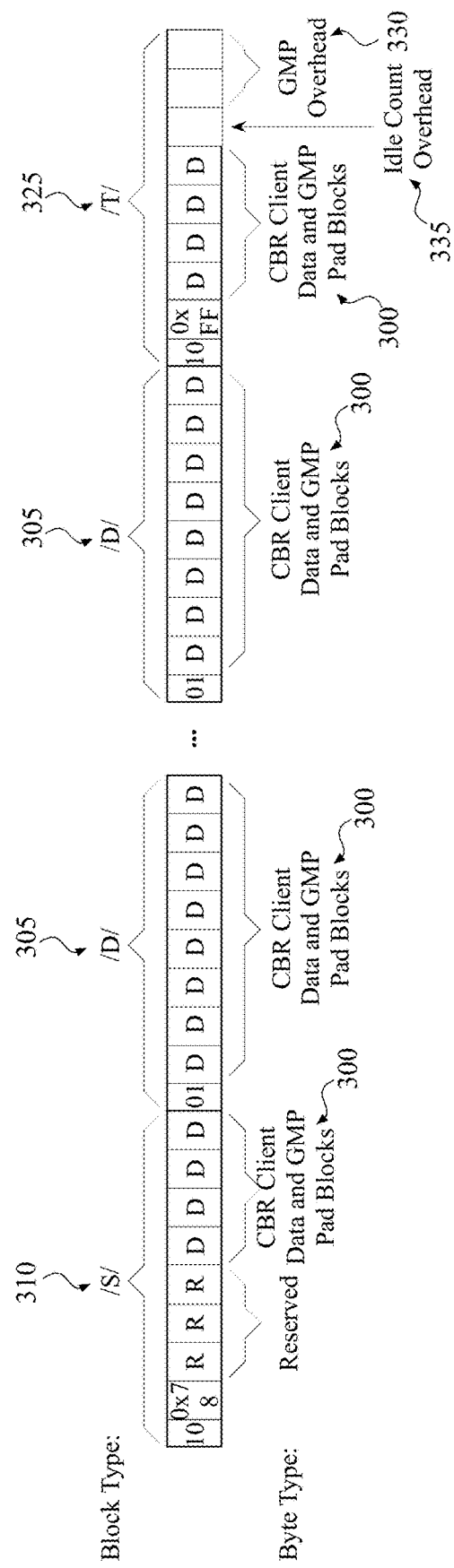
FIG. 3A
FIG. 3B

JC1-JC3 Definitions

JC4-JC6 Definitions

1900

```
┌─────────────────────────────────────────────────────────────────────────┐
│  TRANSMITTING THE STREAM OF GMP MULTIPLEXING RATE ADAPTED FRAMES,       │
│  INCLUDING THE FIXED NUMBER OF IDLE BLOCKS, OVER THE MTN                │
│                              1905                                        │
└─────────────────────────────────────────────────────────────────────────┘
                                   ▼
┌─────────────────────────────────────────────────────────────────────────┐
│  RECEIVING THE STREAM OF GMP MULTIPLEXING RATE ADAPTED FRAMES AND THE   │
│  FIXED NUMBER OF IDLE BLOCKS AT A FIRST INTERMEDIATE NODE OF THE MTN    │
│                              1910                                        │
└─────────────────────────────────────────────────────────────────────────┘
                                   ▼
┌─────────────────────────────────────────────────────────────────────────┐
│  PERFORMING IDLE MAPPING PROCEDURE (IMP) RATE ADAPTATION OF THE STREAM  │
│  OF GMP MULTIPLEXING RATE ADAPTED FRAMES RECEIVED AT THE FIRST          │
│  INTERMEDIATE NODE TO MODIFY THE FIXED NUMBER OF IDLE BLOCKS            │
│                              1915                                        │
└─────────────────────────────────────────────────────────────────────────┘
                                   ▼
┌─────────────────────────────────────────────────────────────────────────┐
│  TRANSMITTING THE STREAM OF GMP MULTIPLEXING RATE ADAPTED FRAMES HAVING │
│  THE MODIFIED NUMBER OF FIXED IDLE BLOCKS FROM THE FIRST INTERMEDIATE   │
│  NODE TO A NEXT NODE OF THE MTN                                         │
│                              1920                                        │
└─────────────────────────────────────────────────────────────────────────┘
```

```
┌─────────────────────────────────────────────────────────────────────────┐
│  RECEIVING THE STREAM OF GMP MULTIPLEXING RATE ADAPTED FRAMES HAVING    │
│  THE MODIFIED FIXED NUMBER OF IDLE BLOCKS AT THE SINK NODE              │
│                              1955                                        │
└─────────────────────────────────────────────────────────────────────────┘
                                   ▼
┌─────────────────────────────────────────────────────────────────────────┐
│  PERFORMING IMP TO ADAPT THE STREAM OF GMP MULTIPLEXING RATE ADAPTED    │
│  FRAMES TO A LOCAL REFERENCE CLOCK AT THE SINK NODE                     │
│                              1960                                        │
└─────────────────────────────────────────────────────────────────────────┘
                                   ▼
┌─────────────────────────────────────────────────────────────────────────┐
│  DETERMINING, FOR EACH INTERLEAVED THREAD, A CORRESPONDING CLIENT DATA  │
│  STREAM RATE FROM THE GMP OVERHEAD AND A DIFFERENCE BETWEEN THE FIXED   │
│  NUMBER OF IDLE BLOCKS INSERTED BETWEEN THE CONSECUTIVE PSEUDO-ETHERNET │
│  PACKETS OF THE STREAM OF GMP MULTIPLEXING RATE ADAPTED FRAMES BY THE   │
│  SOURCE NODE AND THE MODIFIED FIXED NUMBER OF IDLE BLOCKS RECEIVED AT   │
│  THE SINK NODE                                                          │
│                              1965                                        │
└─────────────────────────────────────────────────────────────────────────┘
                                   ▼
┌─────────────────────────────────────────────────────────────────────────┐
│  EXTRACTING THE TWO OR MORE STREAMS OF 64B/66B-ENCODED BLOCKS OF CBR    │
│  CLIENT DATA FROM THE STREAM OF GMP MULTIPLEXING RATE ADAPTED FRAMES    │
│  USING THE CORRESPONDING CLIENT DATA STREAM RATE FOR THE INTERLEAVED    │
│  THREAD                                                                 │
│                              1970                                        │
└─────────────────────────────────────────────────────────────────────────┘
```

FIG. 19B

SYSTEM AND METHOD FOR PERFORMING RATE ADAPTATION OF CONSTANT BIT RATE (CBR) CLIENT DATA WITH A VARIABLE NUMBER OF IDLE BLOCKS FOR TRANSMISSION OVER A METRO TRANSPORT NETWORK (MTN)

CROSS-REFERENCE TO RELATED APPLICATIONS

This application claims priority to U.S. Provisional Patent Application No. 63/216,938, filed Jun. 30, 2021 and U.S. Provisional Patent Application No. 63/326,989, filed Apr. 4, 2022, and is related to U.S. Non-Provisional patent application titled "SYSTEM AND METHOD FOR PERFORMING RATE ADAPTATION OF CONSTANT BIT RATE (CBR) CLIENT DATA WITH A FIXED NUMBER OF IDLE BLOCKS FOR TRANSMISSION OVER A METRO TRANSPORT NETWORK (MTN)" and U.S. Non-Provisional patent application titled "SYSTEM AND METHOD FOR PERFORMING RATE ADAPTATION AND MULTIPLEXING OF CONSTANT BIT RATE (CBR) CLIENT DATA FOR TRANSMISSION OVER A METRO TRANSPORT NETWORK (MTN)" that are filed on the same date and have the same inventors as the present application, each of which are herein incorporated by reference in their entirety.

BACKGROUND OF THE INVENTION

Generic Mapping Procedure (GMP) is an International Telecommunication Union Telecommunication Standardization Sector (ITU-T) method for mapping a constant bit rate (CBR) digital client signal of a given bit rate into the payload of a telecom network server layer channel. In operation, the source node uses the GMP overhead in each GMP window, which is located in the overhead of the server layer channel, to send a count value (Cm) to tell the sink node how many payload data words it will send in the next GMP window. The source node uses a modulo arithmetic algorithm based on the count value (Cm) to insert pad words to fill any channel bandwidth not required by the client signal. The sink node uses the same modulo arithmetic algorithm to recover the data. However, the server layer channel for an ITU-T G.8312 standard Metro Transport Network (MTN) project does not provide for GMP overhead.

As defined by the ITU-T G.709 (OTN), GMP requires a consistent fixed length between the beginning of each GMP window, i.e., a fixed number of server layer bits per GMP window, since the GMP overhead is in the server layer. The server channel is point-to-point such that the GMP is terminated at the ingress to an intermediate node and generated again at an egress port of the intermediate node. Since the MTN server channel for the MTN lacks GMP overhead, it would be desirable to move the GMP function into the "Path" overhead (POH) of the MTN server layer channel that is added to the client signal stream, which passes through intermediate nodes without modification. The problem with using GMP in the POH is that an intermediate node has a different clock domain than the source node, which makes it impossible to maintain a constant fixed number of server layer bits for each GMP window. GMP adjusts the amount of payload information sent per GMP window but the time period for the window is set by the source node, based on the source node's reference clock (REFCLK).

There are three categories of previous solutions for transporting CBR client signals over a network, including an MTN. One category creates a CBR Path signal containing the client and some additional Path overhead. It then uses overhead in the server signal to accommodate the difference between the path signal rate and the server payload channel rate. While there are various approaches within this category, the ITU-T Generic Mapping Procedure (GMP) is a commonly used solution. A disadvantage is that it requires section layer overhead, which must be processed at each node along the path layer.

The second category operates in the packet domain. Segments of the CBR Client signal stream are periodically encapsulated into regular standard Ethernet or Internet Protocol (IP)/Multi-Protocol Layer Switching (MPLS) packets sent from source to sink as the path signal. The sink then extracts the client data from the packets to reconstruct the client signal. Differences in clock domains along the path are accommodated by inserting or removing inter-packet idle characters and may also use packet time stamps. There is no explicit rate-related information transmitted in either the path or server overhead. One drawback is the large amount of overhead bandwidth required for the regular Ethernet packet encapsulation. Another drawback is that packet processing along the path creates jitter due to irregular inter-packet arrival times at the sink. This adds significant complexity to the process of deriving the client signal rate at the sink, since average packet arrival time is the main information available for it, and time stamps, if used, are complex to process. Also, using packets adds undesirable latency at the source and sink nodes.

The third category combines GMP and an Ethernet idle mapping procedure (IMP) into an Ethernet block structure based on an ordered set to mark the frame boundaries, but without Ethernet packets. The main drawback to this approach is that it may not be transparent to intermediate nodes that expect to see Ethernet packets at the physical coding sublayer (PCS).

Accordingly, there is a need for a method and apparatus that overcomes the problems associated with the intermediate node clock domain in the transmission of CBR client signals over a Metro Transport Network (MTN).

SUMMARY OF THE INVENTION

The present examples provide a system and method for performing rate adaptation of constant bit rate (CBR) client data for transmission over a Metro Transport Network (MTN) that overcomes problems associated with the intermediate node clock domain in the transmission of CBR client data over the MTN by incorporating Generic Mapping Procedure (GMP) overhead into the CBR client data stream at a source node.

In one example, a method for performing rate adaptation is provided. The method includes, receiving a stream of encoded blocks of CBR client data at a source node, defining a plurality of pseudo-Ethernet packets, assembling a stream of Generic Mapping Procedure (GMP) frames comprising a plurality of GMP frames by mapping a fixed number of the encoded blocks of CBR client data, a fixed number of pad blocks and GMP overhead into consecutive pseudo-Ethernet packets of the plurality of pseudo-Ethernet packets, inserting a variable number of idle blocks into the stream of GMP frames and inserting an MTN path overhead (POH) frame that is aligned to the plurality of GMP frames into the stream of GMP frames to generate a stream of CBR rate adapted GMP frames.

In another example, a method for performing rate adaptation is provided which includes, receiving a stream of encoded blocks of CBR client data at a source node, defining a plurality of pseudo-Ethernet packets, assembling a stream of Generic Mapping Procedure (GMP) frames comprising a plurality of GMP frames by mapping a fixed number of blocks of the stream of encoded blocks of CBR client data, a fixed number of pad blocks and GMP overhead into consecutive pseudo-Ethernet packets of the plurality of pseudo-Ethernet packets, inserting a variable number of idle blocks into the stream of GMP frames and inserting an MTN path overhead (POH) frame that is aligned to the plurality of GMP frames into the stream of GMP frames to generate a stream of CBR rate adapted GMP frames. The example method further includes, transmitting the stream of CBR rate adapted GMP frames, the variable number of idle blocks and the indication of the variable number of idle blocks inserted by the source over the MTN, receiving the stream of CBR rate adapted GMP frames, the variable number of idle blocks and the indication of the variable number of idle blocks inserted by the source at an intermediate node of the MTN, performing idle mapping procedure (IMP) rate adaptation of the stream of CBR rate adapted GMP frames received at the intermediate node to modify the variable number of idle blocks, transmitting the stream of CBR rate adapted GMP frames, the modified variable number of idle blocks and the indication of the variable number of idle blocks inserted by the source from the intermediate node to a sink node of the MTN, receiving the stream of CBR rate adapted GMP frames, the modified number of idle blocks and the indication of the variable number of idle blocks inserted by the source at the sink node, performing idle mapping procedure (IMP) rate adaptation to adapt the stream of CBR rate adapted GMP frames to a local reference clock at the sink node, determining the CBR client data stream rate of the stream of CBR client data from the GMP overhead and a difference between the indication of the variable number of idle blocks inserted by the source node and the modified number of idle blocks received at the sink node and extracting the stream of encoded blocks of CBR client data from the stream of CBR rate adapted GMP frames using the determined CBR client data stream rate.

In an additional example, a source node for transmitting a constant bit rate (CBR) client data stream over a Metro Transport Network (MTN) is provided. The source node includes circuitry to receive a stream of encoded blocks of CBR client data, define a plurality of pseudo-Ethernet packets, assemble a stream of Generic Mapping Procedure (GMP) frames comprising a plurality of GMP frames by mapping a fixed number of blocks of the stream of encoded blocks of CBR client data, a fixed number of pad blocks and GMP overhead into consecutive pseudo-Ethernet packets of the plurality of pseudo-Ethernet packets, insert a variable number of idle blocks into the stream of GMP frames and an indication of the variable number of idle blocks inserted by the source into the stream of GMP frames and insert an MTN path overhead (POH) frame that is aligned to the plurality of GMP frames into the stream of GMP frames to generate a stream of CBR rate adapted GMP frames.

Accordingly, in various examples a method and apparatus is provided that overcomes the problems associated with the intermediate node clock domain in the transmission of CBR client signals over a Metro Transport Network (MTN).

BRIEF DESCRIPTION OF THE DRAWINGS

For a fuller understanding reference should be made to the following detailed description, taken in connection with the accompanying drawings, in which:

FIG. 3A illustrates an example pseudo-Ethernet packet format having client data and GMP pad blocks placed into data blocks of the packet.

FIG. 3B illustrates an example pseudo-Ethernet packet format having client data and GMP pad blocks placed into data blocks and packet start control blocks /S/ of the packet.

FIG. 19A is an example flow diagram illustrating a method for performing rate adaption at an intermediate node of the MTN for the method as illustrated in FIG. 18B.

FIG. 19B is an example flow diagram illustrating a method for performing data extraction at a sink node of the MTN for the method as illustrated in FIG. 18B.

DETAILED DESCRIPTION OF THE INVENTION

Reference will now be made in detail to various examples, examples of which are illustrated in the accompanying drawings. While various examples are discussed herein, it will be understood that they are not intended to be limiting. On the contrary, the presented examples are intended to cover alternatives, modifications, and equivalents, which may be included within the spirit and scope of the various examples as defined by the appended claims. Furthermore, in this Detailed Description of the Invention, numerous specific details are set forth in order to provide a thorough understanding. However, examples may be practiced without one or more of these specific details. In other instances, well known methods, procedures, components, and circuits have not been described in detail as not to unnecessarily obscure aspects of the described examples.

It will be understood that, although the terms first, second, third, without limitation, may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various examples, the present examples provide a novel system and method for carrying constant bit rate (CBR) client signals, which are based upon 64B/66B block coded Ethernet streams, through an ITU-T G.8312 Metro Transport Network (MTN).

The present examples overcome the intermediate clock domain problem by adding a mechanism that preserves a constant GMP window with respect to the path layer packets, but is variable in the server layer, where inter-packet idle blocks can be inserted or removed. This mechanism eliminates the need to terminate the GMP at the ingress to an intermediate node and to regenerate it at the intermediate node's egress port.

Figure 1:
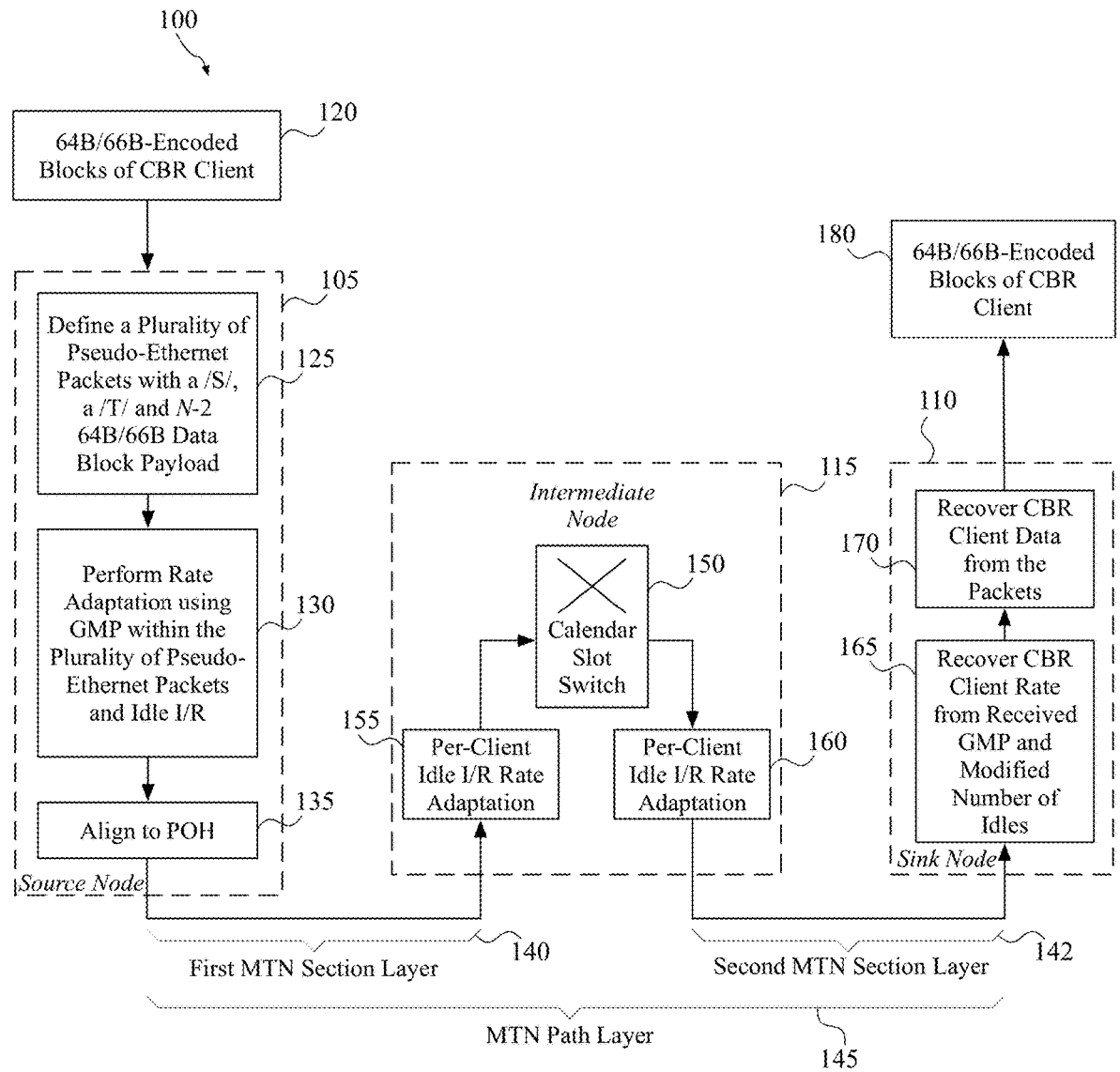
FIG. 1 is an example diagram illustrating a basic network using GMP for adapting a path stream to a source node server channel.

FIG. 1 shows a basic reference network, including a high-level illustration of the relevant network element (NE) functions. The CBR client data stream is encoded into a stream of IEEE 802.3 Ethernet-compliant encoded blocks of CBR client data. In a specific example, the encoded blocks of the CBR client data are 64B/66B-encoded blocks of CBR client data, however this is not intended to be limiting and other encoding methods for the blocks are within the scope. MTN nodes perform rate adaptation between a CBR client data stream rate of the stream of 64B/66B-encoded blocks of CBR client data and the server channel rate via IMP (i.e., inserting or removing idle blocks from the inter-packet gap (IPG) region between Ethernet packets). MTN communicates its Path overhead in ordered set (OS) blocks that are inserted into the Ethernet inter-packet gap (IPG) on a nominal interval of once per $2^{14}$ blocks. The examples use a fixed minimum number of idle blocks between its Ethernet packets such that they will pass transparently through MTN nodes performing IMP and allow IMP to handle the potential rate adjustment range, which may be on the order of 200 ppm. The examples also use GMP to distribute the client information within the packets, and in one option to also provide rate adaptation.

One key benefit of GMP is that it uses a modulo arithmetic algorithm to spread the GMP pads blocks among the client data blocks with a consistent spacing. If only IMP is used, the sink node could receive relatively large numbers of idle characters between groups of client data characters, which increases the sink node buffer and latency, and either reduces the jitter performance and/or complicates the implementation of the sink phase locked loop (PLL) for recovering the client clock. Note that the GMP word size is assumed to be one 64B/66B block, independent of the number of 5 Gbit/s CalSlots used by the client. FlexE calendar slots (CalSlots) implement a technique using a calendar slot switch, as is known in the art. Persons of ordinary skill in the art will appreciate that the clock timing concepts for data transmission disclosed herein reflect the calendar slot timing employed in the FlexE technique, which will be referred to as needed for an understanding of the examples, however this is not meant to be limiting in any way.

Alternatively, the word size could be N 64B/66B blocks for a client using N CalSlots. The application is primarily for carrying CBR client signals rather than a general-purpose Ethernet packet-multiplexed interface that combines packet and CBR clients, although it is not limited thereto. Consequently, it is possible to use pseudo-Ethernet packets that include GMP overhead instead of carrying GMP overhead through OS blocks and data blocks in known locations. Specifically, the present examples encapsulate CBR client data into pseudo-Ethernet packets with the GMP overhead carried in one of the packet's control blocks, preferably the/T/ block at the end of the packet.

With reference to FIG. 1, a system 100 for transmitting a constant bit rate (CBR) client data stream over a Metro Transport Network (MTN) includes a source node 105 comprising circuitry to receive a stream of 64B/66B-encoded blocks of CBR client data 120 encoded from a CBR client data stream. Circuitry of the source node 105 defines a plurality of pseudo-Ethernet packets at 125, each pseudo-Ethernet packet having a packet start control block (/S/) comprising a respective plurality of bytes, a plurality of data payload blocks and a packet termination control block (/T/) comprising a respective plurality of bytes. The plurality of data payload blocks includes N-2 64B/66B-encoded data blocks, wherein N is the total number of 64B/66B-encoded data blocks in a pseudo-Ethernet packet.

Following the defining of the plurality of pseudo-Ethernet packets at 125, the circuitry of the source node 105 then performs rate adaptation using GMP within the pseudo-Ethernet packets and idle insertion and/or removal (I/R) 130 between the pseudo-Ethernet packets. In particular, in performing the rate adaptation at 130, the circuitry of the source node 105 assembles a Generic Mapping Procedure (GMP) frame stream comprising a plurality of GMP frames by mapping a plurality of blocks of the stream of 64B/66B-encoded blocks of CBR client data, a plurality of pad blocks, and GMP overhead into consecutive pseudo-Ethernet packets of the plurality of pseudo-Ethernet packets and inserting a number of idle blocks into the GMP frame stream between the pseudo-Ethernet packets. As such, the plurality of pseudo-Ethernet packets defined by the source node 105 are filled with a number of 64B/66B-encoded blocks of CBR client data as determined by a GMP engine, which will be described in more detail below with reference to FIG. 7C.

Following the rate adaptation at 130, the circuitry of the source node 105 uses the identification of the beginning of the GMP frame to align the plurality of GMP frames with the MTN path overhead (POH) frame by inserting an MTN path overhead (POH) frame that is aligned to the beginning of the GMP frames to generate a stream of rate adapted GMP frames, at 135. The stream of CBR rate adapted GMP frames, including the number of idle blocks, are then transmitted to an intermediate node 115 of the MTN.

There are two logical path representations used to carry the CBR client data stream through the MTN network. The MTN path layer 145 extends end-to-end, wherein the stream of 64B/66B-encoded blocks of CBR client data 120 enters the MTN network at the source node 105, passes through one or more intermediate nodes 115 and exits the MTN at the sink node 110. A first MTN section layer 140 connects the source node 105 to the intermediate node 115 and a second MTN section layer 142 connects the intermediate node 115 to the sink node 110. The MTN path layer 145 utilizes the first MTN section layer 140 as its server layer and provides configurable connection-oriented connectivity.

The server layer for the first MTN section layer 140 is provided through various Ethernet interfaces. As illustrated in FIG. 1, communication between the source node 105 and the intermediate node 115 and between the intermediate node 115 and the sink node 110 occurs over the respective MTN section layers 140, 145 to establish the communication between the source node 105 and the sink node 110 over the MTN path layer 145. As such, the GMP overhead used to perform the CBR client signal rate adaptation is placed into the MTN path layer 145 by the source node 105 to adapt the stream of 64B/66B-encoded blocks of CBR client data 120 over the MTN path layer 145 to the sink node 110 such that it can pass through the intermediate node(s) 115 that use Ethernet idle rate adaptation and provide the sink node 110 with the rate (frequency/phase) information that it can use to recover the stream of 64B/66B-encoded blocks of CBR client data 120.

The intermediate node 115 is typically connected to multiple source nodes 105 and multiple sink nodes 110. The stream of CBR rate adapted GMP frames from the stream of 64B/66B-encoded blocks of CBR client data 120 are switched by the intermediate node 115 onto an appropriate egress link that identifies the sink node 110 as the destination for the stream of 64B/66B-encoded blocks of CBR client data 120 or identifies the next node along the path to the sink node 110. The switching by the intermediate node 115 is typically performed using a FlexE calendar slot (CalSlot) technique using a calendar slot switch, as is known in the art. Persons of ordinary skill in the art will appreciate that the clock timing concepts for data transmission disclosed herein reflect the calendar slot timing employed in the FlexE technique, which will be referred to as needed for an understanding of the examples, however this is not meant to be limiting in any way.

In the intermediate node 115 the stream of CBR rate adapted GMP frames sent by the source node 105 are adapted to the clock rate of the intermediate node 115 using per-client idle insertion and/or removal (FR) rate adaptation 155, wherein circuitry of the intermediate node 115 inserts or deletes idle 64B/66B blocks to/from the stream of CBR rate adapted GMP frames as necessary to match the CBR rate adapted GMP frames rate to the clock rate of the intermediate node 115. As such, the intermediate node 115 inserts additional idle blocks into the stream of CBR rate adapted GMP frames when the rate of the stream of CBR rate adapted GMP frames is slower than the rate in the intermediate node 115 and deletes idle blocks from the stream of CBR rate adapted GMP frames when the rate of the stream of CBR rate adapted GMP frames is faster than the rate in the intermediate node 115. Following the distribution by the calendar slot switch 150, the stream of CBR rate adapted GMP frames having a modified number of idle blocks is further modified using per-client idle I/R rate adaptation 160 to adapt the clock rate of the intermediate node 115 to the link rate of the second MTN section layer 142. The stream of CBR rate adapted GMP frames having the twice modified number of idle blocks in then transmitted to the sink node 110 over the second MTN section layer 142 at the respective link rate.

The stream of CBR rate adapted GMP frames having the twice modified number of idle blocks are received at the sink node 110. Circuitry at the sink node 110 is used to recover the CBR client data stream rate from the received stream of CBR rate adapted GMP frames and the twice modified number of idle blocks at 165 and to recover the stream of encoded blocks of CBR client data from the packets of the CBR rate adapted GMP frames at 170.

The GMP frames of the stream of CBR rate adapted GMP frames consist of Ethernet-compliant 64B/66B blocks of CBR client data assembled into pseudo-Ethernet packets by the source node 105. The packets are "pseudo-Ethernet" packets in the sense that they follow the Ethernet basic PCS packet syntax, beginning with the/S/ start control block and ending with a /T/ terminate control block. This syntax ensures that all intermediate MTN node 115 implementations can correctly identify the Ethernet inter-packet gap (IPG) for idle (I/R) rate adaptation. However, since the packets are not processed by an Ethernet MAC, they may omit the Ethernet packet MAC overhead and the 32-bit cyclic redundancy check frame check sequence (CRC-32 FCS). Also, the pseudo-Ethernet packet lengths may be made much longer than the allowable Ethernet packet size in order to provide higher bandwidth efficiency for this application.

Figure 2:
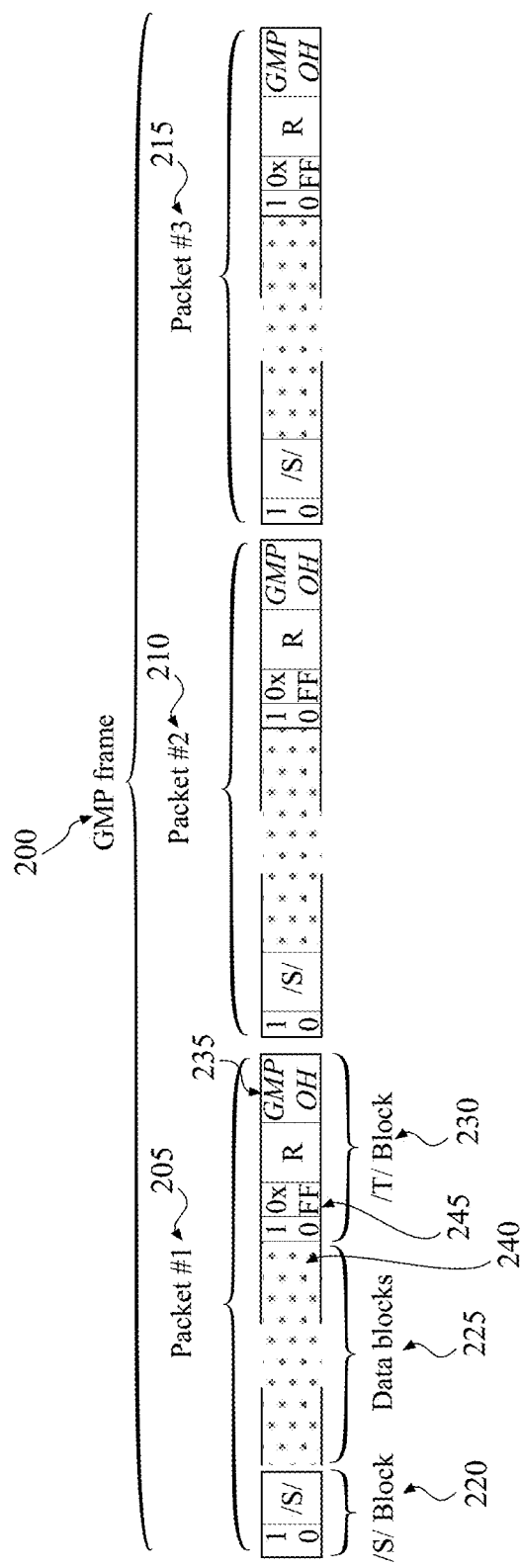
FIG. 2 illustrates an example GMP frame.

An example of the format of the pseudo-Ethernet packet is illustrated in FIG. 2, wherein three consecutive pseudo-Ethernet packets 205, 210, 215 are included in a GMP frame 200. As shown, each of the pseudo-Ethernet packets 205, 210, 215 includes GMP overhead 235 in the packet termination control block (/T/) 230 at the end of the packet. The /T/ block 230 also includes the control block type 245. The 64B/66B-encoded blocks of CBR client data 240 are mapped into the data blocks 225 of the consecutive pseudo-Ethernet packets 205, 210, 215. As shown in FIG. 2, bytes of the/S/ block and the/T/ block are used for this application, with the/T/ block preferably carrying the GMP overhead 235. While the format of the pseudo-Ethernet packet illustrated in FIG. 2 shows the GMP overhead 235 placed in the packet termination control block /T/ 230, this is not intended to be limiting and it is within the scope of the present examples to place the GMP overhead 235 in either of the control blocks (/S/ or //T/) of the pseudo-Ethernet packet, including the packet start control block /S/ 220 or the packet termination control block /T/ 230.

FIG. 3A and FIG. 3B further illustrate example pseudo-Ethernet packets. In FIG. 3A the blocks of the 64B/66B-encoded CBR client data 300 only occupy the 64B/66B data blocks (/D/) 305 of the pseudo-Ethernet packets. In a second example shown in FIG. 3B, for added efficiency, the blocks of the 64B/66B-encoded CBR client data and GMP pad blocks 300, in addition to occupying the 64B/66B data blocks (/D/) 305 of the pseudo-Ethernet packets, the CBR client data and GMP pad blocks 300 may also occupy some of the bytes in the packet start control block (/S/) 310 and the packet termination control block (/T/) block 325. As shown in FIG. 3A and FIG. 3B, the bytes of the idle count overhead 335 and the GMP overhead 330 occupy respective portions of the packet termination control block (/T/) 325. While in this example, the idle count overhead 335 is shown in the packet termination control block (/T/) 325, this is not intended to be limiting and, in another example, the idle count overhead 335 may be placed in the packet start control block (/S/) 315.

Figure 4:
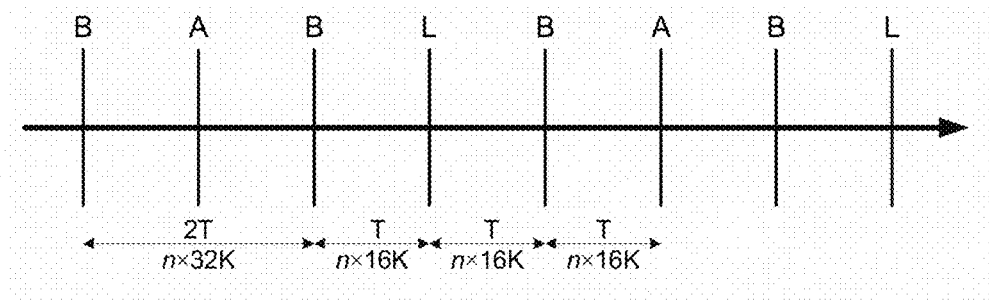
FIG. 4 illustrates an example pattern for MTN path overhead (POH) insertion opportunities in an MTN frame.
Figure 13:
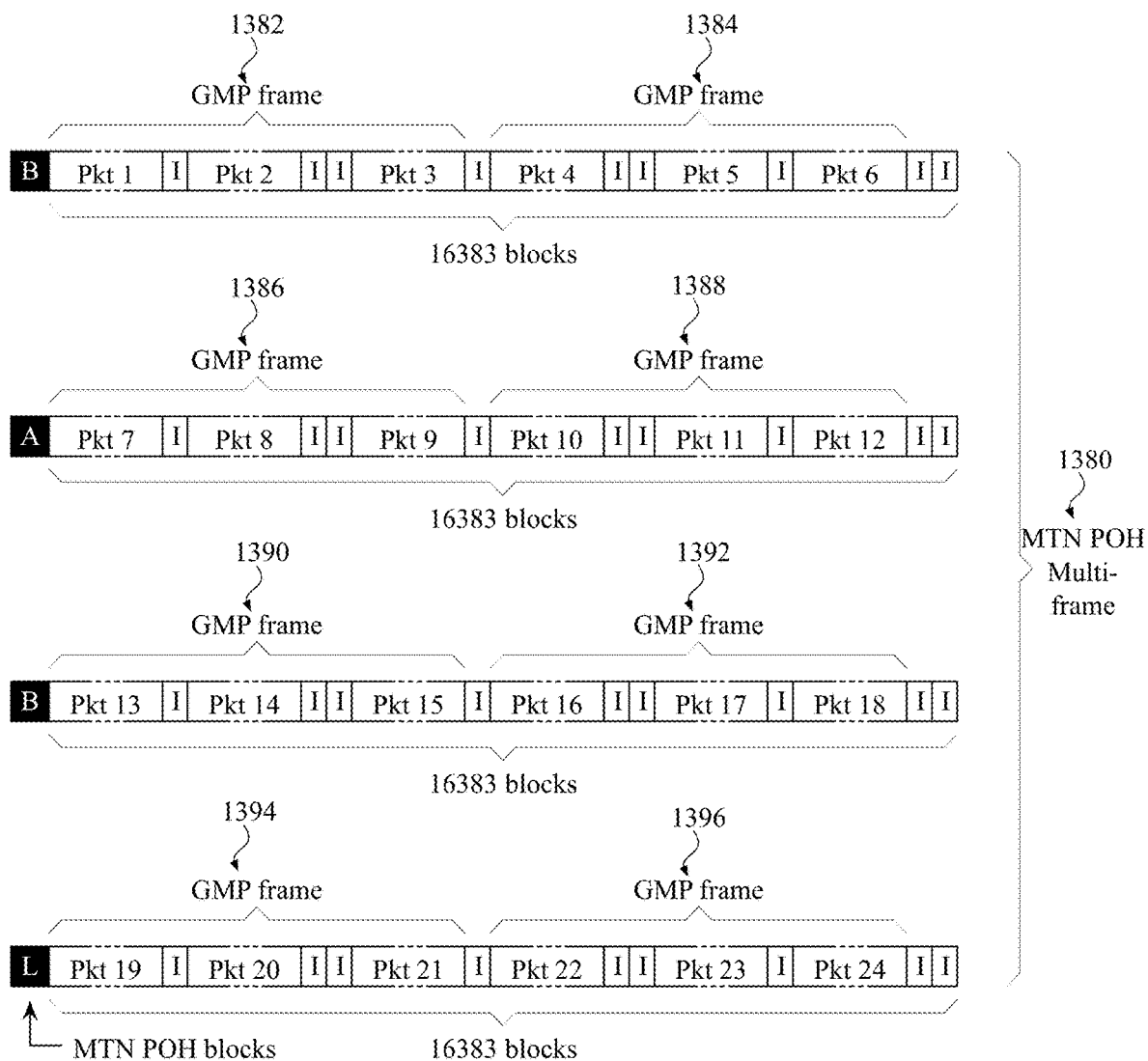
FIG. 13 illustrates an example of 2730-block packets for multiples of 32 multiplexing threads.

FIG. 4 illustrates the frame format for MTN path overhead (POH) insertion opportunities in accordance with ITU-T Rec. G.8312 MTN, wherein "16K" is nominally 16384 and "32K" is nominally 32768 and "n" is the number of 5 Gbit/s MTN section calendar slots used by the client data stream. B, A and L are different types of POH ordered set blocks in accordance with the ITU-T Rec. G.8312 MTN standard. The locations of the B, A and L POH blocks are also illustrated in FIG. 5 and FIG. 13. The MTN POH frame begins with the B POH block located in the position prior to the appearance of the A POH block position. Note that in accordance ITU-T G.8312, there may be times when no POH is transmitted in the L or A POH block positions. Consequently, it is understood in the descriptions below that the pair of B POH blocks provide the reference points in the MTN POH frame, with the L or A blocks inserted into their respective positions within the MTN POH frame when they are applicable. If no A or L block is transmitted in that respective MTN POH position, an idle block may occupy that position without loss of generality.

MTN POH blocks are nominally separated by n*16384 64B/66B blocks, where n represents the number of MTN Section layer 5 Gbit/s calendars slots carrying the MTN Path. For compatibility with the MTN POH period requirements shown in FIG. 4, the pseudo-Ethernet packet length is chosen such that an IPG occurs at each regular n*16384 block spacing point for MTN POH insertion. The pseudo-Ethernet packet length is also chosen such that it makes more efficient use of the interval between MTN POH blocks and provides sufficient idle blocks for IMP. For implementation convenience, the pseudo-Ethernet packet length may be chosen such that an integer number of GMP frames appear between each MTN POH block.

Figure 5A:
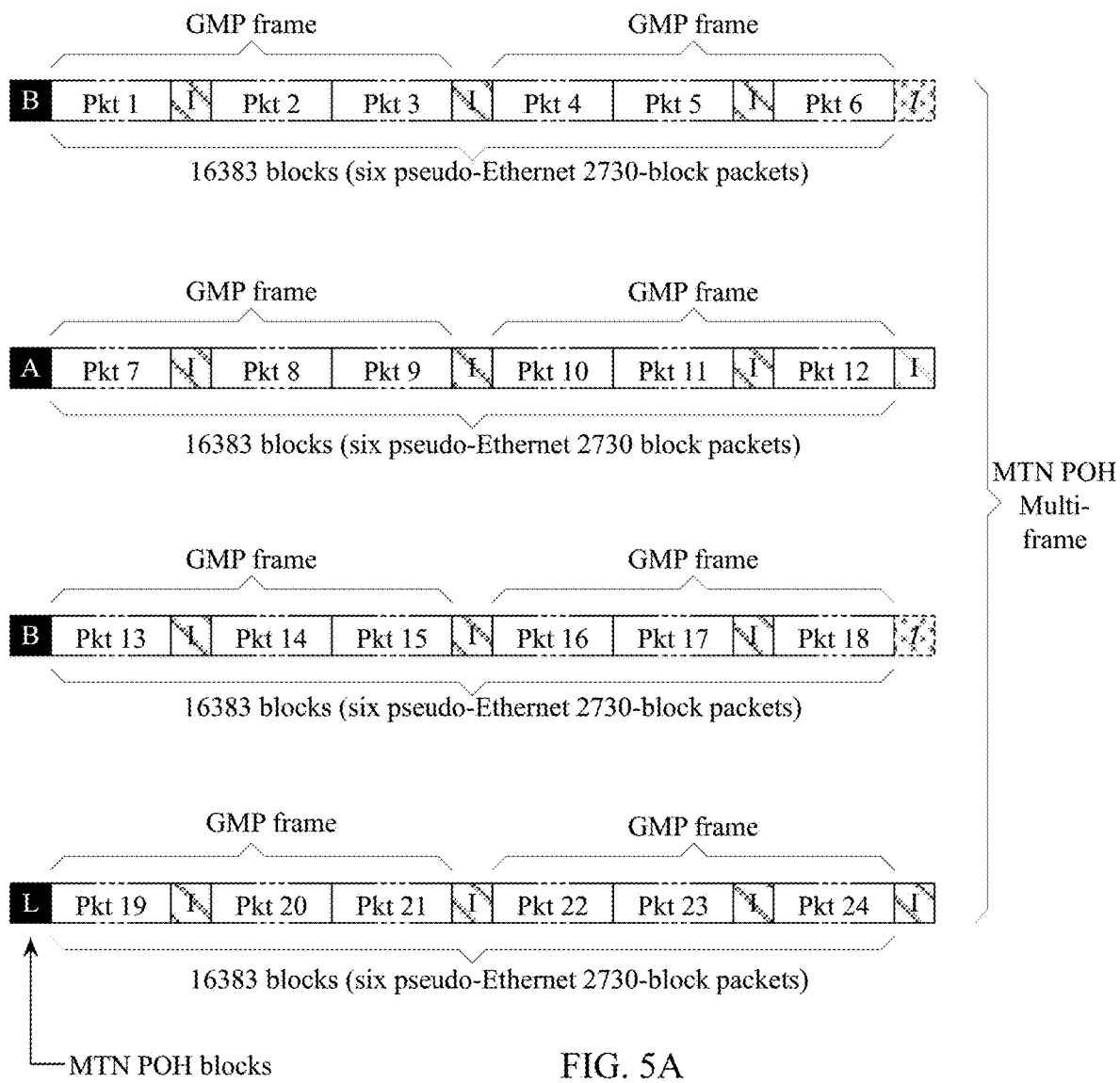
FIG. 5A illustrates an example of six pseudo-Ethernet 2730-block packets.
Figure 5B:
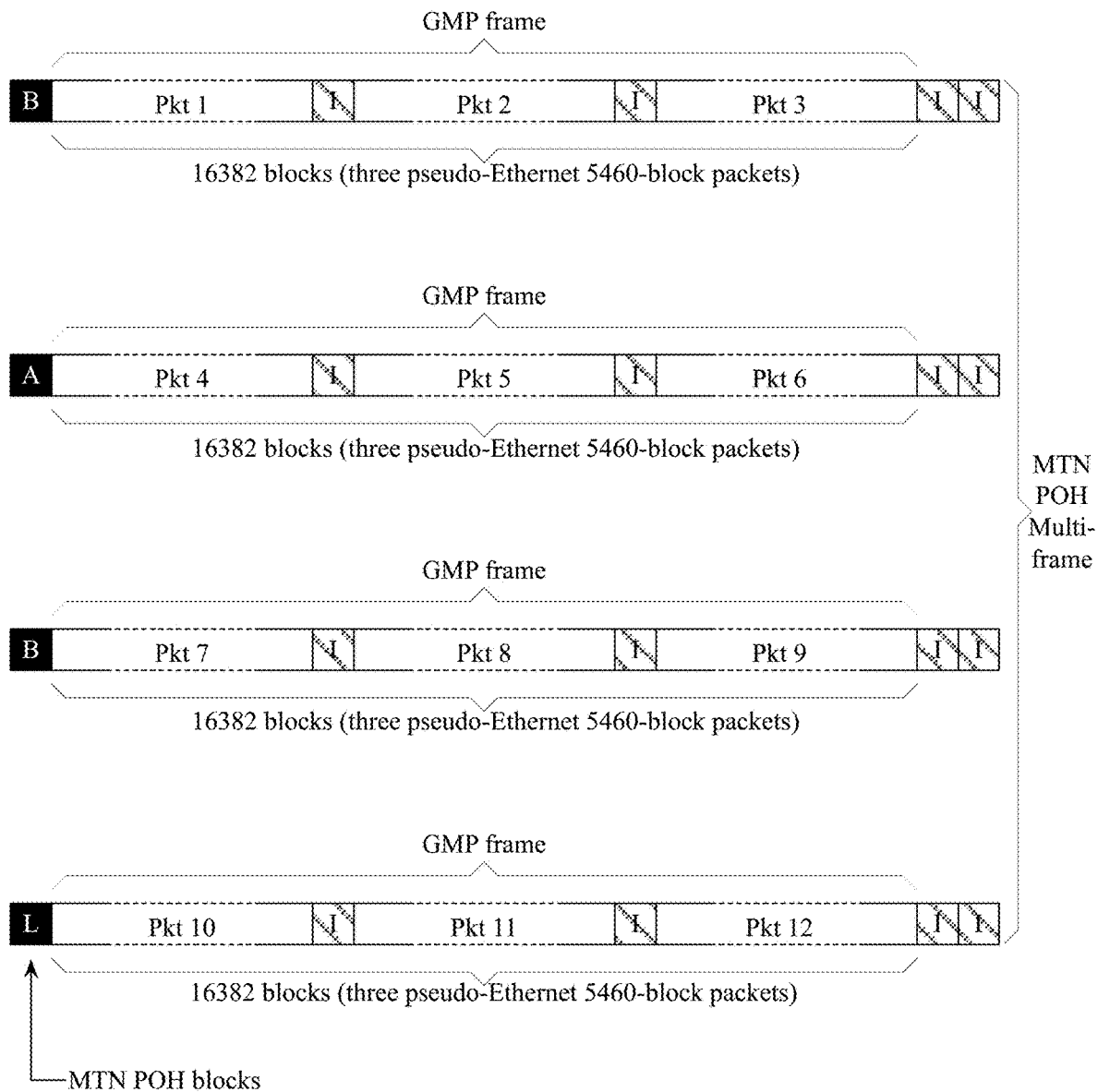
FIG. 5B illustrates an example of three pseudo-Ethernet 5460-block packets.

As shown in FIG. 5A, choosing to fill 16380 of the 64B/66B blocks with pseudo-Ethernet packets of length 2730 64B/66B blocks leaves 4 64B/66B blocks in which the source node can insert idle blocks, which covers the required $(16384) \times (200 \times 10^{-6}) = 3.3$ block rate difference in the case where the source clock is a full 200 ppm faster than the sink node or an intermediate node. Since $16380 = 4 \times 9 \times 5 \times 7 \times 13$, it is possible to divide 16380 of the 64B/66B blocks into either three 5460-block packets, as shown in FIG. 5B, or six 2730-block packets as shown in FIG. 5A, giving the desired integer number of GMP frames. Since MTN nodes switch streams of 64B/66B blocks, they do not buffer entire Ethernet packets, and hence are largely independent of Ethernet packet length. While 5460-block packets are more efficient, 2730-block packets may be preferred for compatibility with existing MTN implementations. Note that in FIG. 5A-FIG. 5C, the location of the idle blocks in the stream of GMP frames is not intended to be limiting. The source node provides the sink node with adequate knowledge of the number of idle blocks that have been inserted into an interval of the stream of GMP frames. In one example, the interval may be an MTN POH frame, as shown in FIG. 5A.

Figure 5C:
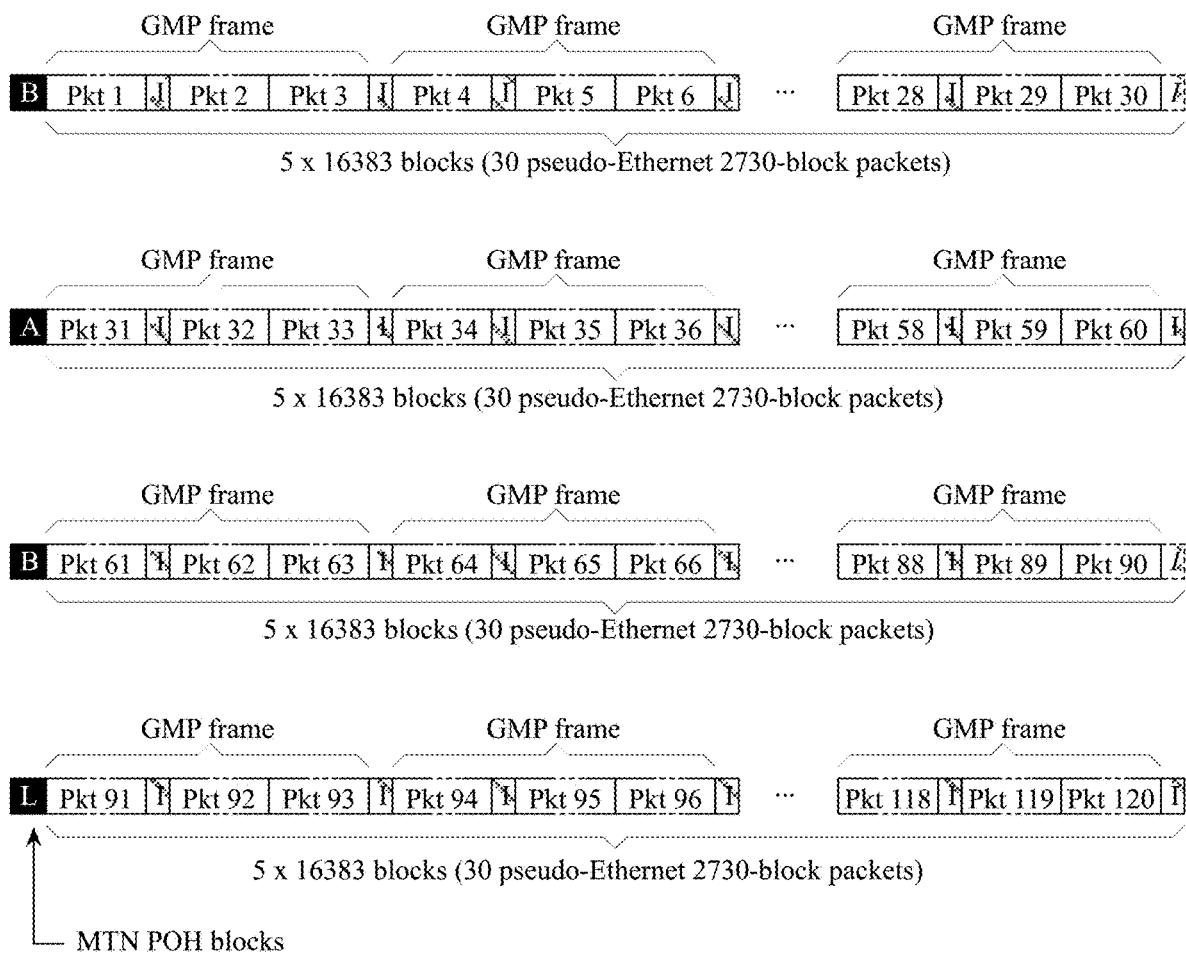
FIG. 5C illustrates an example of thirty pseudo-Ethernet 2730-block packets, resulting from six packets per calendar slot in an MTN section layer consisting of five calendar slots.
Figure 6A:
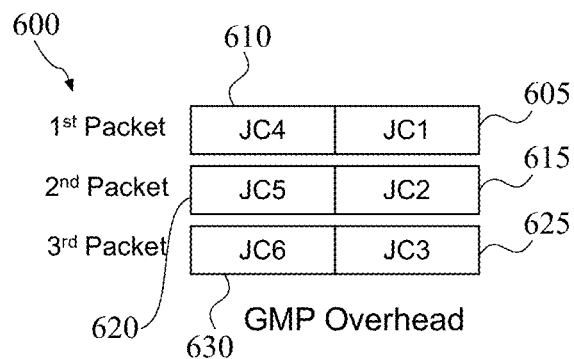
FIG. 6A illustrates an example of JC1-JC6 in the GMP overhead.
Figure 6B:
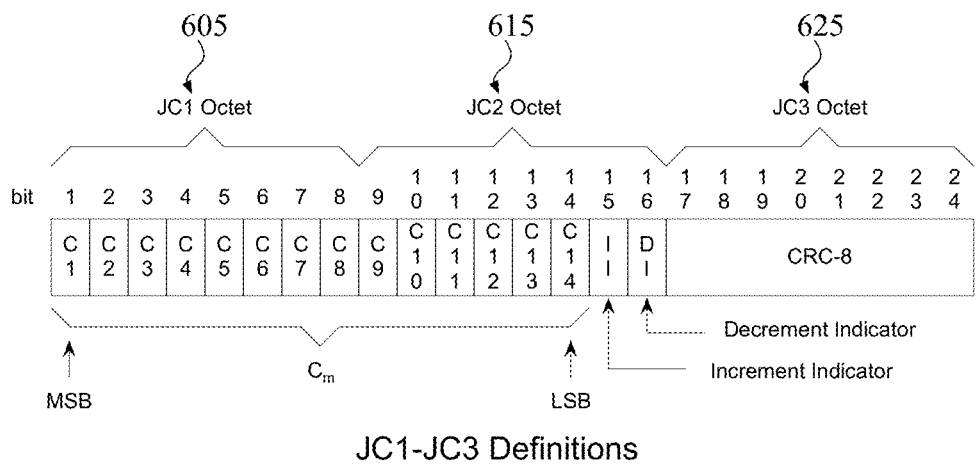
FIG. 6B illustrates an example of the JC1-JC3 definitions within the GMP overhead.
Figure 6C:
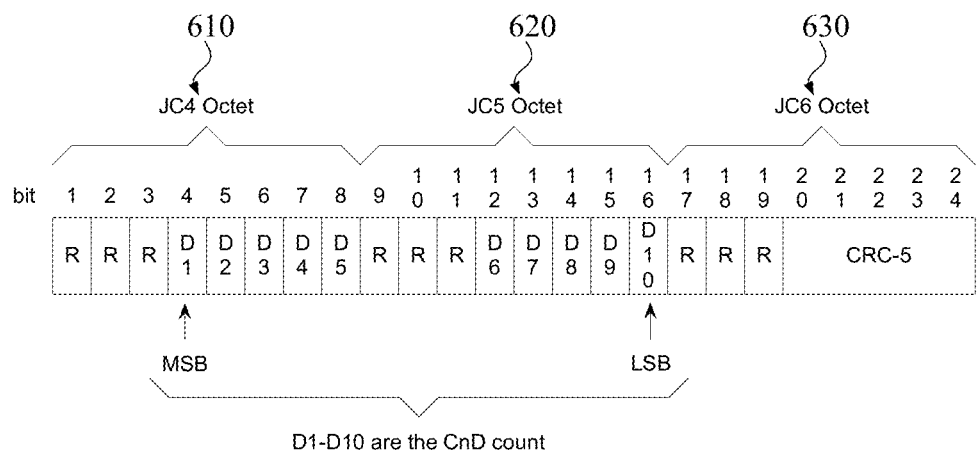
FIG. 6C illustrates an example of the JC4-JC6 definitions within the GMP overhead.

As shown in FIG. 6A, GMP overhead 600 is typically divided into three segments (JC1 605+JC4 610, JC2 615+JC5 620 and JC3 625+JC6 630), which are sufficiently separated to avoid error bursts impacting more than one segment. Consequently, as illustrated in FIG. 6B and FIG. 6C, a GMP frame consisting of a 3-packet group is created, with each packet of the group carrying one segment of the GMP overhead. The payload areas of the 3-packet group are treated by GMP as a single combined payload area. Specifically, the GMP fields of each GMP frame communicate how many 64B/66B blocks within the payload area of the next 3-packet group GMP frame will carry client data. The 6-byte GMP overhead format is illustrated in FIG. 6A and FIG. 6B, wherein three rows of the GMP overhead are placed into the/T/ block of three consecutive packets, i.e., JC1 605 and JC4 610 are placed in respective first packets, JC2 615 and JC5 620 are placed in respective second packets, and JC3 625 and JC6 630 are placed in respective third packets, which respective first, second and third packets constitute a respective GMP frame. The fields labeled "R" indicate a reserved field, such as a bit, byte, set of bytes or a data block that is reserved for potential future use. Unlike ITU-T G.709, which relies on a section layer framing pattern and fixed spacing for finding the GMP overhead, the present examples use the MTN POH frame to periodically identify the beginning of the GMP frame that embodies a GMP window. As shown in FIGS. 5A-5C, the first packet after an MTN POH frame is the beginning of a GMP frame. Referring back to FIG. 1, the source node 105 uses the identification of the beginning of the GMP frame to align the plurality of GMP frames with the MTN path overhead (POH) frame by inserting an MTN path overhead (POH) frame that is aligned to the beginning of the GMP frames to generate a stream of rate adapted GMP frames at 135.

Figure 7A:
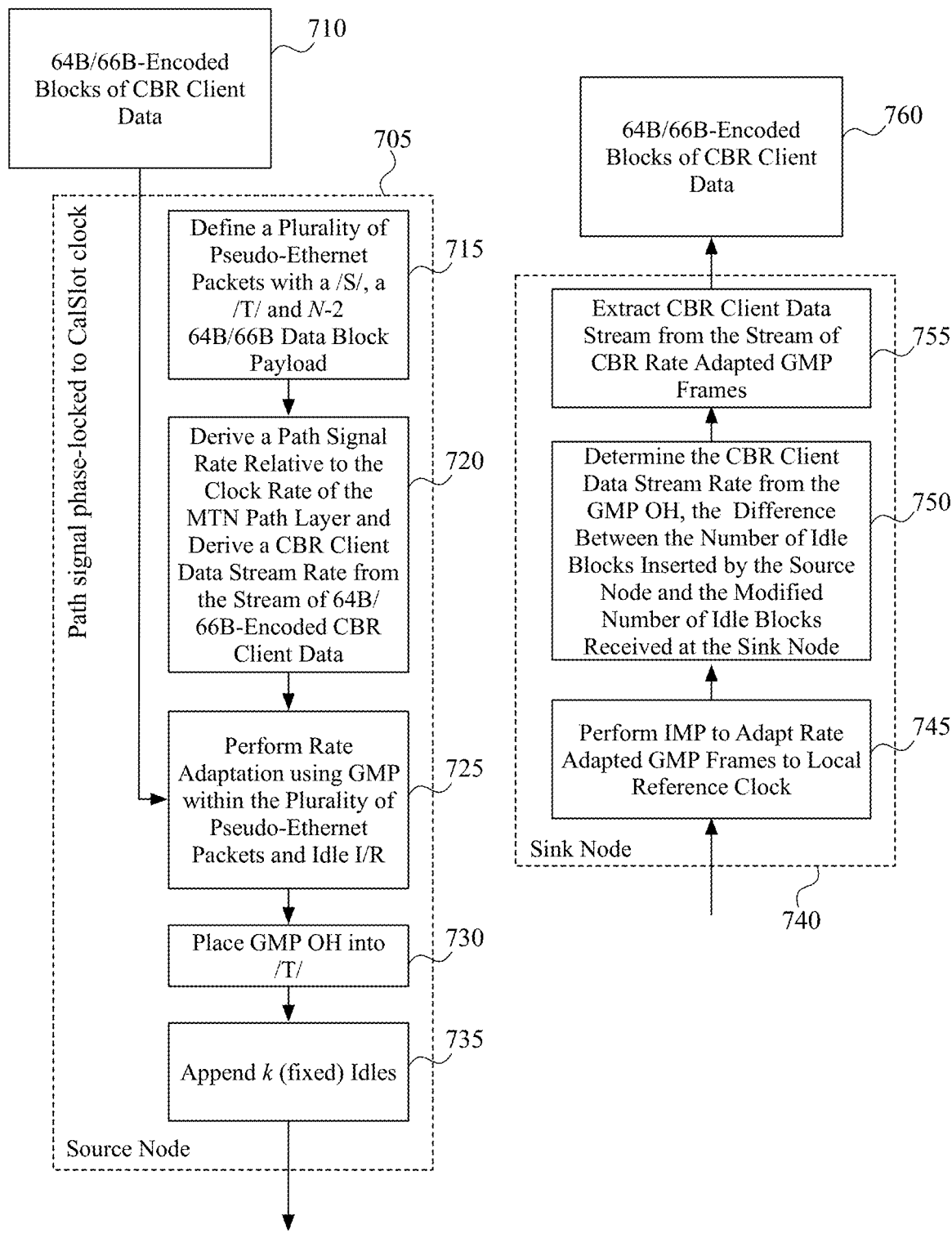
FIG. 7A illustrates an example of functional blocks for the source node and the sink node in a first option for performing rate adaptation.
Figure 8A:
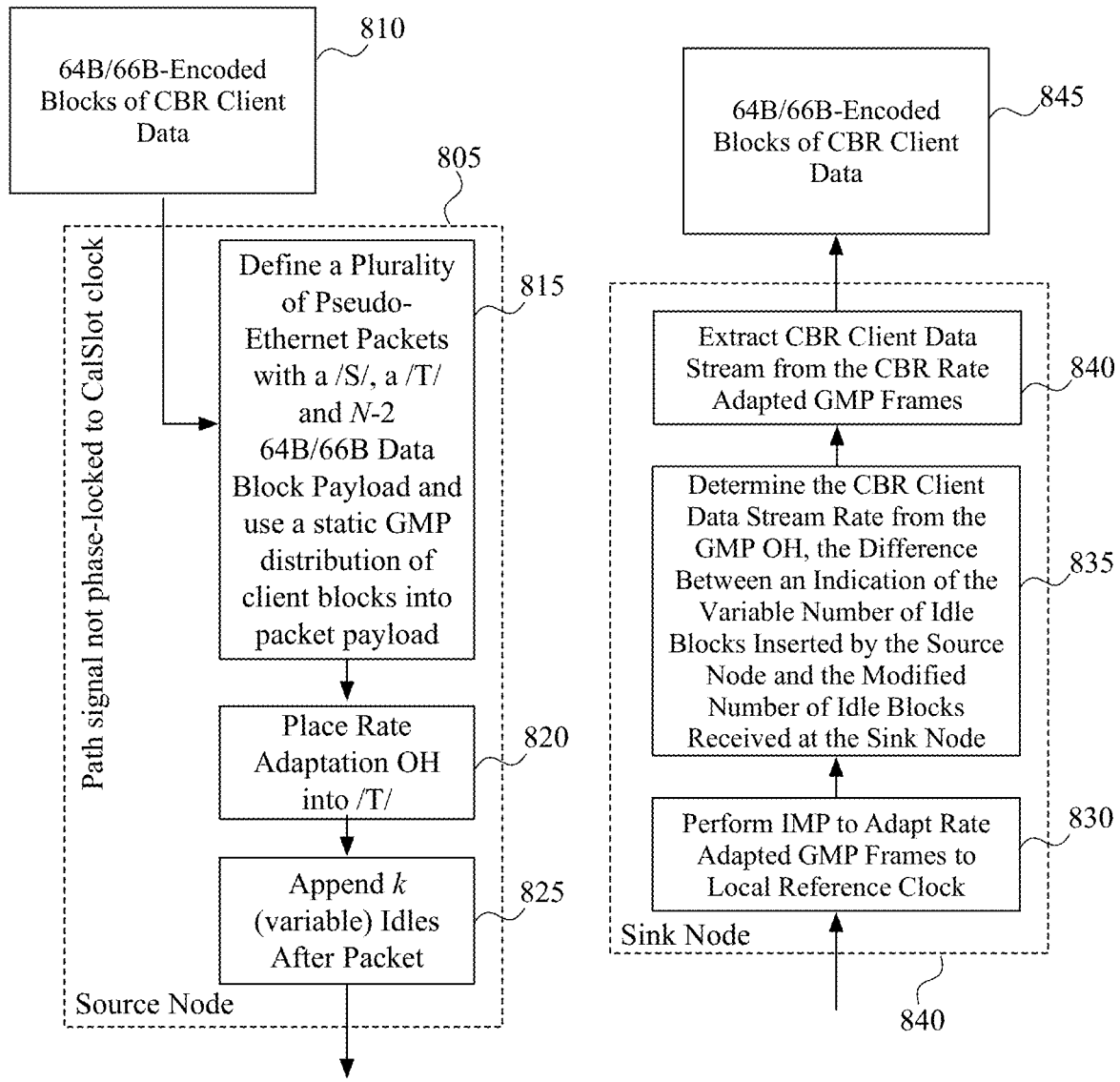
FIG. 8A illustrates an example of functional blocks for the source node and the sink node in a second option for performing rate adaptation.

A more detailed explanation for performing the rate adaptation using GMP within the plurality of pseudo-Ethernet packets and idle block insertion, as performed by the source node 105 of FIG. 1, is provided with reference to the two different options illustrated in FIG. 7A and FIG. 8A, respectively.

FIG. 7A illustrates a first option for implementing the combination of Generic Mapping Procedure (GMP) and Idle Mapping Procedure (IMP) and FIG. 8A illustrates a second option. In these two options, the clock source used to derive the path signal rate results in differences in the relative roles of the GMP and IMP. Both options use an integer number of groups of three fixed-length packets between MTN POH block positions.

In the option shown in FIG. 7A, the source node 705 receives a stream of 64B/66B-encoded blocks of CBR client data at 710. The source node 705 also defines a plurality of pseudo-Ethernet packets having a packet start control block (/S/), a packet termination control block (/T/) and N-2 64B/66B data block payload at 715. The source node 705 derives a MTN path signal rate relative to the reference clock rate at the source node 705 and derives a CBR client data stream rate from the received stream of 64B/66B-encoded blocks of CBR client data at 720. The GMP frame rate is set by the source node 705 such that transmitting the MTN path signal frame and a predetermined fixed number of idle characters per frame will fill the server channel bandwidth, on average. The idle insertion locations may vary between each MTN POH block, resulting in the average characters per frame to fill the server channel bandwidth. The source node 705 then performs rate adaptation using GMP within the plurality of pseudo-Ethernet Packets and idle I/R at 725. The source node performs GMP by mapping a variable number of blocks of the stream of 64B/66B-encoded blocks of CBR client data into consecutive pseudo-Ethernet packets and mapping a variable number of pad blocks into the consecutive pseudo-Ethernet packets at 725. Note that while GMP is described in terms of bytes, the CBR client data bytes and pad blocks are each preferably grouped into 64B/66B client data blocks and 64B/66B pad blocks, respectively, and inserted as blocks. The variable number of blocks of 64B/66B-encoded blocks of CBR client data and the variable number of pad blocks are based upon the path signal rate derived from the MTN path layer and the CBR client data stream rate. The source node 705 inserts an average of the variable number of blocks of 64B/66B-encoded blocks of CBR client data arriving during a number of previous GMP frame periods as GMP overhead (GMP OH) into the packet termination control block of a current GMP frame at 730 to generate a stream of GMP frames. The source node 705 then inserts a fixed number of idle blocks into the stream of GMP frames at 735 to generate a stream of CBR rate adapted GMP frames. The fixed number of idle blocks is selected as a minimum number of idle blocks needed by downstream IMP processes to accommodate the maximum 200 ppm clock offset between different FlexE clock domains. Inserting this minimum number of idle blocks improves the server channel bandwidth available for carrying the CBR client signal. The source node 705 then transmits the stream of CBR rate adapted GMP frames, including the number of idle blocks, over the MTN to one or more intermediate nodes, and eventually to a sink node 740.

When the stream of CBR rate adapted GMP frames are received at an intermediate node of the MTN, the intermediate node performs idle mapping procedure (IMP) rate adaptation of the stream of CBR rate adapted GMP frames to modify the number of idle blocks within the stream of CBR rate adapted GMP frames and then transmits the stream of CBR rate adapted GMP frames having the modified number of idle blocks to a next node of the MTN, which may be another intermediate node or a sink node. Persons of ordinary skill in the art will appreciate that the intermediate node may be configured and provided in a conventional manner. As described above, the intermediate node inserts or deletes 64B/66B idle blocks to synchronize the data flow timing between its input and output rates without regard to the contents of the 64B/66B blocks of CBR client data and 64B/66B POH blocks.

Figure 9:
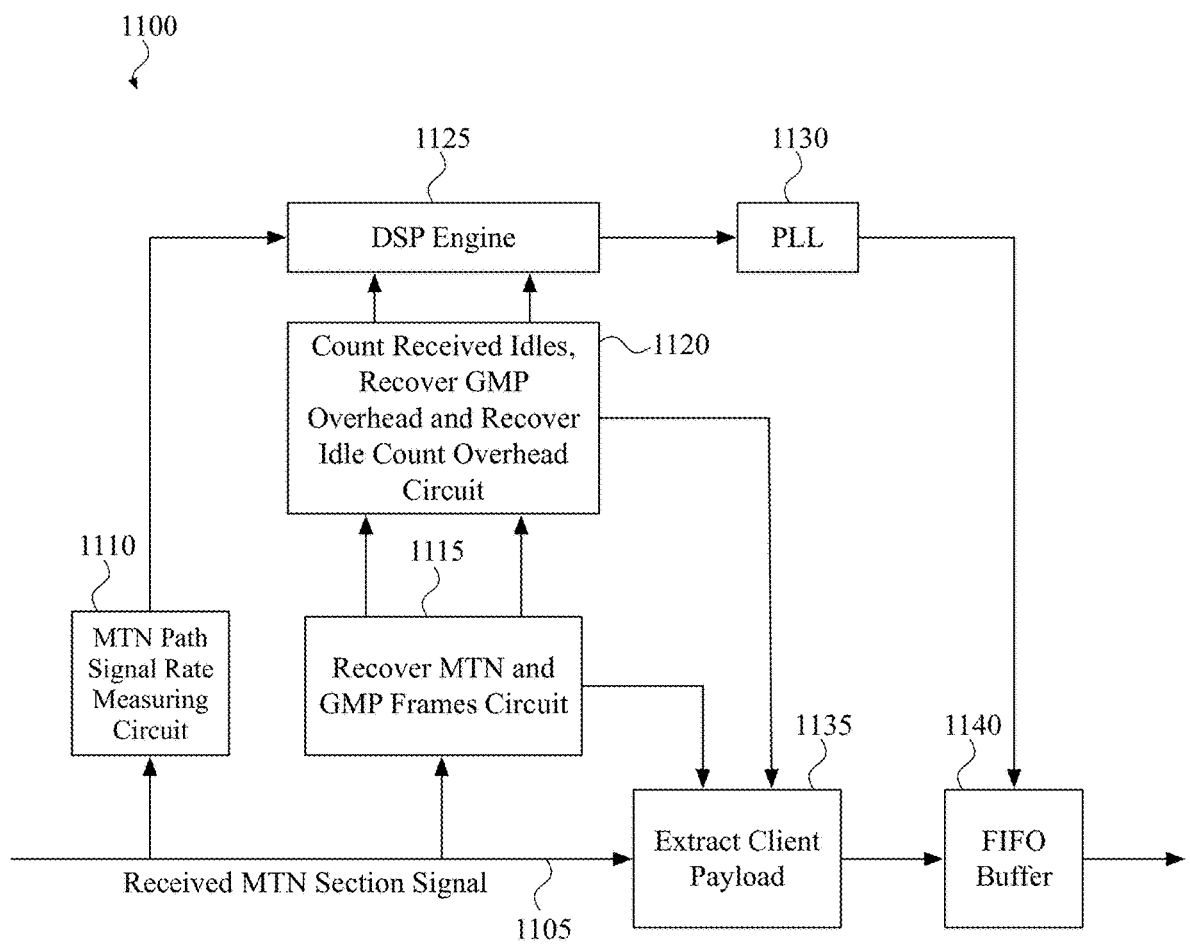
FIG. 9 illustrates an example block diagram of a sink node for implementation with either the first option of FIG. 7A or the second option of FIG. 8A.

When the sink node 740 receives the stream of CBR rate adapted GMP frames having the modified number of idle blocks from the intermediate node over the MTN, at 745, the sink node 740 performs IMP to adapt the stream of CBR rate adapted GMP frames to a local reference clock at the sink node 740. The sink node 740 then determines the CBR client data stream rate from the GMP overhead and the difference between the fixed number of idle blocks inserted by the source node, which is known in advance, and the modified number of idle blocks received at the sink node at 750. The sink node 740 then extracts the CBR client data stream from the stream of CBR rate adapted GMP frames using the determined CBR client data stream rate at 755 to recover the original 64B/66B encoded client signal 760. As such, the CBR client data stream transmitted over the MTN in the example shown in FIG. 7A is phase-locked to the Cal Slot clock by the source node 705 and the sink node 740 determines the original client signal data rate by examining a combination of the dynamic GMP overhead information and the average number of idle blocks it receives as compared to the known number inserted by the source node 705. The operation of a phase-locked loop (PLL), such as the PLL 1130 shown in FIG. 9, is an inherent part of clock recovery circuits, as known to one skilled in the art.

Figure 7B:
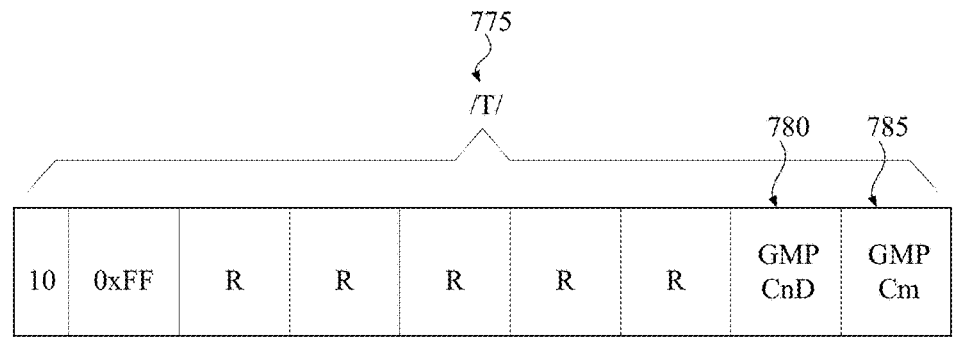
FIG. 7B illustrates an example termination control block /T/ in the GMP frame for the first option shown in FIG. 7A.

FIG. 7B illustrates an example packet termination control block (/T/) 775 of the stream of CBR rate adapted GMP frames generated by the source node 705 at 730 of FIG. 7A by placing the GMP overhead in the packet termination control block /T/. The GMP overhead of the packet termination control block 775 provides a count value (GMP Cm) 785 to notify the sink node 705 how many 64B/66B-encoded blocks of CBR client data the source node 705 will send in the next window and may indicate the number of bytes remaining in a buffer (GMP CnD) 780 at the source node 705. As such, the GMP overhead provides the beneficial feature of indicating the number of remaining bits or bytes in a buffer (CnD) at the source node 705 that could not be transmitted in the next frame due to being a fraction of a word or a 64B/66B-encoded block, respectively. This information provides the sink node 740 with higher precision (i.e., bit-level rather than character level) information about the CBR client data rate.

Figure 7C:
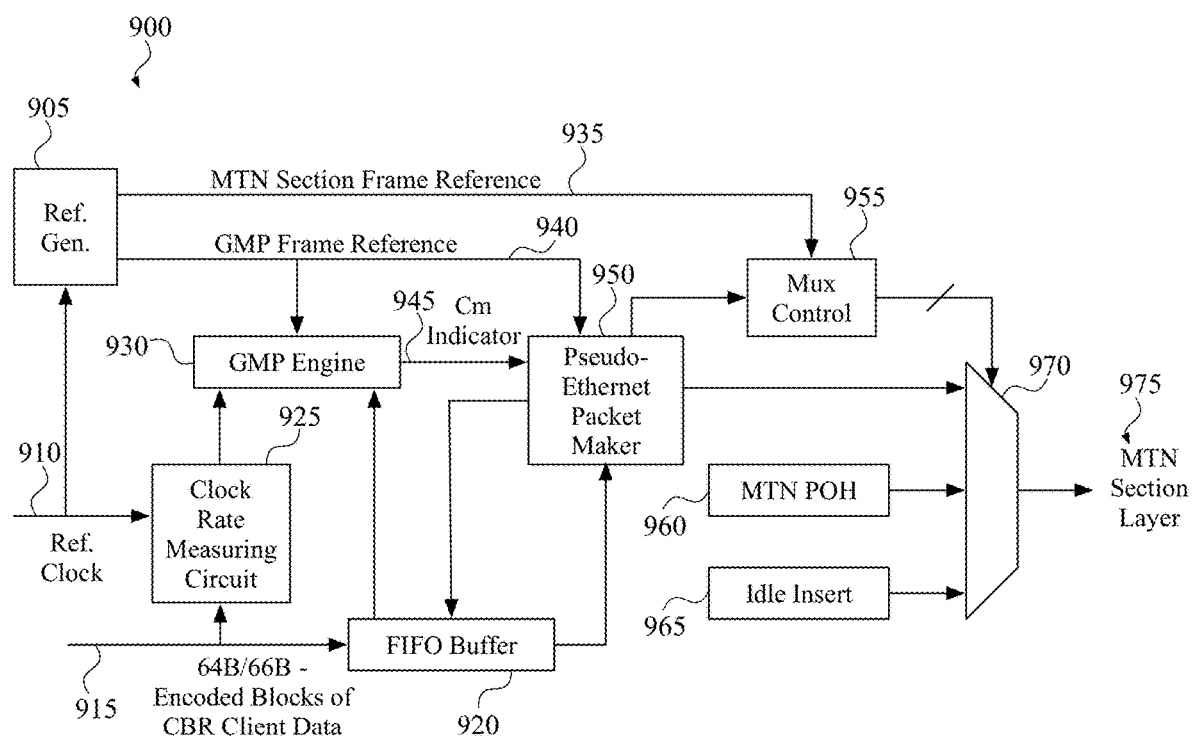
FIG. 7C illustrates an example block diagram of a source node for implementing the first option shown in FIG. 7A.

FIG. 7C provides a block diagram illustrating an example of a source node 900 in accordance with the first option described above, wherein a variable number of data bytes and pad blocks are mapped into consecutive pseudo-Ethernet packets to provide a stream of GMP frames and a fixed number of idle blocks are inserted into the stream of GMP frames. In this example the number of GMP pad blocks is varied to fill a GMP frame having a fixed period. If the 64B/66B-encoded client signal is slow, more pad blocks are added. If the 64B/66B-encoded client signal is fast, fewer pad blocks are added.

With reference to FIG. 7C, a GMP frame reference 940 and an MTN section frame reference 935 are generated by a reference generator 905 in response to a reference clock 910. The GMP frame reference 940 is provided to a GMP engine 930 and to a pseudo-Ethernet packet maker 950 of the source node 900. The reference clock 910 is also provided to a client rate measuring circuit 925, and is used by the client rate measuring circuit 925 to measure the clock rate of the received stream of 64B/66B encoded blocks of CBR client data 915 received at the source node 900 so as to derive the CBR client data stream rate from the received stream of 64B/66B encoded blocks of CBR client data 915. The received stream of 64B/66B encoded blocks of CBR client data 915 is provided to a first in first out (FIFO) buffer 920. The measured clock rate is provided by client rate measuring circuit 925 to the GMP engine 930. The GMP engine 930 utilizes the measured clock rate from the client rate measuring circuit 925 and the GMP frame reference 940 to determine the variable number of CBR client data 64B/66B encoded blocks and the variable number of pad blocks to be mapped into the consecutive pseudo-Ethernet packets. The GMP engine 930 provides an indicator of the variable number of CBR client data 64B/66B encoded blocks (Cm) 945 to the pseudo-Ethernet packet maker 950. The pseudo-Ethernet packet maker 950 defines the pseudo-Ethernet packets with a /S/, a /T/ and N-2 64B/66B data block payload based upon the Cm indicator 945 and inserts the number of CBR client data 64B/66B encoded blocks 915, with the Cm indicator 945 indicating the number of CBR client data 64B/66B encoded blocks 915, provided by the FIFO buffer 920 in response to a read signal from the pseudo-Ethernet packet maker 950, into the pseudo-Ethernet packets to generate a stream of GMP frames 952. The pseudo-Ethernet packet maker 950 provides the pseudo-Ethernet packets to a multiplexer 970, which is controlled by a multiplexer controller 955. The multiplexer controller 955 is controlled by pseudo-Ethernet packet maker 950 and the MTN section frame reference 935 to direct the multiplexer 970 to select among the pseudo-Ethernet packets from the pseudo-Ethernet packet maker 950, the POH blocks from the MTN POH 960 and the idle blocks from the idle insert 965 to perform rate adaptation by inserting a fixed number of idle blocks into the stream of GMP frames 952 to generate the stream of CBR rate adapted GMP frames. The output of the multiplexer 970 is provided to the MTN section layer 975.

As shown in FIG. 7A, FIG. 7B and FIG. 7C, in the first option for implementing GMP and IMP, the number of CBR client data 64B/66B encoded blocks mapped into consecutive pseudo-Ethernet packets is variable and the number of pad blocks mapped into the consecutive pseudo-Ethernet packets is variable, wherein the variable number of CBR client data 64B/66B encoded blocks and the variable number of pad blocks are based on the MTN and the CBR client data stream rate. Additionally, the number of idle blocks inserted into the stream of GMP frames is fixed when implementing this option.

Figure 7D:
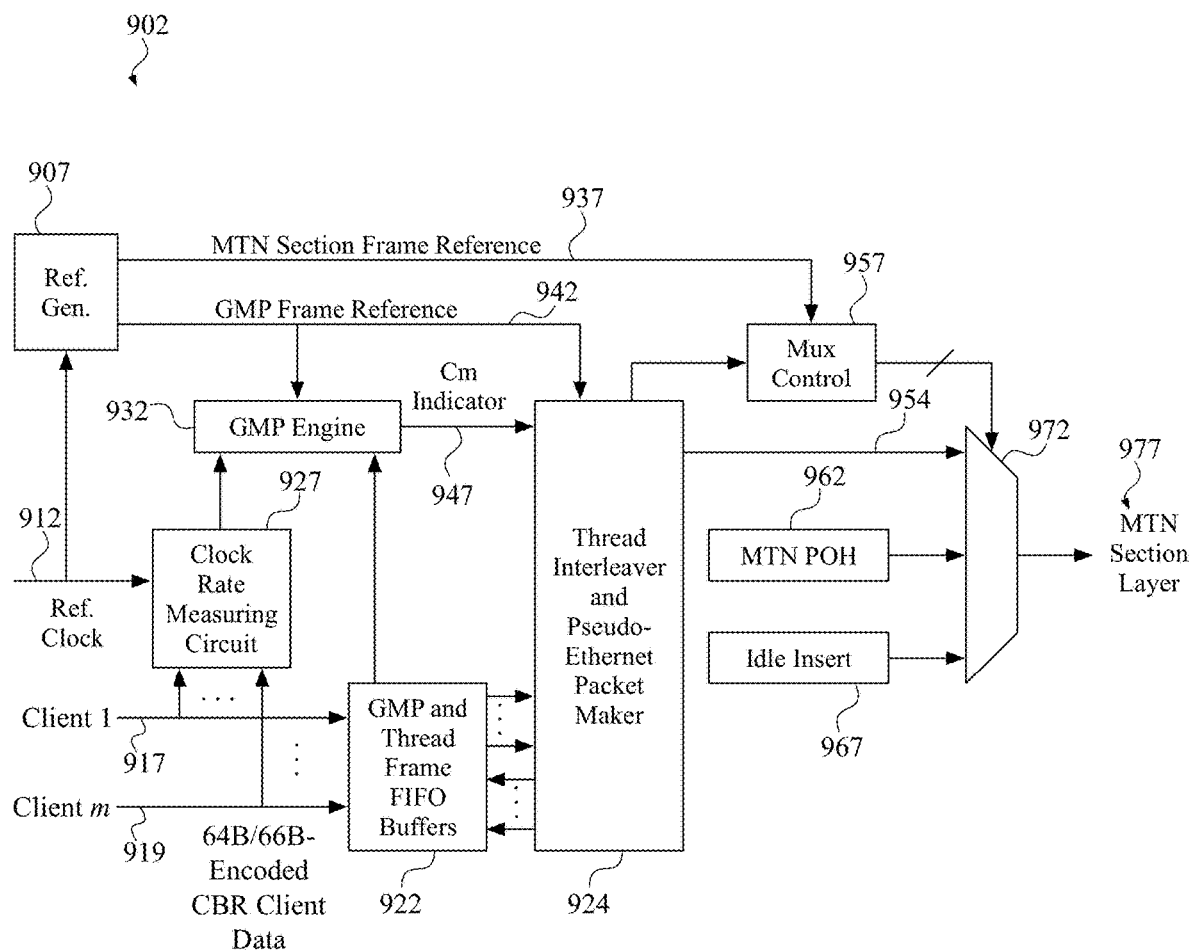
FIG. 7D illustrates an example block diagram of a source node for implementing the first option shown in FIG. 7A and which additionally provides for multiplexing of the 64B/66B-encoded blocks of CBR client data streams.

FIG. 7D provides a block diagram illustrating an example of a source node 902 in accordance with the first option described above which additionally provides for multiplexing of the 64B/66B-encoded blocks of CBR client data by multiplexing lower rate client data into pseudo-Ethernet packets after MTN mapping has been performed.

With reference to FIG. 7D, a GMP frame reference 942 and an MTN section frame reference 937 are generated by a reference generator 907 in response to a reference clock 912. The GMP frame reference 942 is provided to a GMP engine 932 and to a thread interleaver and pseudo-Ethernet packet maker 924 of the source node 902. The reference clock 912 is also provided to a client rate measuring circuit 927 and is used by the client rate measuring circuit 927 to measure the clock rate of the received streams of 64B/66B-encoded blocks of CBR client data 917, 919 received at the source node 902 so as to derive the CBR client data stream rate from the received streams of 64B/66B-encoded blocks of CBR client data 917, 919. The received streams of 64B/66B-encoded blocks of CBR client data 917, 919 are provided to a GMP Thread Frame first in first out (FIFO) buffers 922. GMP is performed on the streams 917, 919 by the GMP and thread frame FIFO buffers 922 to define a plurality of GMP thread frames for each of the streams 917, 919 and the plurality of GMP thread frames are buffered by the FIFO buffers of the GMP and thread frame FIFO buffers 922. Each of the plurality of GMP thread frames comprise a variable number of encoded blocks of CBR client data and a variable number of pad blocks and GMP OH, as determined by the Cm indicator 947, as has been previously described. The buffered GMP thread frames are then provided from the GMP and thread frame FIFO buffers 922 to a thread interleaver and pseudo-Ethernet packet maker 924 in response to read signals from the from the thread interleaver and pseudo-Ethernet packet maker 924 to the GMP and thread frame FIFO buffers 922. The thread interleaver and pseudo-Ethernet packet maker 925 then maps the GMP thread frames into a plurality of consecutive pseudo-Ethernet packets comprising a plurality of data payload blocks that are divided into the plurality of interleaved threads and the plurality of GMP OH data payload blocks. The pseudo-Ethernet packets are then assembled into a stream of GMP multiplexing frames 954 by thread interleaver and pseudo-Ethernet packet maker 924. The measured clock rate is provided by client rate measuring circuit 927 to the GMP engine 932. The GMP engine 932 utilizes the measured clock rate from the client rate measuring circuit 927 and the GMP frame reference 942 to determine the variable number of CBR client data 64B/66B encoded blocks and the variable number of pad blocks to be mapped into the consecutive pseudo-Ethernet packets by GMP and Thread Frame FIFO buffers 922. The GMP engine 932 provides an indicator of the variable number of CBR client data 64B/66B encoded blocks (Cm) 947 to the thread interleaver and pseudo-Ethernet packet maker 924. The thread interleaver and pseudo-Ethernet packet maker 924 defines the pseudo-Ethernet packets with a /S/, a /T/ and N-2 64B/66B data block payload based upon the Cm indicator 947. The thread interleaver and pseudo-Ethernet packet maker issues read signals to the GMP and thread frame FIFP buffers 922 to provide the 64B/66B-encoded CBR client data blocks and inserts the number of 64B/66B-encoded CBR client data blocks 926 indicated by Cm 947, provided by the GMP engine 932, into the pseudo-Ethernet packets to generate a stream of GMP multiplexing frames 954. The thread interleaver and pseudo-Ethernet packet maker 924 provides the stream of GMP multiplexing frames 954 to a multiplexer 972, which is controlled by a multiplexer controller 957. The multiplexer controller 957 is controlled by thread interleaver and pseudo-Ethernet packet maker 924 and the MTN section frame reference 937 to direct the multiplexer 972 to select among the GMP multiplexing frames 954, the POH blocks from the MTN POH 962 and the idle blocks from the idle insert 967 to perform rate adaptation by inserting a fixed number of idle blocks between the pseudo-Ethernet packets of the GMP multiplexing frames 954 to generate the stream of rate adapted GMP multiplexing frames. The output of the multiplexer 972 is provided to the MTN section layer 977.

The second option for implementing the combination of GMP and IMP is shown in FIG. 8A, wherein the source node 805 derives the MTN path signal rate (i.e., Cal Slot rate) from the CBR client data stream rate. In the second option, a predetermined fixed GMP Cm (or defined repeating pattern of Cm values) is used to create a packet stream that does not completely fill the space between MTN POH blocks so as to create a stream of CBR rate adapted GMP frames that is slightly slower than the nominal server channel rate. In this option, GMP provides a smooth delivery of payload CBR client data 64B/66B encoded blocks with the path frame payload at a fixed rate per path frame.

In the option shown in FIG. 8A, the source node 805 receives a stream of 64B/66B-encoded blocks of CBR client data at 810. The source node 805 defines a plurality of pseudo-Ethernet empty packets having a packet start control block (/S/), a packet termination control block (/T/) and a data block payload at 815. In this option, the data block payload 815 has a fixed capacity of N-2 64B/66B data blocks. A fixed, i.e., static, GMP distribution of 64B/66B-encoded blocks of CBR client data and a fixed GMP distribution of pad blocks in the packet payload are implemented to generate a stream of GMP frames. The source node 805 places an indication of the fixed number of data blocks into the GMP overhead, referred to as rate adaptation OH, into the packet termination control block /T/ at 820. The indication of the fixed number of data blocks is optional because the fixed number is known to the source node 805 and the sink node 840. The source node 805 then inserts a variable (k) number of idle blocks into the stream of GMP frames at 825 to generate a stream of CBR rate adapted GMP frames. The source node 805 inserts the variable number of idle blocks in order to fill the remaining channel bandwidth. An indication of the variable number of idle blocks is placed in the rate adaptation overhead at 820 to notify the sink node of the number of idle blocks inserted by the source node. Alternately, the indication of the variable number of idle blocks placed in the idle count overhead 890 may be a running number of idle blocks inserted by the source node since an arbitrary start time (i.e., T=0) with modulo rollover. With this alternative, the sink node determines the number of idle blocks inserted by the source node in an interval by comparing the indication of the variable number of idle blocks in a currently received idle count overhead with the indication of the variable number of idle blocks in a previously received Idle Count overhead. The indication of the number of idle blocks inserted by the source node placed in the idle count overhead may optionally include the fractional portion of the next idle blocks to be sent. The fractional portion of the next idle blocks indicates that the source has some remaining bandwidth to fill, but the bandwidth is not sufficient for inserting another idle block at that point. The idle fraction count information provides the receiver with increased understanding of the source idle insertion rate. The source node 805 then transmits the stream of CBR rate adapted GMP frames over the MTN to one or more intermediate nodes, and eventually to a sink node 840.

When the stream of CBR rate adapted GMP frames are received at an intermediate node of the MTN, the intermediate node performs idle mapping procedure (IMP) rate adaptation of the stream of CBR rate adapted GMP frames to modify the number of idle blocks in the stream of CBR rate adapted GMP frames and then transmits the stream of CBR rate adapted GMP frames having the modified number of idle blocks to a next node of the MTN, which may be another intermediate node or a sink node. The change in number of idle blocks is however not placed in the Idle Count overhead and does not replace the indication of the number of idle blocks inserted by source node 805.

When the sink node 840 receives the stream of CBR rate adapted GMP frames having the modified number of idle blocks over the MTN, at 830, the sink node 840 performs IMP to adapt the stream of CBR rate adapted GMP frames to a local reference clock at the sink node 840. At 835, the sink node 840 then determines the CBR client data stream rate of the CBR client stream from the GMP overhead and a difference between an indication of the variable number of idle blocks inserted into the stream of CBR rate adapted GMP frames by the source node 805 and the modified number of idle blocks received at the sink node 840. The sink node 840 then extracts the CBR client data stream from the stream of CBR rate adapted GMP frames using the determined CBR client data stream rate at 845 to recover the original 64B/66B encoded blocks of CBR client data 850. As such, the CBR client data stream transmitted over the MTN in the example shown in FIG. 8A is not phase-locked to the Cal Slot bitrate and the sink node 840 determines the original CBR client data rate based on the number of idle blocks remaining after the IMP process at the sink node 840 and optionally, the idle count information inserted by the source node 805. The Cal Slot clock is a divide down of the local reference clock at the sink node.

Figure 8B:
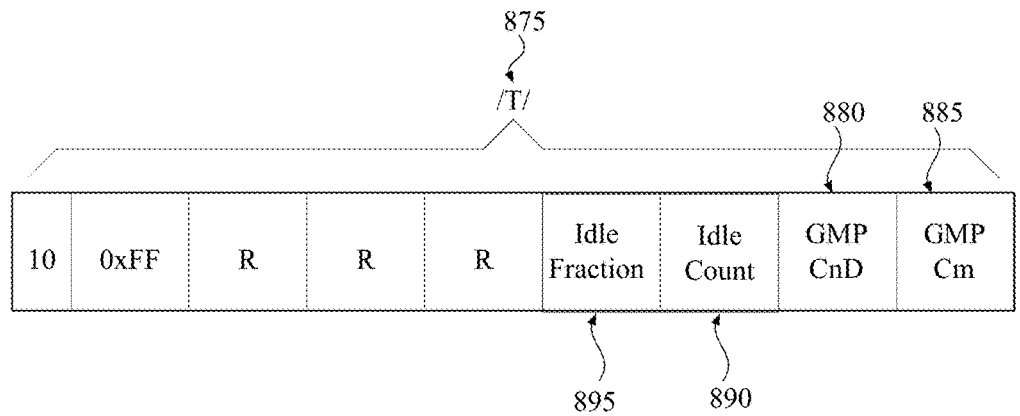
FIG. 8B illustrates an example termination control block /T/ in the GMP frame for the second option shown in FIG. 8A.

FIG. 8B illustrates an exemplary packet termination control block (/T/) 875 of the CBR rate adapted GMP frames generated by the source node 805 at 820 of FIG. 8A by placing the GMP OH 880, 885 and idle count overhead 890 in the packet termination control block/T. Alternatively, the GMP overhead of the termination control block 875 may provide a count value (GMP Cm) 885 to notify the sink node 840 how many 64B/66B-encoded blocks the source node 805 will send in the next window and may indicate the number of bytes remaining in the buffer (GMP CnD) 880 at the source node 805. Since these values (Cm and CnD) are predetermined and fixed it is optional to insert them into the GMP overhead. The packet termination control block 875 additionally includes an idle count 890 of the variable number of idle blocks inserted by the source node 805 and, optionally, a count of the fractional amount of an idle to be sent in a next frame 895 by the source node 805.

Figure 8C:
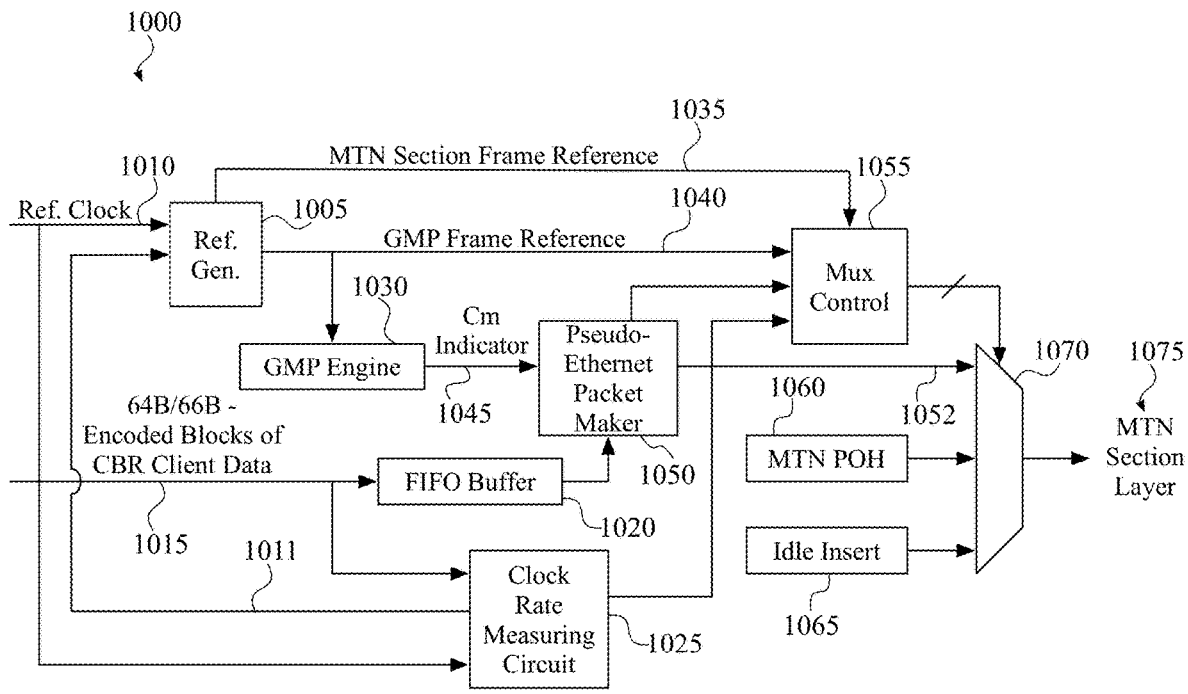
FIG. 8C illustrates an example block diagram of a source node for implementing the second option shown in FIG. 8A.

FIG. 8C provides a block diagram illustrating an example of a source node 1000 in accordance with the second option described above, wherein a fixed number of data blocks and pad blocks are mapped into consecutive pseudo-Ethernet packets to generate a stream of GMP frames and a variable number of idle blocks are inserted into the stream of GMP frames. In this option, the faster the client rate, the less time it will take to accumulate the payload 64B/66B client data blocks within a GMP frame. The slower the client rate, the longer it will take to accumulate the payload data 64B/66B client data blocks within a GMP frame. Thus, the period of the GMP frame is determined by the bit rate of the incoming 64B/66B-encoded blocks of CBR client data 1015.

With reference to FIG. 8C, an output 1011 of a client rate measuring circuit 1025 is used to clock a reference generator 1005. The reference generator 1005 generates an MTN section frame reference 1035 using the reference clock 1010 and generates a GMP frame reference 1040 using the output 1011 from the client rate measuring circuit 1025. The GMP frame reference 1040 is provided to a GMP engine 1030. The client rate measuring circuit 1025 is used to measure the clock rate of the 64B/66B-encoded blocks of CBR client data 1015 received at the source node 1000, with 64B/66B-encoded blocks of CBR client data 1015 is provided to the client rate measuring circuit 1025 and to a FIFO buffer 1020, to derive the CBR client data stream rate from the received 64B/66B-encoded blocks of CBR client data 1015. In this example, the measured clock rate may not be provided to the GMP engine 1030 and the GMP engine 1030 is considered to be a free-running GMP engine with no external time alignment. The GMP engine 1030 utilizes the GMP frame reference 1040 to determine the location of the fixed number of 64B/66B client data blocks 1015 to be mapped into the consecutive pseudo-Ethernet packets. The GMP engine 1030 provides an indicator of the fixed number of CBR client data blocks (Cm) 1045 to a pseudo-Ethernet packet maker 1050. The pseudo-Ethernet packet maker 1050 defines the pseudo-Ethernet packets with a /S/, a /T/ and N-2 64B/66B data block payload based upon the Cm indicator 1045 and inserts a number of CBR client data blocks 1015 based on the Cm indicator 1045, provided by the FIFO buffer 1020, into the pseudo-Ethernet packets to generate a stream of GMP frames 1052. The pseudo-Ethernet packet maker 1050 provides the stream of GMP frames 1052 to the multiplexer 1070. A multiplexer controller 1055 receives the output 1052 of pseudo-Ethernet packet maker 1050, the GMP frame reference 1040, the MTN section frame reference 1035, and the measured clock rate from the client rate measuring circuit 1025, and responsive to those inputs directs the multiplexer 1070 to select among the stream of GMP frames 1052 from the pseudo-Ethernet packet maker 1050, the POH blocks from the MTN POH 1060 and the idle blocks from the idle insert 1065 to perform rate adaptation by inserting a variable number of idle blocks into the stream of GMP frames 1052 to generate the stream of CBR rate adapted GMP frames. The multiplexer controller 1055 utilizes the MTN section frame reference 1035 to determine which input to multiplexer 1070 will appear at its output for each block. The output of the multiplexer 1070 is provided to the MTN section layer 1075.

The CBR client data stream rate affects the number of idle blocks that will be inserted into the stream of GMP frames to generate the stream of CBR rate adapted GMP frames. For example, if the 64B/66B-encoded blocks of CBR client data is fast, each GMP frame will be assembled in a shorter period of time. As such, there will be more GMP frames per second to accommodate the greater number of CBR client bits in each second. Since the MTN path POH is being used to delimit the GMP frames, the MTN path will be faster to match the CBR client stream data rate and there will be more MTN POH 1060 needed per second. However, since the MTN frame section is running at the rate of the reference clock 1010 and there are more MTN POH blocks per second, there will be fewer idle blocks from idle insert 1065 needed to fill up the MTN section. Conversely, if the 64B/66B-encoded blocks of CBR client data is slow, there will be fewer GMP frames per second. The MTN path is correspondingly slower, leading to fewer MTN POH 1060 needed per second. More idle blocks from idle insert 1065 are then needed to fill up the space in the MTN section. The number of idles to be inserted is reported on 1035 for inclusion in the Idle Count overhead 890 and the Idle Fraction 895 of FIG. 8B.

As shown in FIG. 8A, FIG. 8B and FIG. 8C, in the second option for implementing GMP and IMP the number of CBR client data blocks mapped into consecutive pseudo-Ethernet packets is fixed, the number of pad blocks mapped into the consecutive pseudo-Ethernet packets is fixed and the number of idle blocks inserted into the stream of GMP frames is variable when implementing this option.

In summary, in the first option, the GMP frame rate is determined by the reference clock at the source node, while in the second option, the GMP frame rate is determined by the CBR client signal rate. Consequently, in the first option, the number of idles sent by source is fixed, while in the second option, the number of idles is variable.

In the first option, the GMP frame rate is fixed and is determined by the reference clock at the source. The CBR client data stream rate is variable, and as such, the number of pad blocks inserted into the GMP frames is variable. When the CBR client data stream rate is slow, more pad blocks are inserted and when the CBR client data stream rate is fast, fewer pad blocks are necessary. In the first option, since the MTN path signal rate (i.e., the Cal Slot rate) and the GMP frame rate are both referenced to the same reference clock, the number of idle blocks inserted into the stream of GMP frames is fixed.

In the second option, the GMP frame rate is an inflated version of the CBR client data stream rate. For example, GMP frame rate=(client signal rate)*(66/64)*(total number of blocks in the GMP frame that carry client data)/(total number of blocks in the GMP frame). The GMP frame rate is a constant multiple of the CBR client data stream rate, because the number of pad blocks is fixed. Thus, the GMP frame rate is variable because the CBR client data stream rate is variable. Since the MTN path signal rate is fixed, the number of idle blocks inserted into the stream of GMP frames is variable. An indicator of the number of idle blocks inserted is inserted into the stream of GMP frames to communicate the variable number of idle blocks to the sink node.

FIG. 9 is a block diagram illustrating an example of a sink node (740 of FIG. 7A or 840 of FIG. 8A) in accordance with either of the first or second options described above to receive the stream of CBR rate adapted GMP frames generated by the source nodes in FIG. 7C and/or FIG. 8C. The received MTN section signal 1105 carries the stream of CBR rate adapted GMP frames. The MTN and GMP frames are recovered from the stream of CBR rate adapted GMP frames by the recover MTN and GMP frames circuit 1115 and provided to the count received idles, recover GMP overhead and recover Idle count overhead circuit 1120. When the number of idle blocks inserted into the stream of CBR rate adapted GMP frames by the source node is fixed, as in the first option described with reference to FIG. 7A-FIG. 7C, the fixed number of idle blocks is known to the sink node. Alternatively, in the second option described with reference to FIG. 8A-FIG. 8C, the variable number of idle blocks inserted by the source node is reported in the overhead. The actual number of idle blocks received at a sink node is a combination of the number of idle blocks inserted by the source node, modified by the intermediate nodes performing IMP. The MTN path signal rate measuring circuit 1110 receives the incoming MTN section signal and measures the MTN Path signal bitrate. This measured bitrate is scaled by the DSP engine 1125 to recover the client payload data rate, as a function of the number of received idle blocks, the idle count recovered from the idle count overhead and the value of Cm:CnD recovered from the GMP overhead, by circuit 1120. Using the Cm value from circuit 1120, extract client payload block 1135 identifies the payload and pad blocks within the GMP frames. The pad blocks and idle blocks are discarded while the client payload bits from 64B/66B data blocks are written into the FIFO buffer 1140. The phase locked loop (PLL) 1130 is controlled by the DSP engine 1125 to read from the FIFO buffer 1140 at the CBR client data stream rate.

In summary, the first option provides for potential clock recovery performance increase enabled by variable GMP with CnD and the possibility of multiplexing lower rate clients, which will be discussed in more detail below. The main advantage of the second option is that the use of a static GMP simplifies both the source node and the sink node by using a single process rather than using both GMP and IMP.

The first option provides a method for carrying a single CBR client data stream within one of more 5 Gbit/s MTN section layer calendar slots. However, there are applications where it is desirable to carry multiple different lower rate CBR client data streams within a single calendar slot. In order to carry multiple different lower rate CBR client data streams within a single calendar slot, multiplexing capabilities are added to the first option.

The first option for the source node utilizing a variable number of CBR client data blocks, a variable number of pad blocks per GMP frame and a fixed number of idle blocks within MTN Path signal, as described above, also allows the possibility of multiplexing multiple lower rate clients into each pseudo-Ethernet packet by dividing the packet payload data blocks into interleaved sets. The per-set GMP overhead can be carried in additional data blocks at the end of the packet. With this option, since GMP performs the rate adaptation, the number of idle blocks is independent of the multiplexed client streams and can remain fixed.

While it is known in the art to combine lower rate clients into 5 Gb/s MTN channels, the known methods perform multiplexing of the client signals prior to the MTN mapping. In contrast, the present examples provide for multiplexing lower rate client data into pseudo-Ethernet packets after MTN mapping has been performed, as illustrated with reference to the block diagram 1200 illustrated in FIG. 10.

In general, the multiplexing of multiple 64B/66B-encoded blocks of CBR client data streams 1205, 1210 is performed at a source node by respective GMP blocks 1225, 1230 to define a plurality of respective GMP thread frames 1235, 1240 for each of the streams of 64B/66B-encoded blocks of CBR client data, wherein each of the plurality of GMP thread frames 1235, 1240 comprises a variable number of encoded blocks of CBR client data and a variable number of pad blocks and GMP OH for a respective stream of 64B/66B-encoded blocks of CBR client data. Additionally, the thread interleaver and pseudo-Ethernet packet maker 1245 defines a plurality of pseudo-Ethernet packets, wherein each of the plurality of pseudo-Ethernet packets comprises a plurality of data payload blocks divided into a plurality of interleaved threads and a plurality of interleaved GMP overhead (OH) data payload blocks. In particular, each of the plurality of interleaved threads may include an integer number of data payload blocks. The variable number of encoded client data blocks and the variable number of pad blocks are then mapped into one of the plurality of interleaved threads of consecutive pseudo-Ethernet packets and the GMP OH is mapped into the plurality of interleaved GMP OH data payload blocks by thread interleaver and pseudo-Ethernet packet maker 1245. A stream of GMP multiplexing frames 1250 is then assembled by thread interleaver and pseudo-Ethernet packet maker 1245 comprising the consecutive pseudo-Ethernet packets. The stream of GMP multiplexing frames 1250 is then provided to IMP block 1255 which inserts a fixed number of idle blocks between the consecutive pseudo-Ethernet packets of the stream of GMP multiplexing frames and inserts an MTN path overhead (POH) frame that is aligned to the plurality of GMP multiplexing frames into the stream of GMP multiplexing frames 1250 to generate a stream of GMP multiplexing rate adapted frames. In particular, the 64B/66B-encoded blocks of CBR client threads 1235, 1240 may be mapped into the plurality of interleaved threads of the consecutive pseudo-Ethernet packets by the thread interleaver and pseudo-Ethernet packet maker 1245 in a round-robin manner.

Thus, multiple CBR client data streams can be multiplexed into each pseudo-Ethernet packet. In a particular example, the encoded blocks of a CBR client are mapped in a round-robin manner by thread interleaver and pseudo-Ethernet packet maker 1245 into the interleaved threads of the pseudo-Ethernet packets. Each interleaved thread is then treated as its own channel, including having its own GMP overhead. If a CBR client data stream occupies more than one thread, then the threads are combined to create a higher rate channel and a single block of GMP overhead is used for the multiple threads. As such, each thread provides a channel of less than 5 Gbit/s that can be time-division multiplexed together in the 5 Gbit/s calendar slot.

Figure 10:
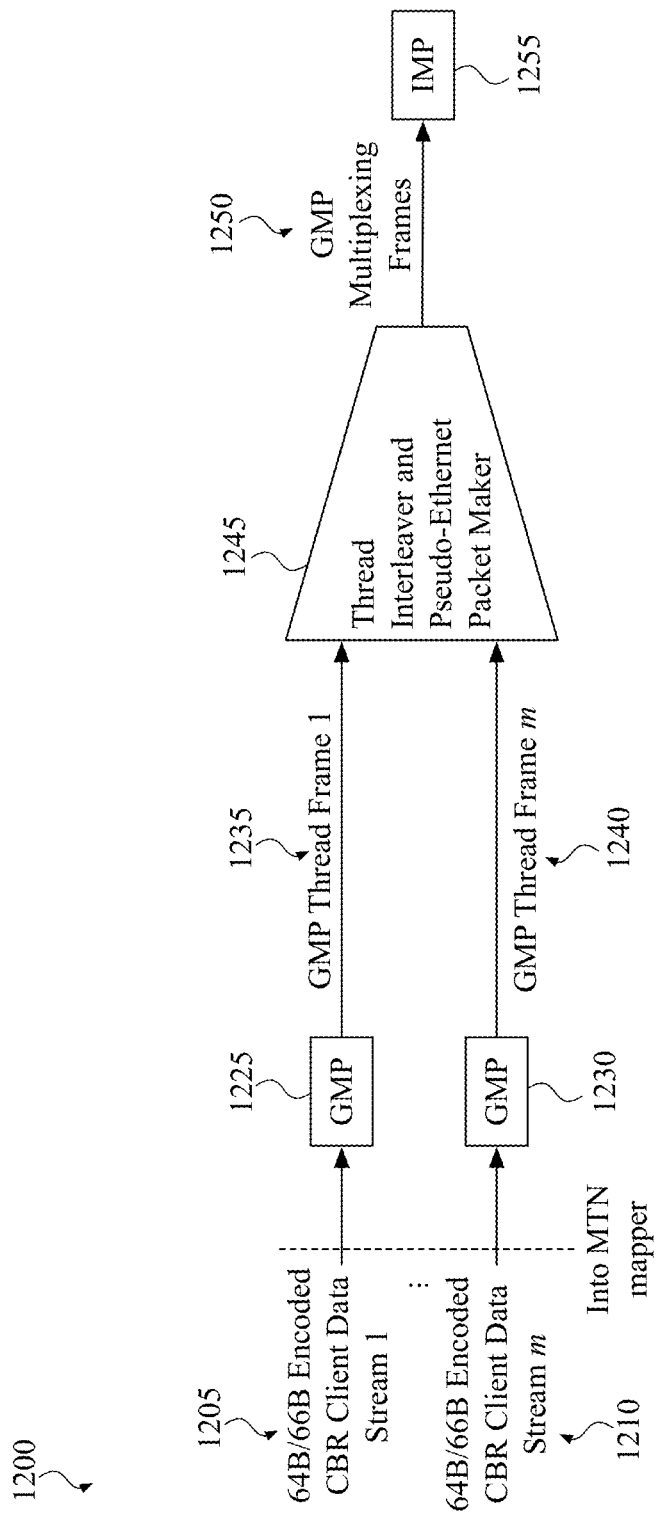
FIG. 10 illustrates an example block diagram of the circuitry in the source node for implementing multiplexing of two or more CBR client data streams.

The multiplexing method illustrated in FIG. 10 may be modified to be applicable to packet-based client data streams in addition to the 64B/66B-encoded CBR client data streams. In particular, if the 64B/66B-encoded CBR client data streams 1205, 1210 are instead packet-based client data streams, such as Ethernet-based streams, the packet-based client data streams are treated as a stream of bits and are encoded into a plurality of 64B/66B-encoded blocks. Once the packet-based client data streams have been encoded into 64B/66B-encoded blocks, the GMP and IMP blocks 1225, 1230 illustrated in FIG. 10 then provide an interleaved 64B/66B-encoded packet-based client data streams.

The multiplexing circuitry illustrated in FIG. 10 may be implemented in the source node 705, as shown in FIG. 7A-FIG. 7C. Multiplexing is for implementation with the first option described above because it uses GMP to perform the dynamic rate adaptation for each individual thread within the packets and IMP to perform rate adaptation at the packet level. Since the CBR client of each thread can have a different source clock, it may be more difficult to use IMP within the MTN Path stream for thread-level rate adaptation, as in the second option described above with reference to FIG. 8A-FIG. 8C.

Figure 11A:
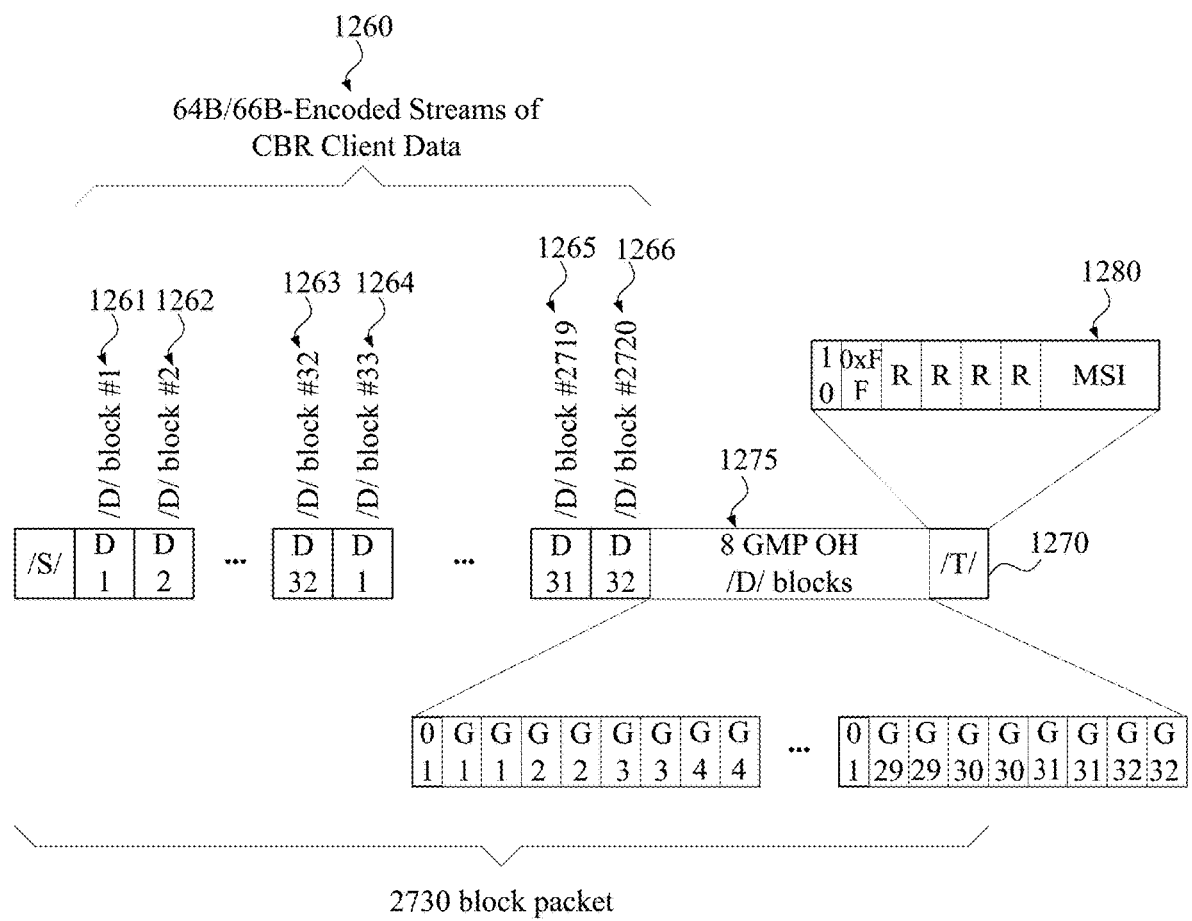
FIG. 11A illustrates an example multiplexed 2730 block packet for multiplexing multiple CBR clients.

An example of the multiplexing performed by the system 1200 shown in FIG. 10 is illustrated in FIG. 11A, wherein each thread 1261, 1262, 1263, 1264, 1265, 1266 of 64B/66B-encoded blocks of CBR client data 1260 has its own GMP overhead 1275 for rate adapting the CBR client data into the channel provided by that thread. This GMP overhead 1275 occupies one or more data block positions at the end of the pseudo-Ethernet packet. If a client occupies k threads, the GMP overhead of the highest thread number may be used, with a resulting GMP granularity of k blocks. As shown in FIG. 11A, in this case the termination control block /T/ 1270 at the end of the packets carries information other than GMP overhead, e.g., a multiplexing structure indicator field (MSI) 1280. The packet length of 2730 in this example is illustrative of an advantageous packet length when multiplexing is used, as illustrated in FIG. 13, and shown and described with reference to Table 1, below.

Figure 11B:
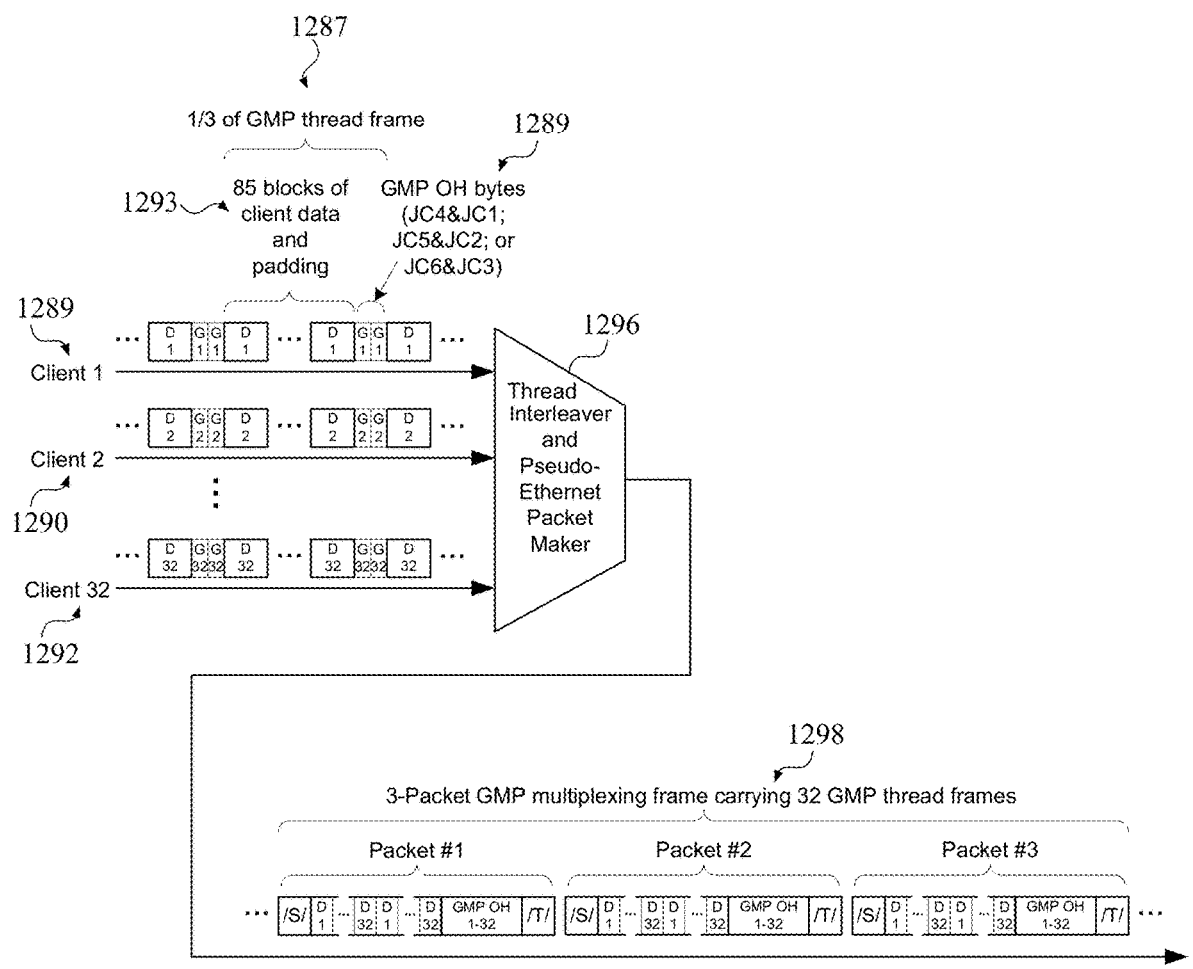
FIG. 11B illustrates an example of the positioning of the GMP thread frames in the MTN path GMP frame for multiplexed CBR clients.

FIG. 11B illustrates the positioning of the GMP thread frames in the MTN path GMP frame for multiplexed CBR clients. In particular, thread frames 1287 for the 64B/66B-encoded blocks of CBR client data 1289, 1290, 1292 are defined, comprising encoded blocks of client data and pad blocks 1293 and GMP OH 1289. The thread interleaver and pseudo-Ethernet packet 1296 maker defines a plurality of pseudo-Ethernet packets, wherein each of the plurality of pseudo-Ethernet packets comprises a plurality of data payload blocks divided into a plurality of interleaved threads and a plurality of interleaved GMP overhead (OH) data payload blocks. The variable number of encoded blocks and the variable number of pad blocks are then mapped into one of the plurality of interleaved threads of consecutive pseudo-Ethernet packets and the GMP OH is mapped into the plurality of interleaved GMP OH data payload blocks by thread interleaver and pseudo-Ethernet packet 1296. A stream of GMP multiplexing frames 1298 is then assembled by thread interleaver and pseudo-Ethernet packet 1296 comprising the consecutive pseudo-Ethernet packets. In this particular example, the stream of GMP multiplexing frames 1298 comprises 3 pseudo-Ethernet packets that carry 32 GMP thread frames.

Figure 12A:
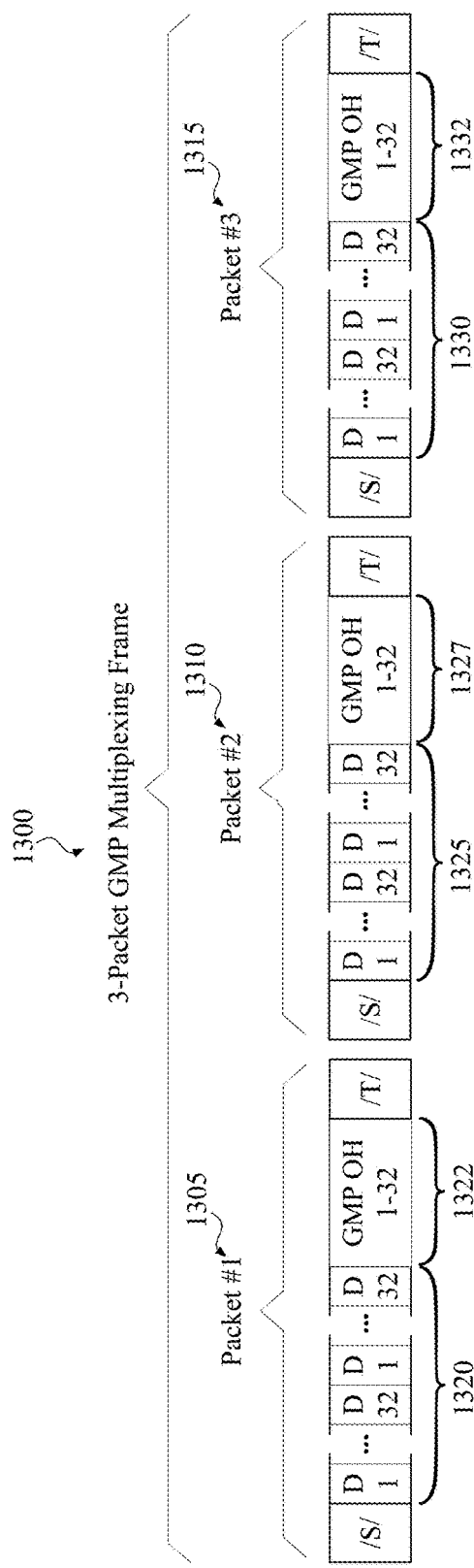
FIG. 12A illustrates an example of multiplexed threads within a single 3-packet GMP frame.
Figure 12B:
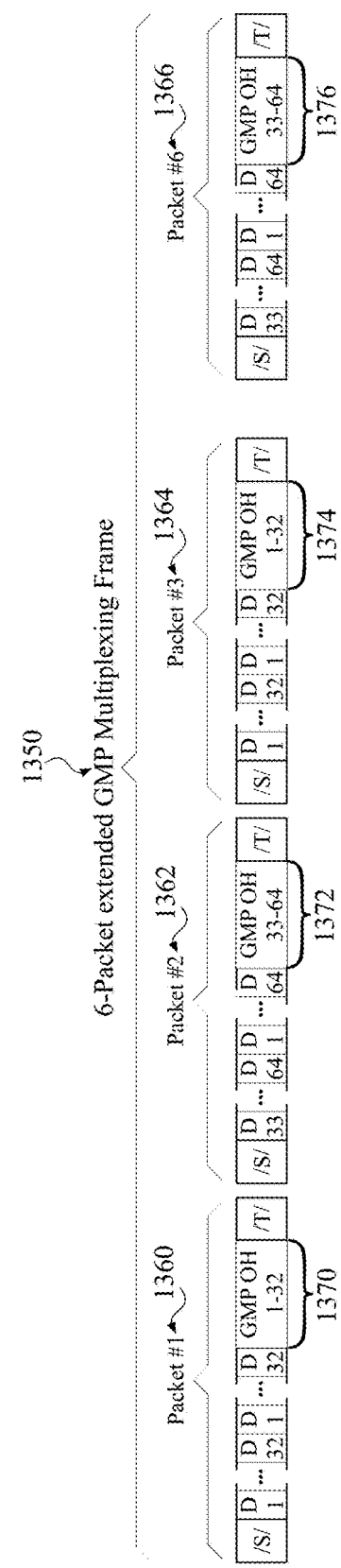
FIG. 12B illustrates an example of multiplexed threads spread across an extended GMP frame consisting of 3-packet groups.

When multiplexing is confined to a single 3-packet GMP frame 1300, as illustrated in FIG. 12A, the number of threads may be an integer divisor of the number of blocks in a pseudo-Ethernet packet available for carrying client payload so that each pseudo-Ethernet packet contains the same number of blocks per thread with each pseudo-Ethernet packet 1305, 1310, 1315 including GMP overhead 1322, 1327, 1332, respectively, for the payload blocks 1320, 1325, 1330. Consequently, the pseudo-Ethernet packet size 1305, 1310, 1315 is chosen such that the number of available payload blocks 1320, 1325, 1330 are factored into a convenient and efficient number of threads. The total number of threads can be multiplied by spreading them across multiple GMP frames to form an extended GMP frame, as illustrated in FIG. 12B. As shown in FIG. 12B, an extended GMP frame 1350 consisting of six pseudo-Ethernet packets (i.e., a set of two 3-packet GMP frames) 1360, 1362, 1364 . . . 1366 to double the number of available threads while still using the same number of GMP overhead bytes 1370, 1372, 1374 . . . 1376 per pseudo-Ethernet packet 1360, 1362, 1364 . . . 1366. Specifically, FIG. 12B uses the same example pseudo-Ethernet packet format as FIG. 11A and FIG. 11B. FIG. 12A provides per-packet GMP overhead fields for 32 threads. FIG. 12B illustrates extending the GMP Multiplexing frame to six packets in order to accommodate 64 threads. Since an MTN multiframe 1380 can consist of 24 pseudo-Ethernet packets, as illustrated in FIG. 13, it may be convenient to combine up to eight sets of GMP frames 1382, 1384, 1386, 1388, 1390, 1392, 1394, 1396 into an extended GMP frame to provide eight times as many threads.

Table 1 illustrates some potential advantageous choices for pseudo-Ethernet packet sizes and numbers of threads in both GMP frames and extended GMP frames. Note that it's possible to divide the 5 Gb/s section calendar slots into four sets of interleaved individual 1.25 Gb/s calendar slots and run the MTN path signal at the corresponding ¼ rate. Table 1 illustrates the resulting thread rates for both calendar slot rates. Note that the thread payload rates in Table 1 are the channel capacity for carrying a client data stream in the 64-bit payload field of the associated 64B/66B blocks. Option A in Table 1 is attractive for three reasons. First, it provides 32 threads. As a power of 2, 32 is consistent with other multiplexing channelization using power of 2 for implementation convenience. Second, its 155.622 Mbit/s capacity is efficient for carrying legacy 155.52 Mb/s SDH VC-4/STM-1 client signals. Third, the resulting packets are of 2730-block length which allows for the insertion of the minimum number of idle blocks to cover the 200 ppm potential clock offset, as shown in FIG. 13. As such, it makes efficient use of the available MTN frame bandwidth. Option B of Table 1 preserves these features but has four times as many threads at exactly ¼ the rate of Option A. Option C of Table 1 uses slightly less efficient 2695-block pseudo-Ethernet packets and a less convenient number of threads. However, Option C is well suited for carrying Ethernet client signals. For example, a 100MBASE-R Ethernet client data using native 4B/5B block coding can be efficiently carried in a 131.82 Mb/s channel created from six threads for the 5 Gb/s calendar slot case or 24 threads for the 1.25 Gb/s calendar slot case. Three threads of the 1.25 Gb/s calendar slot case can be combined into a 16.478 Mb/s channel for efficient transport of a 10MBASE-R Ethernet client data, also assuming the client uses 4B/5B block coding. Note that FIG. 13 uses the 2730-block packet size of Option A and Option B in Table 1.

TABLE 1

Potential Thread Multiplexing Configurations

| Option | Packet Size (blocks) | Packet Payload Size (blocks) | Packets per GMP frame | Number of Threads | GMP OH inst. per packet | Blocks per GMP OH | GMP JC1-JC3 OH bits per packet [1] | Total GMP OH size per packet [2] | Thread payload rate (Mbits/s) with 5 Gb/s Cal. | Thread payload rate (Mbits/s) with 1.25 Gb/s Cal. |
|---|---|---|---|---|---|---|---|---|---|---|
| A | 2730 | 2720 = 32 × 5 × 17 | 3 | 32 | 32 | 85 | 144-256 | 7-8 | 155.6224 | 38.9056 |
| B | 2730 | 2720 = 32 × 5 × 17 | 24 | 256 | 32 | 85 | 144-256 | 7-8 | 19.4528 | 4.8632 |
| C | 2695 | 2688 = $2^7 × 3 × 7$ = 4 × 7 × 96 | 24 | 224 | 28 | 96 | 126-224 | 6-7 | 21.9702 | 5.4926 |

Notes:
[1] The number of GMP JC1-JC3 bits depends on the Cm size that is chosen or whether an entire byte is always dedicated to the JC1-JC3 fields.
[2] It is assumed that a whole byte will be dedicated to the JC4-JC6 CnD field.

If the MTN path signal occupies k calendar slots of the MTN section, there will be k times as many pseudo-Ethernet packets between MTN POH blocks. Rather than increasing the thread rate by a factor of k, the GMP overhead can be spread over k interleaved GMP multiplexing frames, such that the thread rate remains the same regardless of the value of k.

Figure 14A:
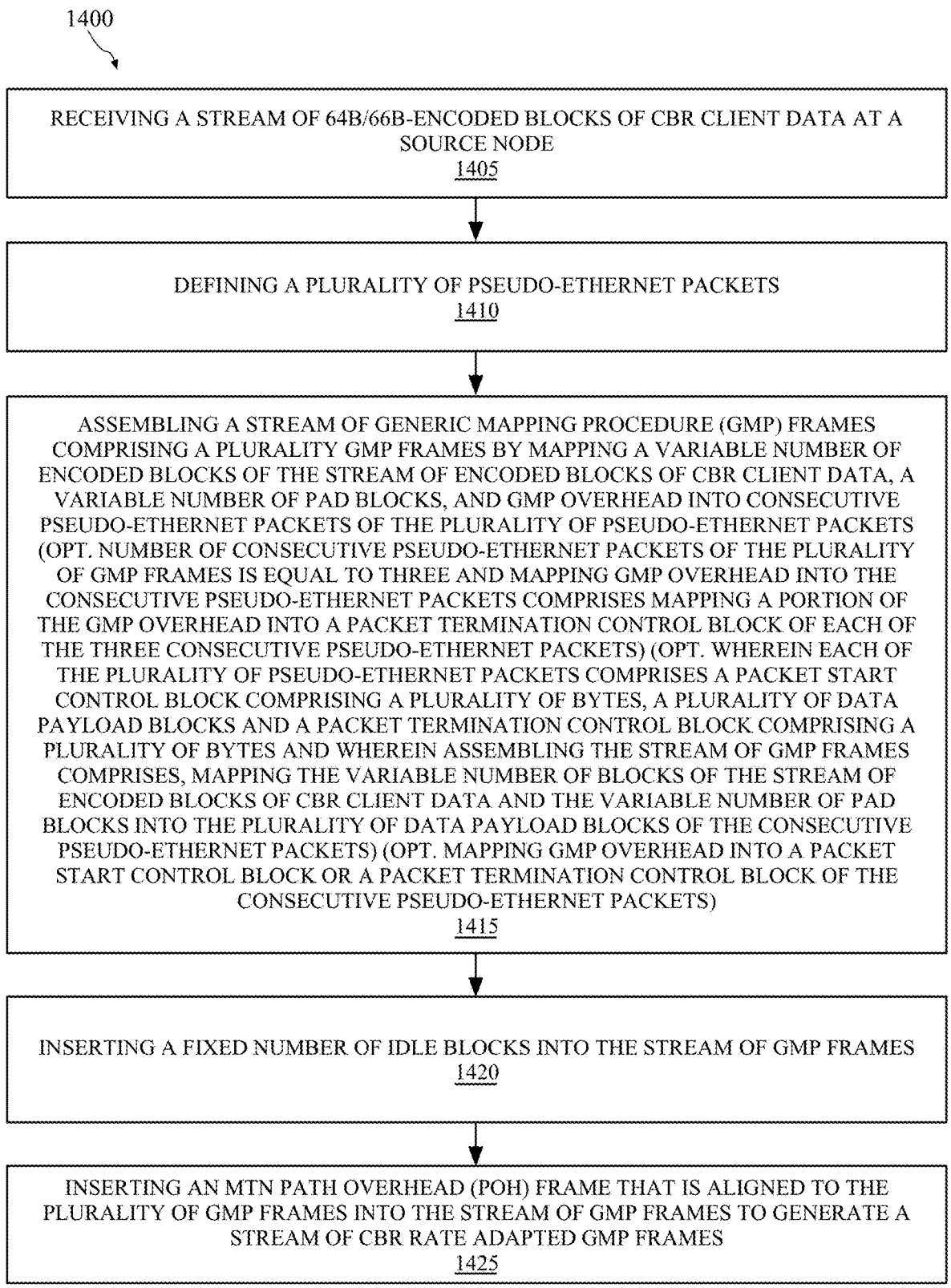
FIG. 14A is an example flow diagram illustrating a method performed by a source node in accordance with the first option of FIG. 7A for performing rate adaptation of CBR client data for transmission over an MTN.

FIG. 14A illustrates a flow diagram 1400 of a method for performing rate adaptation of constant bit rate (CBR) client data stream for transmission over a Metro Transport Network (MTN). The method 1400 is performed by a source node as illustrated in FIG. 7A.

The method 1400 begins at operation 1405 by receiving a stream of 64B/66B-encoded blocks of CBR client data at a source node.

At operation 1410, the method 1400 continues by defining a plurality of pseudo-Ethernet packets. In particular, at operation 1410 the source node creates a plurality of pseudo-Ethernet empty packets having a packet start control block (/S/), a packet termination control block (/T/) and fixed payload capacity of N-2 64B/66B data blocks. The method continues at 1415 by assembling a stream of Generic Mapping Procedure (GMP) frames comprising a plurality of GMP frames by mapping a variable number of blocks of the stream of 64B/66B-encoded blocks of CBR client data, a variable number of pad blocks, and GMP overhead into consecutive pseudo-Ethernet packets of the plurality of pseudo-Ethernet packets. In a specific example, the number of consecutive pseudo-Ethernet packets of the plurality of GMP frames is equal to three, and mapping GMP overhead into the consecutive pseudo-Ethernet packets may comprise mapping a portion of the GMP overhead into a packet termination control block or a packet start control block of each of the three consecutive pseudo-Ethernet packets. In another example, each of the plurality of pseudo-Ethernet packets comprises a packet start control block comprising a plurality of bytes, a plurality of data payload blocks and a packet termination control block comprising a plurality of bytes and assembling the plurality of GMP frames comprises, mapping the variable number of blocks of the stream of 64B/66B-encoded blocks of CBR client data and the variable number of pad blocks into the plurality of data payload blocks of the consecutive pseudo-Ethernet packets. The GMP overhead may be mapped into the packet start control block or the packet termination control block of the consecutive pseudo-Ethernet packets.

At operation 1420, the method 1400 continues by inserting a fixed number of idle blocks into the stream of GMP frames and the method 1400 concludes at operation 1425 by inserting an MTN path overhead (POH) frame that is aligned to the plurality of GMP frames into the stream of GMP frames to generate a stream of CBR rate adapted GMP frames.

Figure 14B:
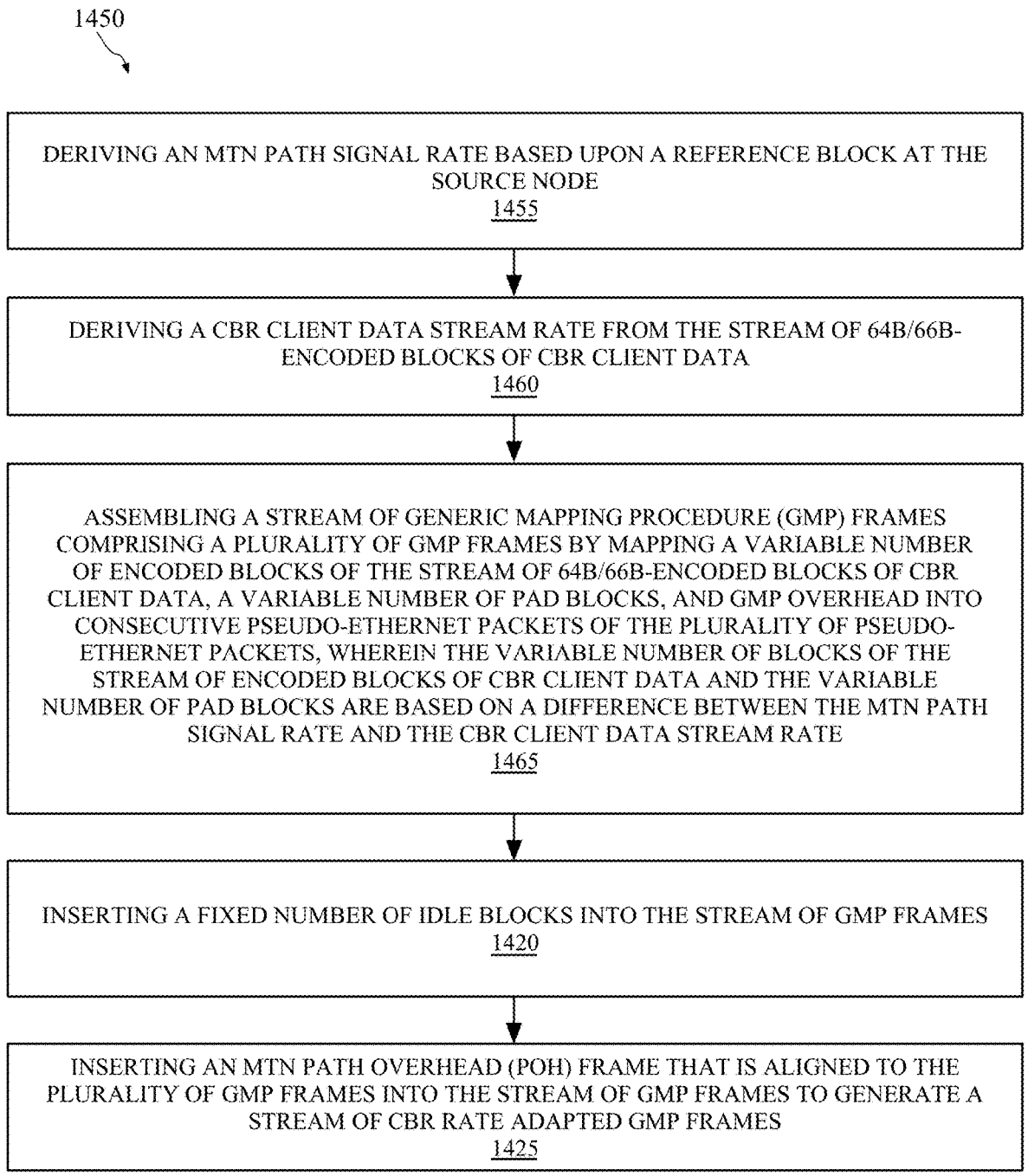
FIG. 14B is an example flow diagram illustrating additional details of the method performed by the source node in accordance with the first option of FIG. 14A for performing rate adaptation of CBR client data for transmission over an MTN.

FIG. 14B illustrates a flow diagram 1450 of a method for performing rate adaptation of constant bit rate (CBR) client data for transmission over a Metro Transport Network (MTN) performed specifically by source node as illustrated in FIG. 7A-FIG. 7C.

At operation 1455, the method begins by deriving an MTN path signal rate based upon a reference clock at a source node and continues at operation 1460 by deriving a CBR client data stream rate from the stream of 64B/66B-encoded blocks of CBR client data.

The method continues at operation 1465 by assembling a plurality of Generic Mapping Procedure (GMP) frames by mapping a variable number of blocks of the stream of 64B/66B-encoded blocks of CBR client data, a variable number of pad blocks, and GMP overhead into consecutive pseudo-Ethernet packets of the plurality of pseudo-Ethernet packets, wherein the variable number of blocks of the stream of 64B/66B-encoded blocks of CBR client data and the variable number of pad blocks are based on a difference between the path signal rate derived from the MTN and the CBR client data stream rate.

The method continues at operation 1470 by inserting a fixed number of idle blocks into the stream of GMP frames and concludes at operation 1475 by inserting an MTN path overhead (POH) frame that is aligned to the plurality of GMP frames into the stream of GMP frames to generate a stream of CBR rate adapted GMP frames.

Figure 15A:
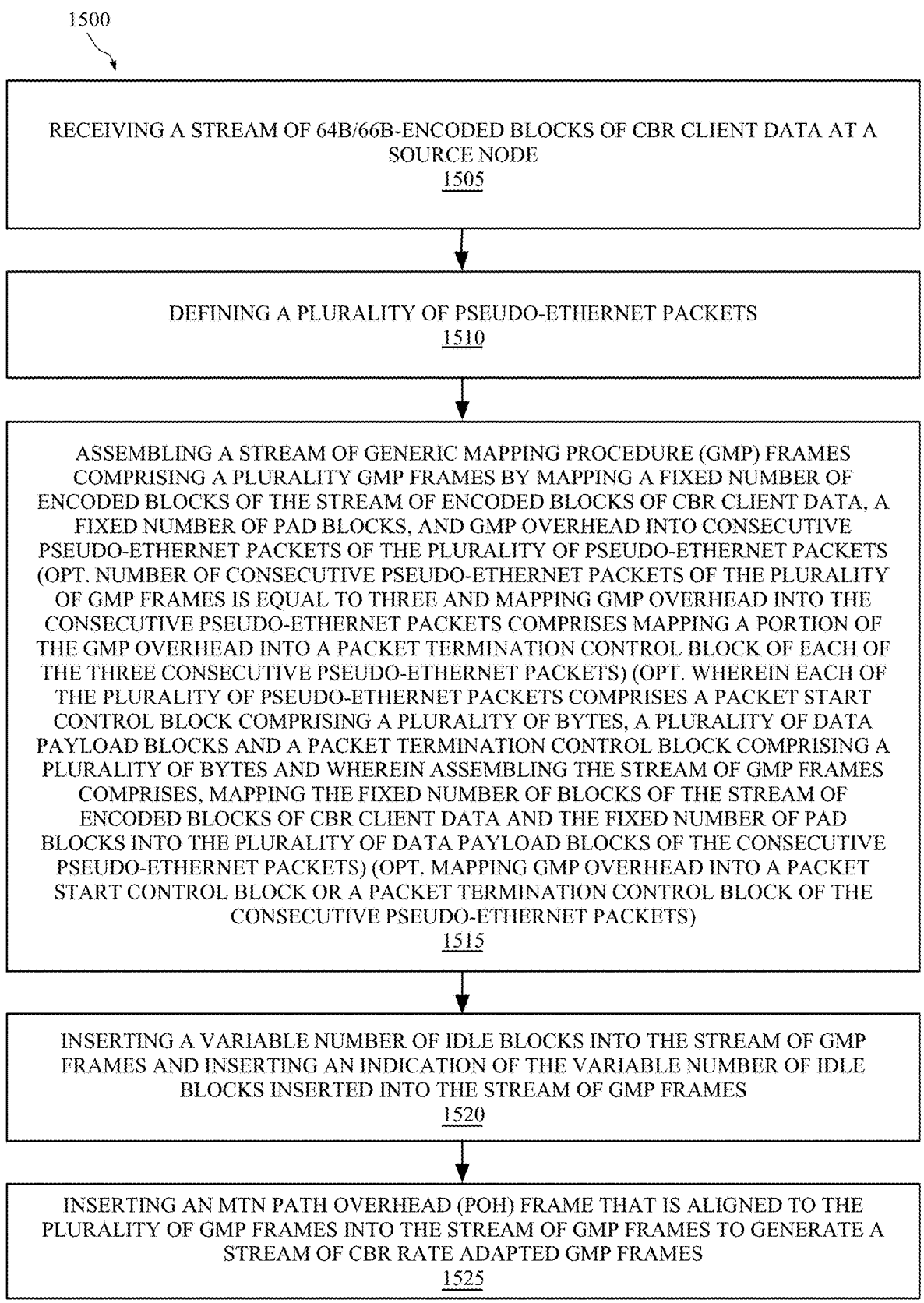
FIG. 15A is an example flow diagram illustrating a method performed by a source node in accordance with the second option of FIG. 8A for performing rate adaptation of CBR client data for transmission over an MTN.

FIG. 15A illustrates a flow diagram 1500 of a method for performing rate adaptation of constant bit rate (CBR) client data for transmission over a Metro Transport Network (MTN) performed specifically by source node as illustrated in FIG. 8A.

The method 1500 begins at operation 1505 by receiving a stream of encoded blocks of CBR client data at a source node.

At operation 1510, the method 1500 continues by defining a plurality of pseudo-Ethernet packets. In particular, at operation 1510 the source node creates a plurality of pseudo-Ethernet empty packets having a packet start control block (/S/), a packet termination control block (/T/) and fixed payload capacity of N-2 data blocks. The method continues at 1515 by assembling a stream of Generic Mapping Procedure (GMP) frames comprising a plurality of GMP frames by mapping a fixed number of blocks of the stream of encoded blocks of CBR client data, a fixed number of pad blocks, and GMP overhead into consecutive pseudo-Ethernet packets of the plurality of pseudo-Ethernet packets. In a specific example, the number of consecutive pseudo-Ethernet packets of the plurality of GMP frames is equal to three, and mapping GMP overhead into the consecutive pseudo-Ethernet packets may comprise mapping a portion of the GMP overhead into a packet termination control block of each of the three consecutive pseudo-Ethernet packets. In another example, each of the plurality of pseudo-Ethernet packets comprises a packet start control block comprising a plurality of bytes, a plurality of data payload blocks and a packet termination control block comprising a plurality of bytes and assembling the plurality of GMP frames comprises, mapping the fixed number of blocks of the stream of encoded blocks of CBR client data and the fixed number of pad blocks into the plurality of data payload blocks of the consecutive pseudo-Ethernet packets. The GMP overhead may be mapped into the packet start control block or the packet termination control block of the consecutive pseudo-Ethernet packets.

At operation 1520, the method 1500 continues by inserting a variable number of idle blocks into the stream of GMP frames and inserting an indication of the variable number of idle blocks inserted into the stream of GMP frames. The method 1500 concludes at operation 1525 by inserting an MTN path overhead (POH) frame that is aligned to the plurality of GMP frames into the stream of GMP frames to generate a stream of CBR rate adapted GMP frames.

Figure 15B:
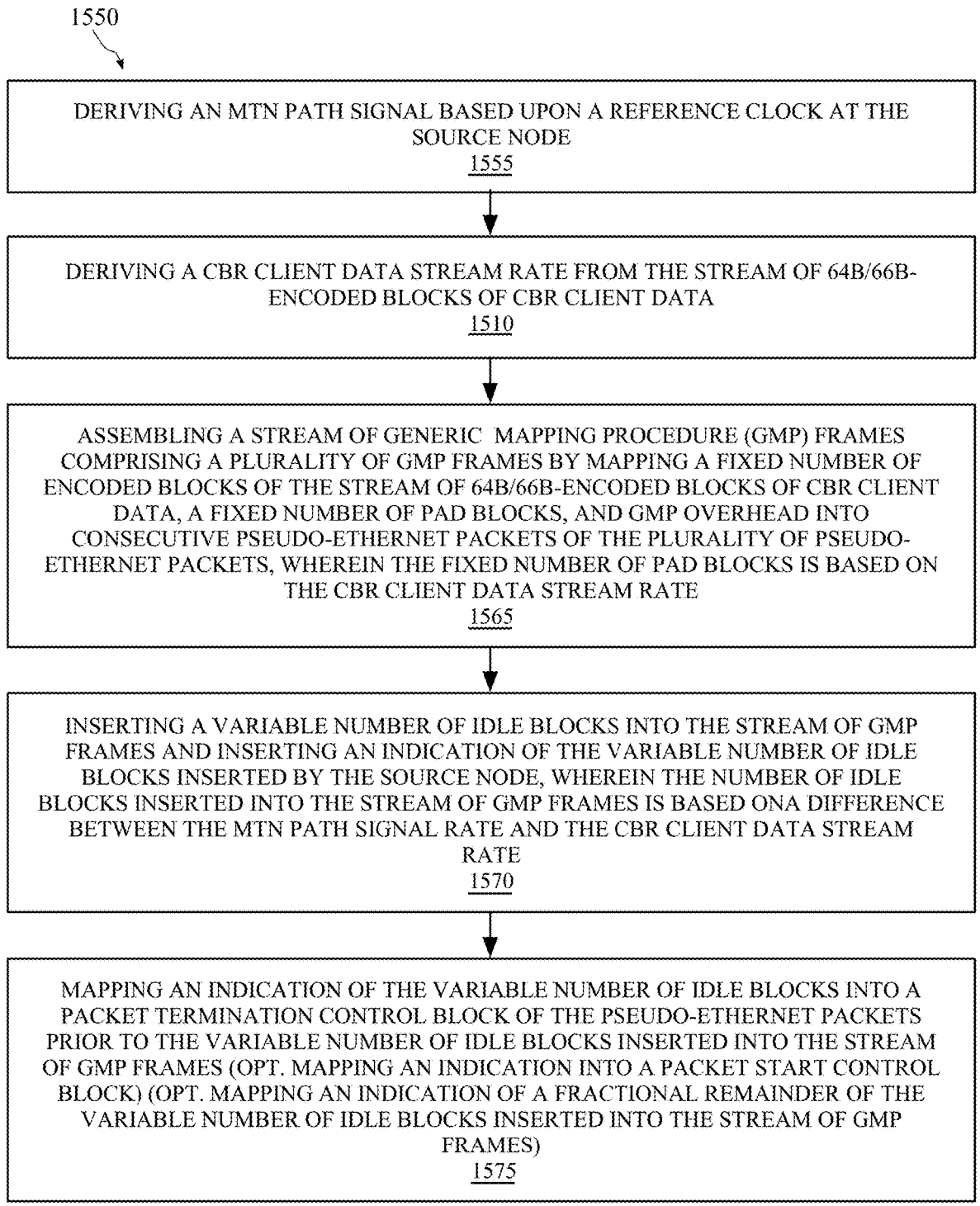
FIG. 15B is a flow diagram illustrating additional details of the example method performed by the source node in accordance with the second option of FIG. 15A for performing rate adaptation of CBR client data for transmission over an MTN.

FIG. 15B illustrates a flow diagram 1550 of a method for performing rate adaptation of constant bit rate (CBR) client data for transmission over a Metro Transport Network (MTN) performed specifically by source node as illustrated in FIG. 8A-FIG. 8C.

At operation 1555, the method 1550 begins by deriving an MTN path layer stream rate based upon a reference clock at the source node and continues at operation 1560 by deriving a CBR client data stream rate from the stream of 64B/66B-encoded blocks of CBR client data.

The method continues at operation 1565 by assembling a stream of Generic Mapping Procedure (GMP) frames comprising a plurality of GMP frames by mapping a fixed number of blocks of the stream of encoded blocks of CBR client data, a fixed number of pad blocks, and GMP overhead into consecutive pseudo-Ethernet packets of the plurality of pseudo-Ethernet packets, wherein the fixed number of pad blocks are based on the CBR client data stream rate.

The method continues at operation 1570 by inserting a variable number of idle blocks into the stream of GMP frames and inserting an indication of the variable number of idle blocks inserted into the stream of GMP frames by the source node, wherein the variable number of idle blocks is based on the difference between the MTN path signal rate and the CBR client data stream rate.

The method concludes at operation 1575 by mapping an indication of the number of idle blocks inserted into the packet termination control block of the pseudo-Ethernet packet prior to the variable number of idle blocks inserted into the stream of GMP frames by the source node. In an alternative example, the indication of the variable number of idle blocks may be mapped into the packet start control block instead of the packet termination control block. In a particular example, an indication of a fractional remainder of the variable number of idle blocks is inserted into the stream of GMP frames. In another alternative example, the number of idle blocks and fractional idle remainder represent a modulo running count of the number of idle blocks that have been transmitted since an arbitrary start time rather than the number of idles inserted immediately prior to or following the packet containing that overhead. In this example, the receiver determines the number of idle blocks transmitted between packets as the difference between the idle count overhead values in those respective packets.

Figure 16A:
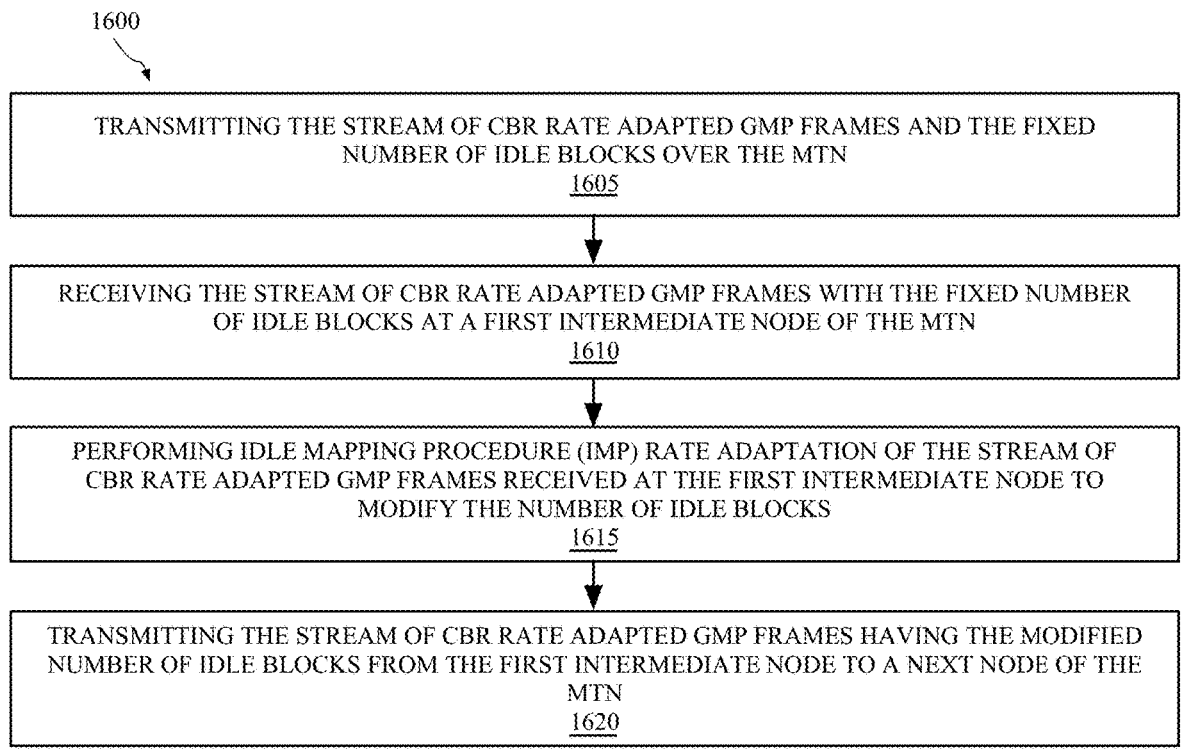
FIG. 16A is an example flow diagram illustrating a method for performing rate adaption at an intermediate node of the MTN for the first option as illustrated in FIG. 14B.

The flow diagram 1600 of FIG. 16A illustrates a continuation of the method illustrated in FIG. 14B, following the rate adaptation of the CBR client data. At least a portion of the method 1600 illustrated in FIG. 16A is performed by an intermediate node of the MTN.

At operation 1605, the method 1600 begins by transmitting the stream of CBR rate adapted GMP frames, including the fixed number of idle blocks, over the MTN. The source node illustrated in FIG. 7A may transmit the stream of CBR rate adapted GMP frames over the MTN.

At operation 1610, the method continues by receiving the stream of CBR rate adapted GMP frames and the fixed number of idle blocks at a first intermediate node of the MTN. The method continues at operation 1615 by performing idle mapping procedure (IMP) rate adaptation of the stream of CBR rate adapted GMP frames received at the first intermediate node to modify the number of idle blocks.

At operation 1620, the method continues by transmitting the stream of CBR rate adapted GMP frames having the modified number of idle blocks from the first intermediate node to a next node of the MTN. The next node may be a next intermediate node or a sink node. If the next node is an intermediate node, the method continues by performing IMP rate adaptation again, as in operation 1615. If the next intermediate node is a sink node, the method continues at FIG. 16B.

Figure 16B:
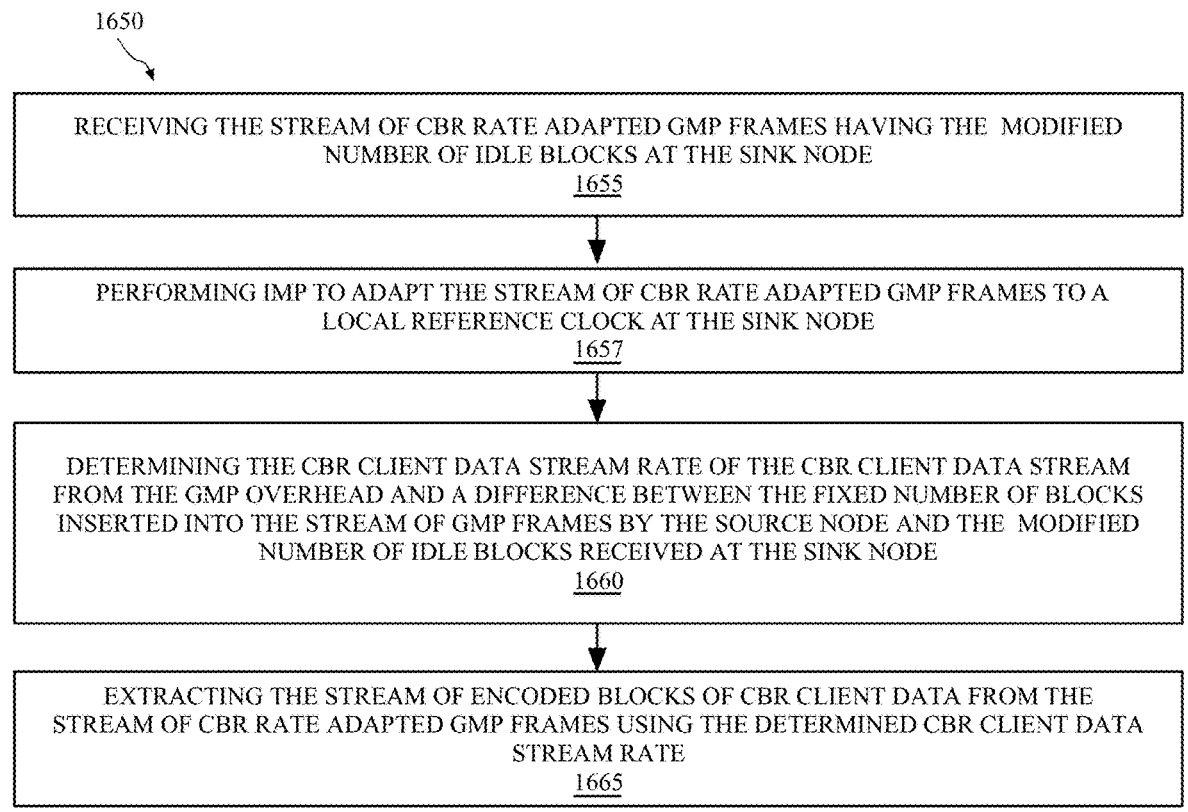
FIG. 16B is an example flow diagram illustrating a method for performing data extraction at a sink node of the MTN for the first option as illustrated in FIG. 14B.

The flow diagram 1650 of FIG. 16B illustrates a method performed by a sink node of the MTN, as previously described with reference to FIG. 7A and FIG. 9.

The method 1650 beings at operation 1655 by receiving the stream of CBR rate adapted GMP frames having the modified number of idle blocks at the sink node and continues at operation 1657 by performing idle mapping procedure (IMP) rate adaptation to adapt the stream of CBR rate adapted GMP frames to a local reference clock at the sink node. The method 1650 continues at operation 1660 by determining the CBR client data stream rate of the CBR client data stream from the GMP overhead and a difference between the fixed number of idle blocks inserted into the stream of CBR rate adapted GMP frames by the source node and the modified number of idle blocks received at the sink node. In this example, the fixed number of idle blocks inserted by the source node is known by the sink node.

The method concludes at operation 1665 by extracting the stream of encoded blocks of CBR client data from the stream of CBR rate adapted GMP frames using the determined CBR client data stream rate.

Figure 17A:
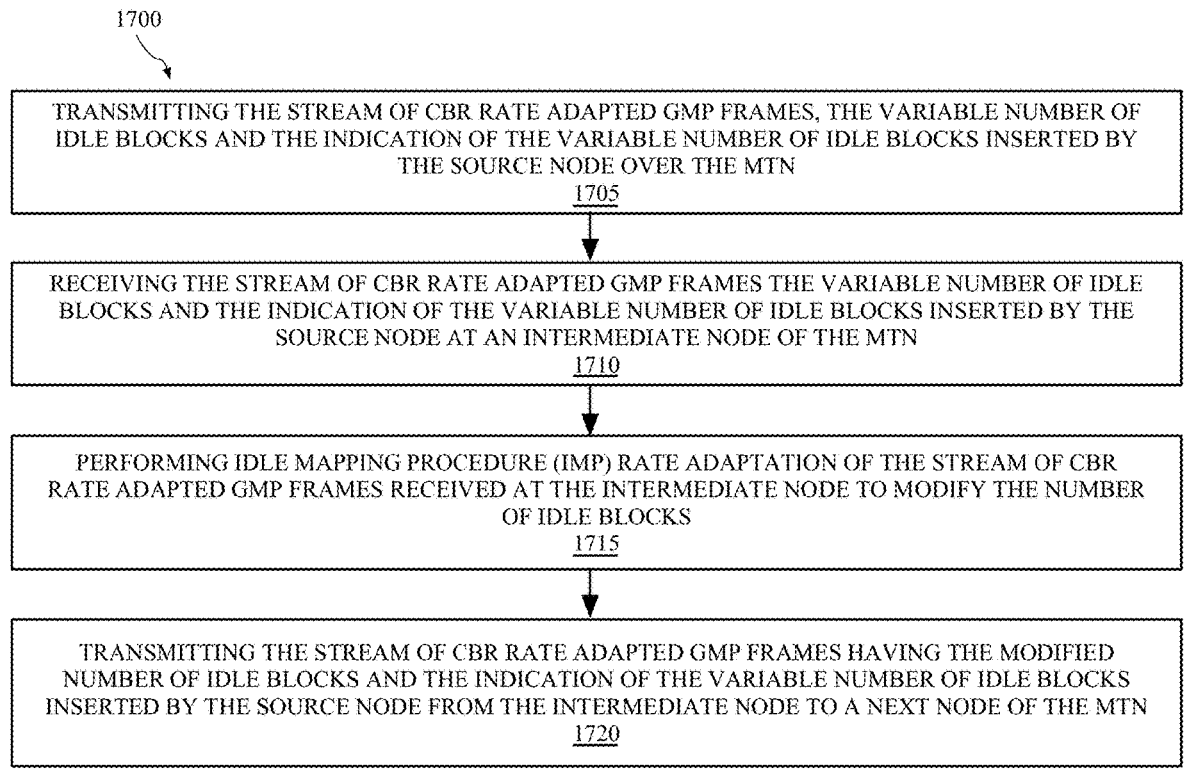
FIG. 17A is an example flow diagram illustrating a method for performing rate adaption at an intermediate node of the MTN for the second option as illustrated in FIG. 15B.

The flow diagram 1700 of FIG. 17A illustrates a continuation of the method illustrated in FIG. 15B, following the rate adaptation of the CBR client data. The method 1700 illustrated in FIG. 17A is at least partially performed by an intermediate node of the MTN.

At operation 1705, the method 1700 begins by transmitting the stream of CBR rate adapted GMP frames, including the variable number of idle blocks and the indication of the variable number of idle blocks inserted by the source node over the MTN. The source node illustrated in FIG. 8A may transmit the stream of CBR rate adapted GMP frames over the MTN.

At operation 1710, the method continues by receiving the stream of CBR rate adapted GMP frames, the variable number of idle blocks and the indication of the variable number of idle blocks inserted by the source node at an intermediate node of the MTN. The method continues at operation 1715 by performing idle mapping procedure (IMP) rate adaptation of the stream of CBR rate adapted GMP frames received at the intermediate node to modify the number of idle blocks.

At operation 1720, the method continues by transmitting the stream of CBR rate adapted GMP frames having the modified number of idle blocks and the indication of the variable number of idle blocks inserted by the source node from the intermediate node to a next node of the MTN. The next node may be a next intermediate node or a sink node. If the next node is an intermediate node, the method continues by performing IMP rate adaptation again, as in operation 1715. If the next intermediate node is a sink node, the method continues at FIG. 17B.

Figure 17B:
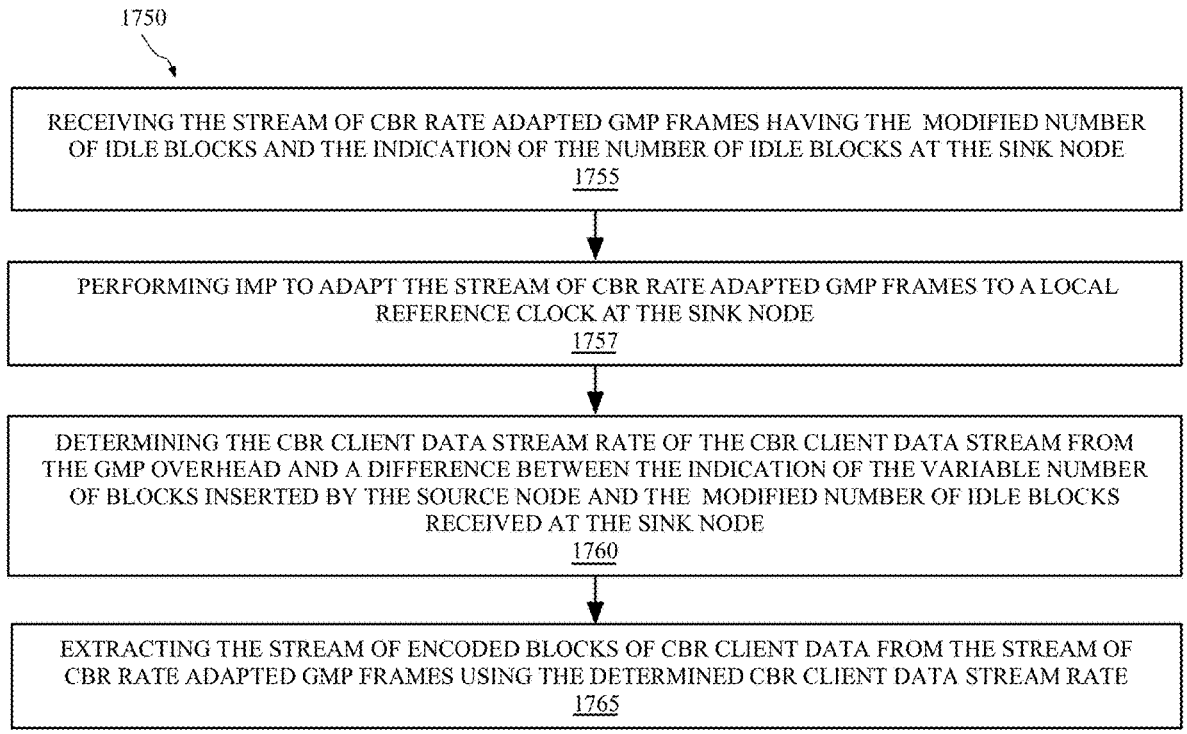
FIG. 17B is an example flow diagram illustrating a method for performing data extraction at a sink node of the MTN for the second option illustrated in as FIG. 15B.

The flow diagram 1750 of FIG. 17B illustrates a method performed by a sink node of the MTN, as previously described with reference to FIG. 8A and FIG. 9.

The method 1750 beings at operation 1755 by receiving the stream of CBR rate adapted GMP frames having the modified number of idle blocks and the indication of the variable number of idle blocks inserted by the source node at the sink node and continues at operation 1757 by performing idle mapping procedure (IMP) rate adaptation to adapt the stream of CBR rate adapted GMP frames to a local reference clock at the sink node. The method 1750 continues at operation 1760 by determining the CBR client data stream rate of the CBR client data stream from the GMP overhead and a difference between the indication of the variable number of idle blocks inserted by the source node and the modified number of idle blocks received at the sink node.

The method concludes at operation 1765 by extracting the stream of encoded blocks of CBR client data from the stream of CBR rate adapted GMP frames using the determined CBR client data stream rate.

Figure 18A:
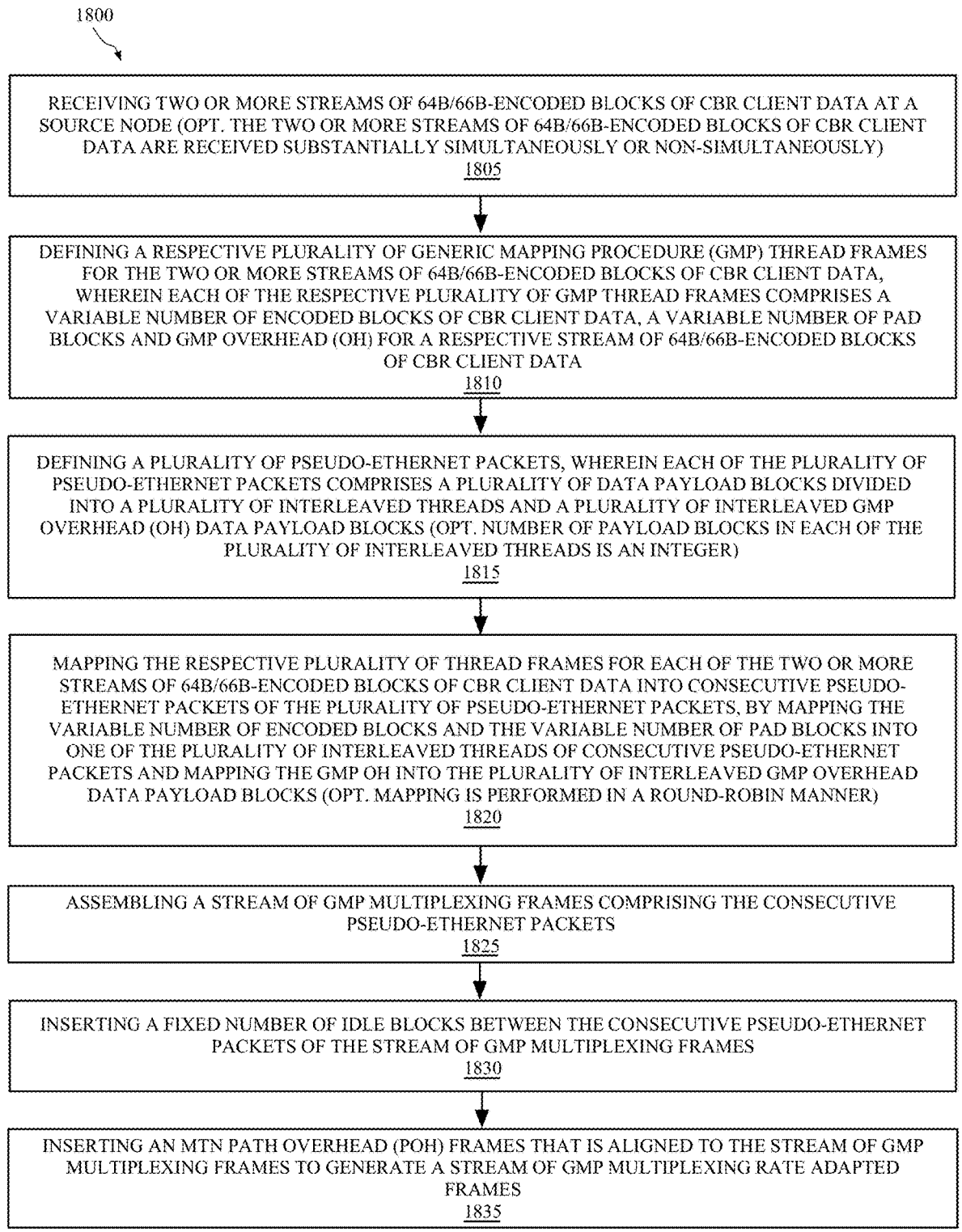
FIG. 18A is an example flow diagram illustrating a method for performing rate adaptation and multiplexing of two or more client data streams at a source node for transmission over an MTN.

The flow diagrams of FIG. 14A, FIG. 14B, FIG. 15A, FIG. 15B, FIG. 16A, FIG. 16B, FIG. 17A and FIG. 17B assume that the CBR client data stream that is being rate adapted is from a single client data stream. The flow diagram 1800 illustrated in FIG. 18A assumes that the client data stream is from two or more client data streams and that multiplexing is performed, as previously described with reference to FIG. 10.

The method 1800 begins at operation 1805 by receiving two or more streams of CBR client data at a source node. Each of the two or more streams of CBR client data includes a client payload and any necessary operations, administration and maintenance (OAM) overhead for the client. The two or more streams of CBR client data may be received at substantially the same time or alternatively, the one or more of the streams may be received non-simultaneously.

At operation 1810, the method 1800 continues by defining a respective plurality of GMP thread frames for the two or more streams of 64B/66B-encoded blocks of CBR client data, wherein each of the respective plurality of GMP thread frames comprises a variable number of encoded blocks of CBR client data, a variable number of pad blocks and GMP overhead for the respective stream of 64B/66B-encoded blocks of CBR client data.

At operation 1815, the method 1800 continues by defining a plurality of pseudo-Ethernet packets, wherein each of the plurality of pseudo-Ethernet packets comprises a plurality of data payload blocks divided into a plurality of interleaved threads and a plurality of interleaved GMP overhead (OH) data payload blocks. Optionally, the number of data payload blocks in each of the plurality of interleaved threads may be an integer number of data payload blocks.

The method continues at operation 1820 by mapping the respective plurality of thread frames for each of the two or more streams of 64b/66b-encoded blocks of CBR client data into consecutive pseudo-ethernet packets of the plurality of pseudo-ethernet packets, by mapping the variable number of encoded blocks and the variable number of pad blocks into one of the plurality of interleaved threads of consecutive pseudo-ethernet packets and mapping the GMP OH into the plurality of interleaved GMP overhead data payload blocks. In a particular example, the mapping is performed in a round-robin manner. While round-robin has been described herein, this is not meant to be limiting in any way, other manners may be utilized without exceeding the scope.

At operation 1825, the method continues by assembling a stream of GMP multiplexing frames comprising the consecutive pseudo-Ethernet packets.

At operation 1830, the method 1800 continues by inserting a fixed number of idle blocks between the consecutive pseudo-Ethernet packets of the stream of GMP multiplexing frames. The method 1800 concludes at operation 1835 by inserting an MTN path overhead (POH) frame that is aligned to the stream of GMP multiplexing frames to generate a stream of GMP multiplexing rate adapted frames.

Figure 18B:
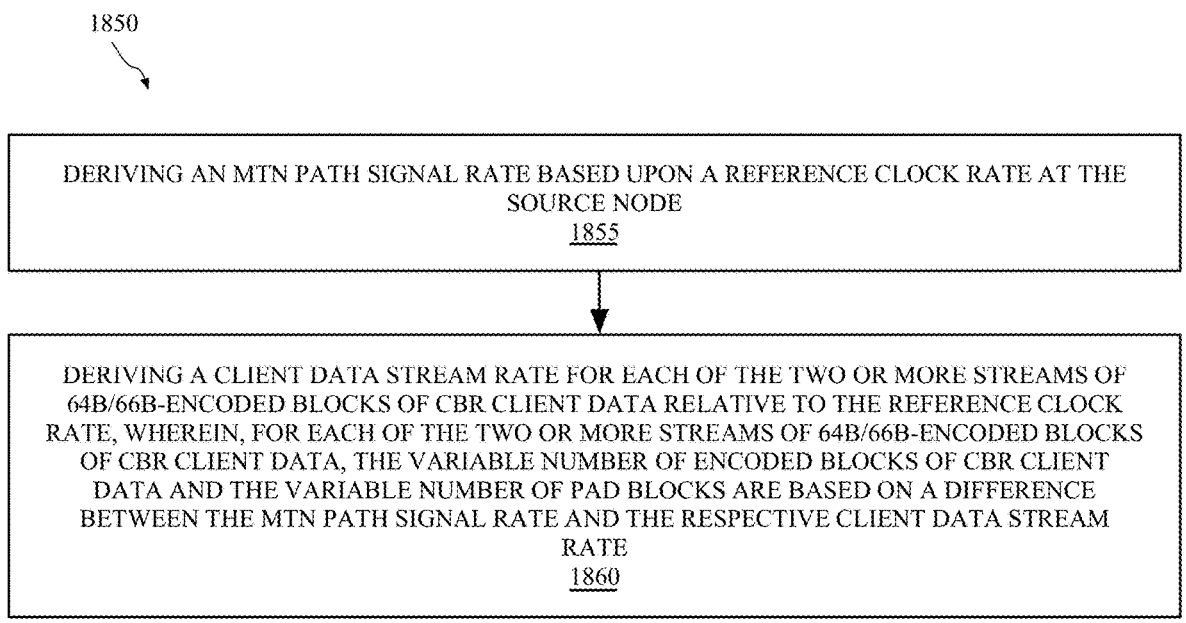
FIG. 18B is an example flow diagram illustrating additional details of the method performed by the source node in accordance with FIG. 18A for performing rate adaptation and multiplexing of two or more client data streams for transmission over an MTN.

FIG. 18B illustrates a method 1850 for rate adapting and multiplexing two or more client data streams. Rate adaptation of the two or more client data streams can be performed by the system illustrated in FIG. 7D and the multiplexing of the two or more client data streams can be performed by the system illustrated in FIG. 10.

The method 1850 begins at operation 1855 by deriving an MTN path signal rate based upon a reference clock rate at the source node. The method 1850 continues at operation 1860 by deriving a client data stream rate for each of the two or more streams of 64B/66B-encoded blocks of CBR client data relative to the reference clock rate, wherein for each of the two or more streams of 64B/66B-encoded blocks of CBR client data, the variable number of encoded blocks of CBR client data and the variable number of pad blocks are based on a difference between the MTN path signal rate and the respective client data stream rate.

FIG. 19A illustrates an example method 1900 for performing rate adaption at an intermediate node of the MTN for the method as illustrated in FIG. 18B.

The method 1900 begins at operation 1905 by transmitting the stream of GMP multiplexing rate adapted frames and the fixed number of idle blocks over the MTN. The method continues at operation 1910 by receiving the stream of GMP multiplexing rate adapted frames and the fixed number of idle blocks at a first intermediate node of the MTN.

At the first intermediate node, the method 1900 continues at operation 1915 by performing idle mapping procedure (IMP) rate adaptation of the stream of GMP multiplexing rate adapted frames received at the first intermediate node to modify the fixed number of idle blocks. The method 1900 concludes at operation 1920 by transmitting the stream of GMP multiplexing rate adapted frames having the modified fixed number of idle blocks from the first intermediate node to a next node of the MTN.

FIG. 19B illustrates a method for performing data extraction at a sink node of the MTN for the method as illustrated in FIG. 18B.

The method 1950 of FIG. 19B begins at operation 1955 by receiving the stream of GMP multiplexing rate adapted frames having the modified fixed number of idle blocks at the sink node. At operation 1960, the method 1950 continues by performing IMP to adapt the stream of GMP multiplexing rate adapted frames to a local reference clock at the sink node.

The method 1950 continues at operation 1965 by determining, for each interleaved thread, a corresponding client data stream rate from the GMP OH and a difference between the fixed number of idle blocks inserted between the consecutive pseudo-Ethernet packets of the stream of GMP multiplexing rate adapted frames by the source node and the modified fixed number of idle blocks received at the sink node. The method 1950 concludes at operation 1970 by extracting the two or more 64B/66B-encoded blocks of CBR client data from the stream of GMP multiplexing rate adapted thread frames using the corresponding client data stream rate for the interleaved thread.

Various benefits are provided by the system and methods of the examples, including, but not limited to: (1) The use of GMP within a packet to enhance flexibility and compatibility with potential MTN equipment implementations; (2) Tying the CBR packet-bearing structure to the MTN POH frame, such that the exact G.8312 nominal spacing of MTN overhead blocks can be consistently used; (3) Having the source node indicate the number of idle blocks it inserted after a packet, including the amount of remaining fractional idle blocks for improved IMP rate adaptation performance; (4) Providing the ability to do TDM client multiplexing within the packet, with GMP for the per-client rate adaptation; (5) No need to add new overhead to the MTN Path layer signal; (6) Improved bandwidth efficiency compared to using regular Ethernet packets in a CBR over Ethernet Service (CES) mode; and (7) Carrying CBR client signals in packets that are much longer than Ethernet packets for improved efficiency in an MTN network that operates independent of packet length.

In various examples, portions of the system of the present examples may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

What is claimed is:

1. A method for performing rate adaptation, the method comprising:
    receiving a stream of encoded blocks of Constant Bit Rate (CBR) client data at a source node;
    defining a plurality of pseudo-Ethernet packets; assembling a stream of Generic Mapping Procedure (GMP) frames comprising a plurality of GMP frames by mapping a fixed number of the encoded blocks of CBR client data, a fixed number of pad blocks and GMP overhead into consecutive pseudo-Ethernet packets of the plurality of pseudo-Ethernet packets;
    inserting a variable number of idle blocks into the stream of GMP frames; and
    inserting a Metro Transport Network (MTN) path overhead (POH) frame that is aligned to the plurality of GMP frames into the stream of GMP frames to generate a stream of CBR rate adapted GMP frames.

2. The method of claim 1, wherein the encoded blocks of CBR client data are 64B/66B-encoded blocks of CBR client data.

3. The method of claim 1, wherein each of the plurality of pseudo-Ethernet packets comprises a packet start control block, a plurality of data payload blocks and a packet termination control block and wherein assembling the stream of GMP frames comprises mapping the GMP overhead into the packet termination control block or the packet start control block of the consecutive pseudo-Ethernet packets.

4. The method of claim 1, wherein each of the plurality of pseudo-Ethernet packets comprises a packet start control block, a plurality of data payload blocks and a packet termination control block wherein a number of consecutive pseudo-Ethernet packets of each of the plurality of GMP frames is equal to three and wherein assembling the stream of GMP frames comprises mapping a portion of the GMP overhead into at least one of the packet termination control block or the packet start control block of each of the three consecutive pseudo-Ethernet packets.

5. The method of claim 1, wherein each of the plurality of pseudo-Ethernet packets comprises a packet start control block, a plurality of data payload blocks and a packet termination control block and wherein assembling the stream of GMP frames comprises mapping the fixed number of blocks of the stream of encoded blocks of CBR client data and the fixed number of pad blocks into the plurality of data payload blocks of the consecutive pseudo-Ethernet packets.

6. The method of claim 1, wherein assembling the plurality of GMP frames comprises:
    deriving an MTN path signal rate based upon a reference clock at the source node; and deriving a CBR client data stream rate from the stream of encoded blocks of CBR client data, wherein the fixed number of pad blocks is based on a CBR client data stream rate, and wherein the variable number of idle blocks inserted into the stream of GMP frames is based on a difference between the MTN path signal rate and the CBR client data stream rate.

7. The method of claim 6, wherein each of the plurality of pseudo-Ethernet packets comprises a packet start control block and a packet termination control block, the method comprising:
    mapping an indication of the variable number of idle blocks inserted into the stream of CBR rate adapted GMP frames into at least one of the termination control block or the packet start control block of the pseudo-Ethernet packet.

8. The method of claim 7, comprising:
    mapping an indication of a fractional remainder of the variable number of idle blocks inserted into the stream of CBR rate adapted GMP frames into at least one of the termination control block or the packet start control block of the pseudo-Ethernet packet.

9. The method of claim 1, comprising:
    transmitting the stream of CBR rate adapted GMP frames, the variable number of idle blocks, and the indication of the variable number of idle blocks inserted by the source over the MTN;
    receiving the stream of CBR rate adapted GMP frames, the variable number of idle blocks and the indication of the variable number of idle blocks inserted by the source at an intermediate node of the MTN;
    performing idle mapping procedure (IMP) rate adaptation of the stream of CBR rate adapted GMP frames received at the intermediate node to modify the variable number of idle blocks; and
    transmitting the stream of CBR rate adapted GMP frames, the modified variable number of idle blocks and the indication of the variable number of idle blocks inserted by the source from the intermediate node to a next node of the MTN.

10. The method of claim 9, wherein the next node of the MTN is selected from a next intermediate node and a sink node.

11. The method of claim 9, wherein the next node of the MTN is a sink node, the method comprising:
    receiving the stream of CBR rate adapted GMP frames, the modified variable number of idle blocks and the indication of the variable number of idle blocks inserted by the source node at the sink node;
    performing idle mapping procedure (IMP) rate adaptation to adapt the stream of CBR rate adapted GMP frames to a local reference clock at the sink node;
    determining the CBR client data stream rate of the stream of CBR client data from the GMP overhead and a difference between the indication of the variable number of idle blocks inserted by the source node and the modified number of idle blocks received at the sink node; and
    extracting the stream of encoded blocks of CBR client data from the stream of CBR rate adapted GMP frames using the determined CBR client data stream rate.

12. A method for performing rate adaptation, the method comprising:
    receiving a stream of encoded blocks of Constant Bit Rate (CBR) client data at a source node;
    defining a plurality of pseudo-Ethernet packets;
    assembling a stream of Generic Mapping Procedure (GMP) frames comprising a plurality of GMP frames by mapping a fixed number of blocks of the stream of encoded blocks of CBR client data, a fixed number of pad blocks and GMP overhead into consecutive pseudo-Ethernet packets of the plurality of pseudo-Ethernet packets;

inserting a variable number of idle blocks into the stream of GMP frames; inserting a Metro Transport Network (MTN) path overhead (POH) frame that is aligned to the plurality of GMP frames into the stream of GMP frames to generate a stream of CBR rate adapted GMP frames;

transmitting the stream of CBR rate adapted GMP frames, the variable number of idle blocks and the indication of the variable number of idle blocks inserted by the source over the MTN;

receiving the stream of CBR rate adapted GMP frames, the variable number of idle blocks and the indication of the variable number of idle blocks inserted by the source at an intermediate node of the MTN;

performing idle mapping procedure (IMP) rate adaptation of the stream of CBR rate adapted GMP frames received at the intermediate node to modify the variable number of idle blocks;

transmitting the stream of CBR rate adapted GMP frames, the modified variable number of idle blocks and the indication of the variable number of idle blocks inserted by the source from the intermediate node to a sink node of the MTN;

receiving the stream of CBR rate adapted GMP frames, the modified number of idle blocks and the indication of the variable number of idle blocks inserted by the source at the sink node;

performing idle mapping procedure (IMP) rate adaptation to adapt the stream of CBR rate adapted GMP frames to a local reference clock at the sink node; determining the CBR client data stream rate of the stream of CBR client data from the GMP overhead and a difference between the indication of the variable number of idle blocks inserted by the source node and the modified number of idle blocks received at the sink node; and extracting the stream of encoded blocks of CBR client data from the stream of CBR rate adapted GMP frames using the determined CBR client data stream rate.

13. A source node for transmitting a constant bit rate (CBR) client data stream over a Metro Transport Network (MTN), the source node comprising circuitry to:

receive a stream of encoded blocks of CBR client data;
define a plurality of pseudo-Ethernet packets;
assemble a stream of Generic Mapping Procedure (GMP) frames comprising a plurality of GMP frames by mapping a fixed number of blocks of the stream of encoded blocks of CBR client data, a fixed number of pad blocks and GMP overhead into consecutive pseudo-Ethernet packets of the plurality of pseudo-Ethernet packets;
insert a variable number of idle blocks into the stream of GMP frames and an indication of the variable number of idle blocks inserted by the source into the stream of GMP frames; and
insert a Metro Transport Network (MTN) path overhead (POH) frame that is aligned to the plurality of GMP frames into the stream of GMP frames to generate a stream of CBR rate adapted GMP frames.

14. The source node of claim 13, wherein the source node circuitry further to transmit the plurality of CBR rate adapted GMP frames, the variable number of idle blocks and the indication of the variable number of idle blocks inserted by the source to one or more intermediate nodes or to one or more sink nodes of the MTN.

15. The source node of claim 13, wherein the encoded blocks of CBR client data are 64B/66B-encoded blocks of CBR client data.

16. The source node of claim 13, wherein the indication of the variable number of blocks inserted into the stream of GMP frames is a fractional remainder of the variable number of idle blocks inserted into the stream of GMP frames.

17. The source node of claim 13, wherein each of the plurality of pseudo-Ethernet packets comprises a packet start control block, a plurality of data payload blocks and a packet termination control block and the source node to assemble the stream of GMP frames by mapping the GMP overhead into at least one of the packet termination control block or the packet start control block of the consecutive pseudo-Ethernet packets.

18. The source node of claim 13, wherein each of the plurality of pseudo-Ethernet packets comprises a packet start control block, a plurality of data payload blocks and a packet termination control block and the source node to assemble the stream of GMP frames by mapping the indication of the variable number of idles inserted by the source node into at least one of the packet termination control block or the packet start control block of the consecutive pseudo-Ethernet packets.

19. The source node of claim 13, wherein each of the plurality of pseudo-Ethernet packets comprises a packet start control, a plurality of data payload blocks and a packet termination control block, wherein a number of consecutive pseudo-Ethernet packets of each of the plurality of GMP frames is equal to three and wherein assembling the stream of GMP frames comprises mapping a portion of the GMP overhead into at least one of the packet termination control block or the packet start control block of each of the three consecutive pseudo-Ethernet packets.

20. The source node of claim 13, wherein the source node circuitry to assemble the stream of GMP frames:
derives an MTN path signal rate based upon a reference clock at the source node; and
derives a CBR client data stream rate from the stream of encoded blocks of CBR client data,
wherein the fixed number of pad blocks is based on the CBR client data stream rate, and
wherein the variable number of idle blocks inserted into the stream of GMP frames is based on a difference between the MTN path signal rate and the CBR client data stream rate.

* * * * *